United States Patent [19]

Asada

[11] Patent Number: 5,875,262
[45] Date of Patent: Feb. 23, 1999

[54] METHOD OF AND APPARATUS FOR CONVERTING IMAGE SIGNAL REPRESENTING IMAGE HAVING GRADATION

[75] Inventor: Shinji Asada, Tenjinkitamachi, Japan

[73] Assignee: Dainippon Screen Manufacturing Co., Ltd., Kyoto-fu, Japan

[21] Appl. No.: 870,989

[22] Filed: Jun. 6, 1997

Related U.S. Application Data

[62] Division of Ser. No. 953,536, Sep. 28, 1992, Pat. No. 5,680,477.

[30] Foreign Application Priority Data

Sep. 27, 1991 [JP] Japan .................................. 3-277074
Sep. 27, 1991 [JP] Japan .................................. 3-277344

[51] Int. Cl.[6] .................................................. G06T 5/40
[52] U.S. Cl. ...................... 382/169; 382/274; 358/458; 358/461
[58] Field of Search .................................. 382/169, 274; 358/458, 456, 461, 521, 522

[56] References Cited

U.S. PATENT DOCUMENTS

| | | | |
|---|---|---|---|
| 4,679,095 | 7/1987 | Kitamura et al. ........................ | 358/515 |
| 4,792,979 | 12/1988 | Nomura et al. .......................... | 382/169 |
| 4,903,145 | 2/1990 | Funada ..................................... | 358/462 |
| 4,984,071 | 1/1991 | Yonezawa ................................ | 358/522 |
| 5,046,118 | 9/1991 | Ajewole et al. ......................... | 382/169 |
| 5,053,888 | 10/1991 | Nomura .................................... | 382/274 |
| 5,123,060 | 6/1992 | Cho et al. ................................. | 382/274 |
| 5,280,367 | 1/1994 | Zuniga ..................................... | 358/462 |

*Primary Examiner*—Jon Chang
*Attorney, Agent, or Firm*—Ostrolenk, Faber, Gerb & Soffen, LLP

[57] ABSTRACT

An original image is divided into a plurality of pixel blocks each consisting of a plurality of pixels. A density histogram represented by an electric signal is obtained for each pixel block. Respective pixel blocks are analyzed to find adjacent pixel blocks which are uniform and continuous in density. If the pixel blocks thus found are continuous in density with the reference pixel blocks located at the corner of the original image, the pixel blocks are regarded as those representing the background portion of the original image. The numbers of pixels in the density histogram is corrected for each background pixel block, and highlight and shadow points for determining a gradation curve is determined. The gradation curve is set in a signal-converter to convert an image signal representative of the original image.

10 Claims, 33 Drawing Sheets

TO FIG.3

F I G. 10
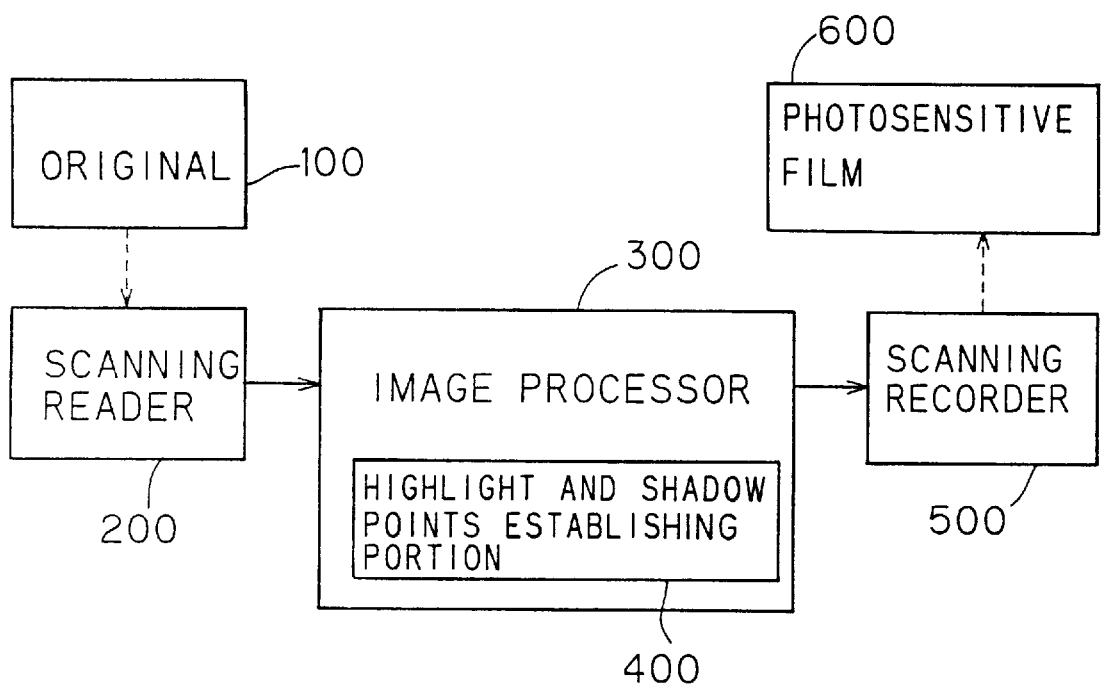

FIG. 25

OPERATION OF ACCUMULATOR

| FSn | FSn-1 | FSn-H | FSn-H-1 | $|\overline{D}_n - \overline{D}_{n-1}| < d$ | $|\overline{D}_n - \overline{D}_{n-H}| < d$ | $|\overline{D}_{n-H} - \overline{D}_{n-H-1}| < d$ | $L_{n-H} \neq L_{n-1}$ | Action |
|---|---|---|---|---|---|---|---|---|
| 1 | 1 | — | — | — | — | — | — | $L_n \leftarrow L_{n-H-1}$ |
| 1 | 0 | — | — | — | 1 | — | — | $L_n \leftarrow L_{n-H}$ |
| 0 | 0 | 1 | 1 | 1 | — | — | — | $L_n \leftarrow L_{n-1}$ |
| — | — | — | 0 | 0 | — | — | — | |
| 0 | — | 0 | — | 0 | 0 | — | — | $L_n \leftarrow L_c$ then $L_c \leftarrow L_c+1$ |
| — | 0 | — | — | — | 0 | 0 | — | |
| 0 | 1 | 1 | 1 | — | — | 0 | 1 | $ET_{k0} \leftarrow L_{n-1}, ET_{k1} \leftarrow L_{n-H}$ then $k \leftarrow k+1$ |
| 1 | 0 | — | — | — | 0 | — | 1 | |

Condition

METHOD OF AND APPARATUS FOR CONVERTING IMAGE SIGNAL REPRESENTING IMAGE HAVING GRADATION

This is a Division of application Ser. No. 07/953,536, filed Sep. 28, 1992, now U.S. Pat. No. 5,680,477.

BACKGROUND OF THE INVENTION

1. Field of the Invention

The present invention relates to a method and an apparatus for converting an image signal representing an image having gradations and more particularly, to improvement in establishing highlight and/or shadow points in a gradation converter employable in a color process scanner.

2. Description of Prior Arts

As is well known in the field of color image reproduction, a color original image having gradations is photoelectrically read by a process scanner and the original image signal thus obtained is converted into a processed image signal in gradation converter provided in the process scanner. The conversion is required for obtaining a desired image expression on a medium on which the original image is reproduced, and the conversion characteristic in the gradation converter is determined in accordance with a gradation curve. The gradation curve is obtained through establishment of highlight and shadow densities on a two-dimensional coordinate plane on which the gradation curve is to be defined. The highlight and shadow densities are called "reference densities", while the points defined on the coordinate plane in accordance with the highlight and shadow densities are called "reference density points".

The highlight and shadow densities may be determined by an operator through manual operation. However, the manual determination of the gradation curve requires a skilled operator, so that many original images cannot be processed in a short time. Accordingly, automatic determination of gradation curves has been developed.

In a conventional procedure for automatic establishment of the highlight and shadow points, an input highlight density and an input shadow density for a gradation curve are determined through the procedure shown in FIG. 17.

An original to be reproduced is prescanned to provide the density of the original image for each color component for each pixel in the process step S501.

The densities for the respective color components are averaged to determine an average density for each pixel, and then an average density histogram is constructed in the process step S502.

In the process step S503, a cumulative density is calculated for each rank for each color component to provide a cumulative density histogram shown in FIG. 19. FIG. 19 shows the cumulative density histogram only for the color component R.

In the process step S504, the relative frequency of the pixels added up from the low-density rank is determined. A cumulative relative frequency histogram shown in FIG. 18 is then constructed in which the relative frequency varies from 0% to 100% with respect to the average density ranging from a minimum generated density to a maximum generated density.

In the process step S505, predetermined cumulative density appearance rates $RN_H$, $RN_S$ corresponding to highlight and shadow points providing experimentally derived optimal gradation conversion characteristics are applied to the cumulative relative frequency histogram, to provide tentative highlight and shadow average densities $D_{MH}$ and $D_{MS}$ corresponding to the cumulative relative frequency.

The tentative highlight and shadow average densities $D_{MH}$ and $D_{MS}$ are applied to the cumulative density histograms by color component shown in FIG. 19 to provide the input highlight and shadow densities for each color component in the process step S506. The highlight and shadow points or reference density points through which the gradation curve is to be drawn are established as a function of the obtained input highlight and shadow densities and arbitrarily pre-established output highlight and shadow densities.

Unfortunately, the conventional method has drawbacks to be described below. When the original depicts a scene having a bright background or photographed against the light, the input highlight density becomes lower than a preferable level so that the reproduced image is finished darkly. When the original depicts a scene having a dark background, on the other hand, the input shadow density becomes higher so that the reproduced image is whitish.

The cause of such dark or whitish reproduced image will be described below. When the original depicts the scene having the bright background, the cumulative density histogram of FIG. 19 is affected by the bright background to have more frequent lower-density ranks. This results in a low tentative highlight average density determined from the cumulative relative frequency histogram of FIG. 18 and, accordingly, a low input highlight density obtained in the process step S506. The low input highlight density causes the gradation curve in a highlight region to be shifted toward the output shadow density since the gradation curve is produced as a function of the input highlight density. As a result, the reproduced image is finished darkly.

When the original has the dark background, the cumulative density histogram of FIG. 19 has more frequent higher-density ranks, so that the input shadow density given in the process step S506 grows high. This causes the gradation curve in a shadow region to be shifted toward the output highlight density, resulting in the whitish finish of the reproduced image obtained by the gradation conversion in accordance with the gradation curve.

Such a problem occurs also in the case where the original image includes a portion having a very low density and a certain area such as a glittering metal portion, even if the portion is not located in the background of the original image. The conventional method causes the undesired image-reproduction in which the input highlight density becomes lower than a preferable level so that the reproduced image is sometimes finished darkly or gives an impression that the entire color thereof is turbid.

SUMMARY OF THE INVENTION

The present invention is directed to a method of converting a first image signal representative of an original image having gradations into a second image signal to modify the gradations. The original image consists of a pixel array and the first image signal represents respective densities of pixels included in the pixel array.

According to the present invention, the method comprises the steps of: (a) dividing the pixel array into sub-arrays to obtain a plurality of pixel blocks each consisting of a plurality of pixels; (b) classifying the plurality of pixels into a plurality of density ranks according to respective values of the first image signal for each pixel block to thereby obtain a first electric signal representative of a density histogram for each pixel block, wherein the density histogram represents numbers of pixels belonging to respective density ranks; (c) comparing the respective values of the first image signal with each other to classify the plurality of pixel blocks into first pixel blocks and second pixel blocks, wherein the first pixel blocks satisfy the conditions of:

I. the first pixel blocks are adjacent to each other,

II. each first pixel block has a substantially uniform density among respective pixels in the each first pixel block, and III. respective uniform densities of the first pixel blocks are substantially continuous between the first pixel blocks; and, the second pixel blocks are pixel blocks other than the first pixel blocks; (d) selecting pixel blocks whose uniform densities are substantially continuous with prescribed at least one reference pixel block among the first pixel blocks to obtain background pixel blocks representative of a background portion of the original image; (e) receiving the first electric signal and compressing respective numbers of pixels in the density histogram corresponding to each background pixel block relative to pixel blocks other than the background pixel blocks; (f) after the step (e), summing respective numbers of pixels of all pixel blocks for each density rank to thereby obtain a density histogram for the whole of the original image; and (g) obtaining a second electric signal representative of a cumulative density histogram as a function of the density histogram for the whole of the original image.

Then, a reference point is defined on a coordinate plane defined by an input density axis and an output density axis as a function of the second electric signal. A signal-conversion characteristic is determined as a function of the reference point. The signal-conversion characteristic is set in a signal converter.

The first image signal is inputted to the signal converter to obtain an output signal from the signal converter to serve as the second image signal, whereby the first image signal is converted into the second image signal.

According to the present invention, uniformly bright or dark blocks, which have the uniform density and are continuous in density directly or indirectly with the predetermined reference block, are selected as background blocks. The number of pixels in the background blocks is relatively compressed relative to the number of pixels in the non-background blocks. This decreases the rate of the number of pixels for each rank in the density histogram for the background blocks in the number of pixels for each rank in the density histogram for the whole original, as compared with the conventional process wherein the number of pixels is not compressed.

Thus, when the original has a bright background, the input highlight density increases as compared with the conventional process, so that the conversion characteristic or gradation curve in the highlight region is shifted toward the output highlight density.

When the original has a dark background, for the most part the input shadow density decreases as compared with the conventional process, so that the gradation curve in the shadow region is shifted toward the output shadow density.

According to another construction of the present invention, the steps (c) to (f) are replaced with the steps of: (c) comparing the respective values of the first image signal with each other to classify the plurality of pixel blocks into first groups and a second group, wherein each of the first groups consists of a first pixel block and satisfies the conditions of:

I. the first pixel blocks in said first group are adjacent to each other,

II. each first pixel block in said first group has a substantially uniform density among respective pixels in the each first pixel block, and III. respective uniform densities of the first pixel blocks are substantially continuous between the first pixel blocks of said first group; and the second group consists of second pixel blocks other than the first pixel blocks; (d) counting the number of the first pixel blocks in said first group to obtain a first electric signal representative of the number of the first pixel blocks of said first group; (e) receiving the first electric signal and correcting respective numbers of pixels in the density histogram corresponding to each first pixel block, comprising the steps of: (e-1) obtaining a coefficient signal inversely proportional to the number of the first pixel blocks in each first group; and (e-2) multiplying the respective numbers of pixels in the density histogram corresponding to respective first pixel blocks by the coefficient signal for said first group, to thereby obtain corrected numbers of pixels in the density histogram corresponding to respective first pixel blocks; and (f) adding the corrected numbers of pixels for the first pixel blocks and the respective numbers of pixels for the second pixel blocks for each density rank to thereby obtain a density histogram for the whole of the original image.

According to the latter construction of the present invention, the coefficient inversely proportional to the number of first pixel blocks is multiplied by the number of pixels for each rank in the block-by-block density histograms for these first pixel blocks to determine the corrected number of pixels. By using the corrected number of pixels, the numbers of pixels in the density histogram corresponding to each first block is prevented from increasing as compared with the other pixel blocks.

For an original that includes low density pixel blocks, the input highlight density grows high so that the gradation curve in the highlight region is shifted toward the output highlight density in the present invention as compared with the conventional method in which the corrected number of pixels is not used.

For an original that includes high density blocks, in the present invention the input shadow density becomes low so that the gradation curve in the shadow region is shifted toward the output shadow density as compared with the conventional method.

The present invention also provides apparatus for practicing the present methods.

Accordingly, an object of the present invention is to convert an image signal without being affected by the background of an original image and to obtain a reproduced image having an improved finish.

Another object is to convert the image signal without being affected by local low-density and high-density regions in the original.

These and other objects, features, aspects and advantages of the present invention will become more apparent from the following detailed description of the present invention when taken in conjunction with the accompanying drawings.

BRIEF DESCRIPTION OF DRAWINGS

FIG. 10 is a schematic block diagram of a process scanner according to the first preferred embodiment of the present invention;

FIG. 25 is a diagram showing operation of an accumulator;

DESCRIPTION OF PREFERRED EMBODIMENTS

<First Preferred Embodiment>

Figure 1:
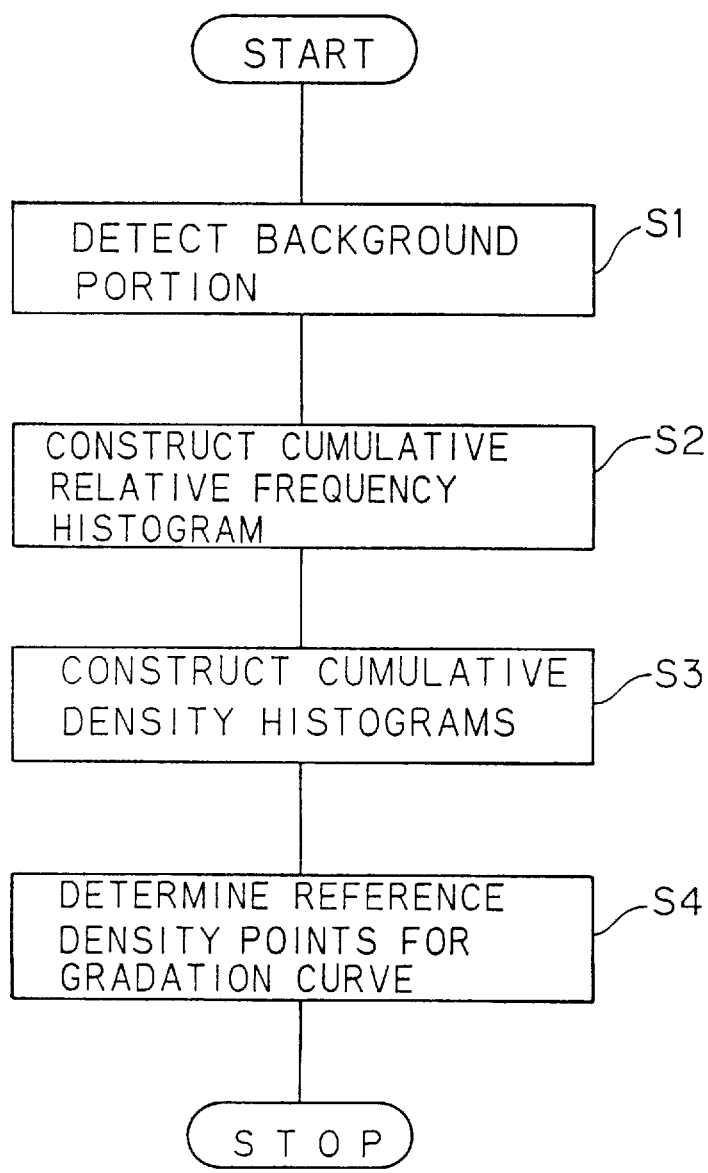
FIG. 1 is a flow chart schematically showing an overall process of establishing reference density points according to a first preferred embodiment of the present invention.

FIG. 10 is a schematic block diagram of a process scanner according to a first preferred embodiment of the present invention. A scanning reader 200 reads the image of a color original 100 pixel by pixel, and the resultant image signals for blue, green and red are transmitted to an image processor 300. The original 100 has thereon a color original image defined by a rectangular contour having four corners. The original image has a gradation of densities. The image processor 300 includes a highlight and shadow points establishing portion 400, whose function will be described later, for establishing highlight and shadow points in response to the inputted image signals. The processed image signal is applied to a scanning recorder 500 that converts the image signals into halftone dot signals to record halftone dot images for respective color components by exposure on a photosensitive film 600 as a function of the halftone dot signals.

Figure 11:
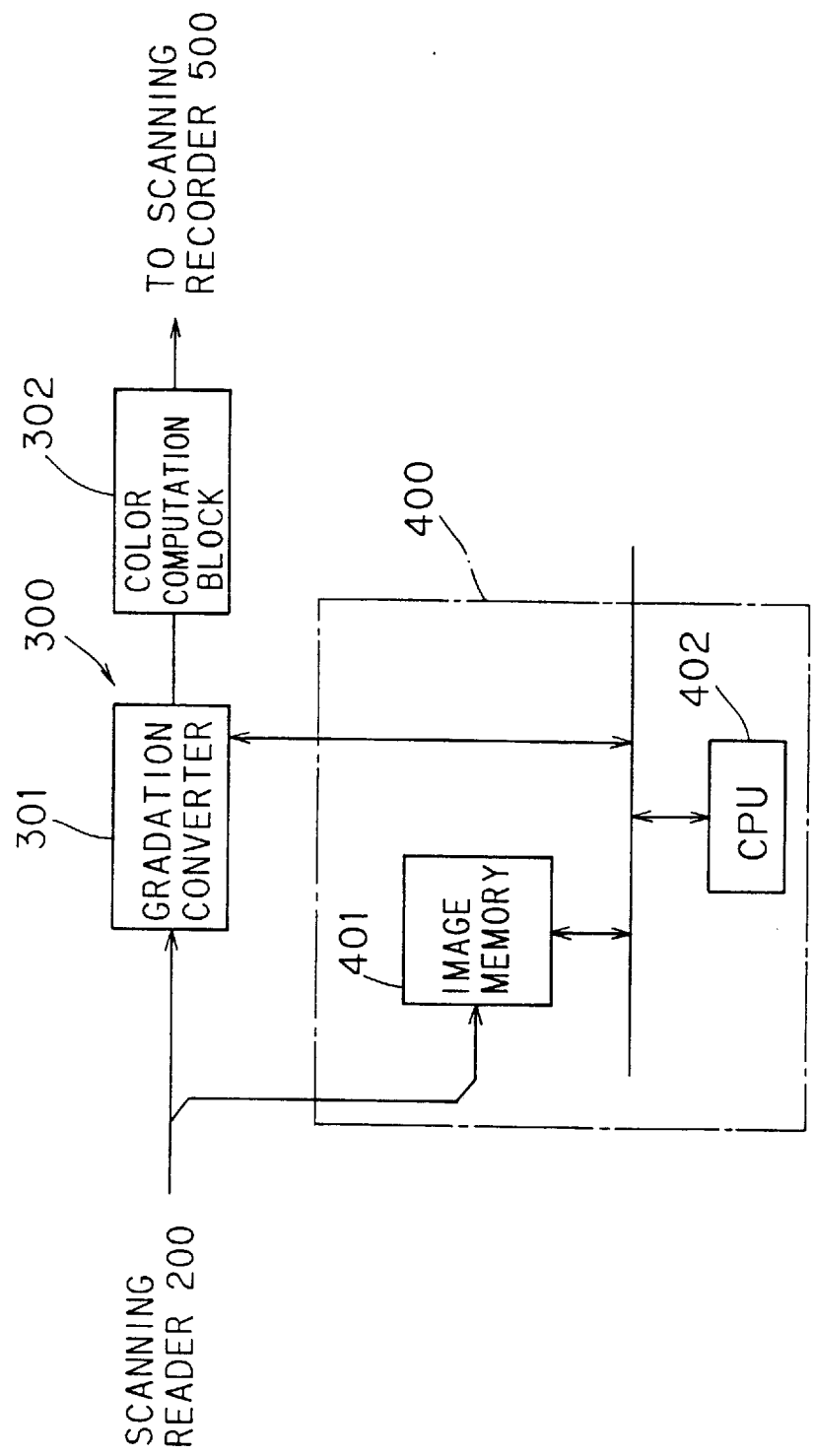
FIG. 11 is a block diagram of an image processor.
Figure 12:
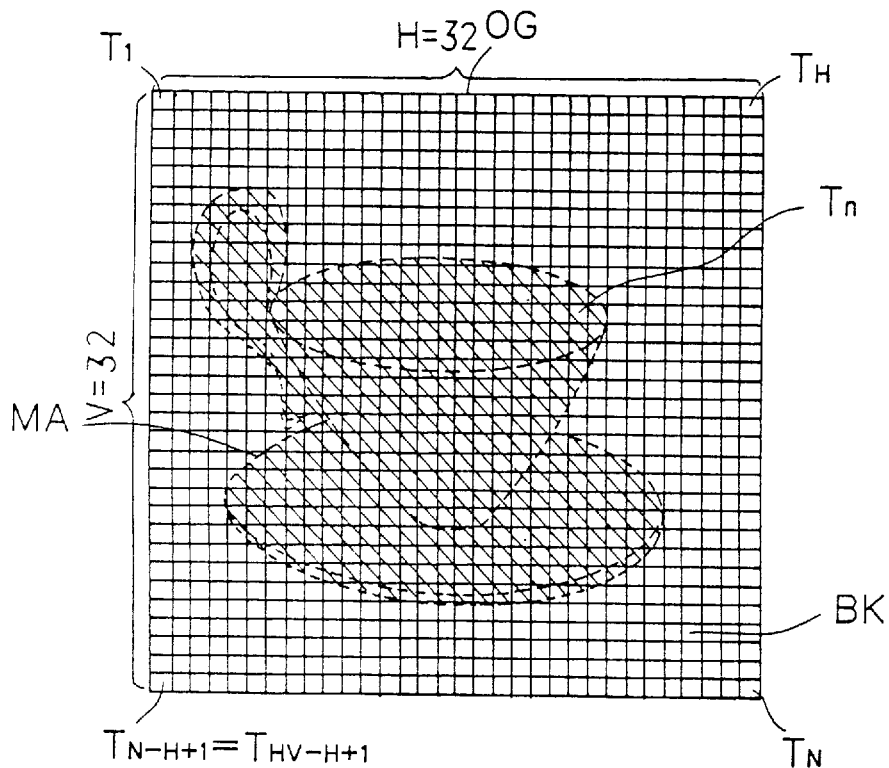
FIG. 12 is a front elevation of an original separated into a plurality of blocks.

FIG. 11 shows the image processor 300 including the highlight and shadow points establishing portion 400. The highlight and shadow points establishing portion 400 includes an image memory 401 and a CPU 402. The image memory 401 receives the image data given from the scanning reader 200 through a pre-scanning of the original and separates the original image OG into a multiplicity of pixels, for example 262144 pixels arranged in a matrix configuration having 512 rows and 512 columns, to store the pixels. The CPU 402 separates the original image OG having the multiplicity of pixels into N-number of blocks $T_n$ arranged in a matrix configuration each having V-number of rows and H-number of columns as shown in FIG. 12, where respective numbers N, V and H are integers larger than one. In the preferred embodiment, the original image having the 262144 pixels is separated into 1024 blocks $T_n$ arranged in the matrix configuration having 32 rows and 32 columns, so that each of the blocks $T_n$ includes the pixels arranged in 16 rows and 16 columns, i.e., a total of 256 pixels. The CPU 402 calculates the highlight and shadow points for a gradation curve, through the procedure to be described later, as a function of the original image data inputted to the image memory 401.

The highlight and shadow points calculated by the CPU 402 are applied to a storage portion such as a look-up table included in a gradation converter 301. Then, the original image OG is read by the scanning reader 200 again, and the gradation converter 301 converts uncorrected digital density signals given from the scanning reader 200 into normalized digital density signals in accordance with the gradation curve produced as a function of the highlight and shadow points. The normalized digital density signals are subjected to a predetermined color computation in a color computation block 302, and the processed signals are outputted to the scanning recorder 500. The color computation block 302 performs the predetermined color computation in accordance with commands inputted from an input/output portion not shown including a CRT and a keyboard.

A description will be now given of the manner in which highlight and shadow points for the gradation curve are established by the highlight and shadow point establishing portion 400. FIG. 1 is a block diagram which illustrates schematically a process for establishing the highlight and shadow points.

In process step S1 of FIG. 1, the highlight and shadow point establishing portion 400 (FIG. 10) detects a background portion BK in the original image OG shown, for example in FIG. 12. In FIG. 12, the background portion BK is a portion other than a subject portion MA shaded with oblique lines.

In the process step S2, a cumulative relative frequency histogram for the whole original image OG is constructed in which the number of pixels in the background portion BK detected in the process step S1 is contracted or compressed relative to the number of pixels in the blocks which are not included in the background portion BK (but in the subject portion MA of FIG. 12).

A cumulative density histogram is constructed for each color component in the process step S3.

The reference density points, that is, the highlight and shadow points for the gradation curve are determined in the process step S4 as a function of the cumulative relative frequency histogram for the whole original image OG made in the process step S2 and the cumulative density histograms made in the process step S3.

The process steps S1 to S4 will be described in detail below.

FIGS. 2 to 6 show the processes for detecting the background portion BK in the original image OG in the process step S1.

Figure 2:
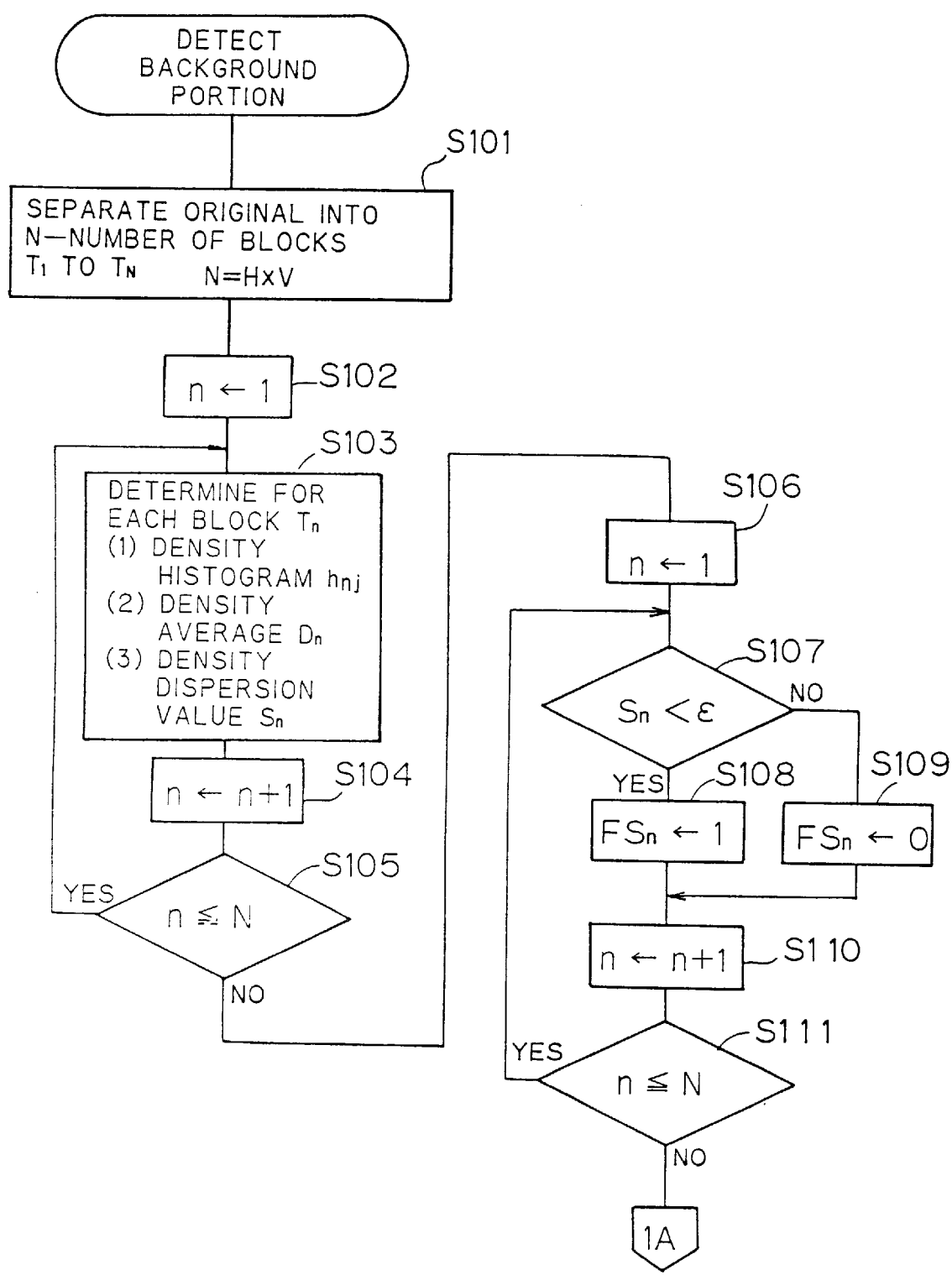
FIGS. 2 to 6 are flow charts of a process for detecting a background portion.

In the process step S101 of FIG. 2, the original image OG is separated into N-number of blocks $T_n$ arranged in the matrix configuration having V-number of rows and H-number of columns as shown in FIG. 12. Reference character n designates a block number of the blocks $T_n$ and is integers from 1 to N.

In the process steps S102 to S105, a density histogram $h_{nj}$, a density average $D_n$ and a density dispersion value $S_n$ (n=1 to N) are sequentially determined for each block $T_n$. Reference character j designates a rank number of the histograms and is integers from 0 to J. The final rank number J is given as $J=D_{max}/\Delta D$ where $D_{max}$ is a maximum density and $\Delta D$ is the width of each density step. The density histogram $h_{nj}$, density average $D_n$ and density dispersion value $S_n$ will be described below in further detail.

The density histogram $h_{nj}$ in the preferred embodiment is the density histogram of the average density provided for each pixel by averaging the densities for respective color components, and is constructed through the procedure to be described below. The original image OG is prescanned to obtain densities $D_R$, $D_G$, $D_B$ for each color component and for each pixel. An average density $D_M$ is calculated for each pixel by averaging the densities $D_R$, $D_G$, $D_B$ as:

$$D_M = \frac{D_R + D_G + D_B}{3} \quad \text{(Eq. 1)}$$

Then the density histogram $h_{nj}$ is produced for each block $T_n$ to show relation between the average densities $D_M$ of the pixels included in the respective ranks of predetermined width and the number of pixels providing the average densities $D_M$.

The density average $D_n$ is the average of average densities $D_{Mni}$ for the respective pixels included in each block $T_n$. The density average $D_n$ for each block $T_n$ is calculated as:

$$D_n = \frac{1}{I} \sum_{i=1}^{I} D_{Mni} \quad \text{(Eq. 2)}$$

where I is the number of pixels included in the block $T_n$.

The density dispersion value $S_n$ is a sample standard deviation using the average density $D_{Mni}$ for each pixel as a sample probability variable in the preferred embodiment and is given as:

$$S_n = \sqrt{\frac{1}{I} \sum_{i=1}^{I} (D_{Mni} - D_n)^2} \quad \text{(Eq. 3)}$$

After the calculation of the density histogram $h_{nj}$, density average $D_n$ and density dispersion value $S_n$ in the foregoing manner, blocks having uniform density are detected among the blocks $T_1$ to $T_N$ in the process steps S106 to S111 of FIG. 2. In the preferred embodiment, the dispersion value $S_n$ of each block $T_n$ is compared with a predetermined value $\epsilon$ in the process step S107. The block has a uniform density when the dispersion value $S_n$ thereof is less than the predetermined value $\epsilon$, and the block has a nonuniform density when the dispersion value $S_n$ thereof is not less than the predetermined value $\epsilon$.

A flag $FS_n$ is set to "1" for the uniform density block in the process step S108. The flag $FS_n$ is set to "0" for the nonuniform density block in the process step S109. The routine of the process steps S107 to S111 is repeated while the block number n varies from 1 to N, whereby the flag $FS_n$ for each block $T_n$ is set to "1" or "0".

Figure 3:
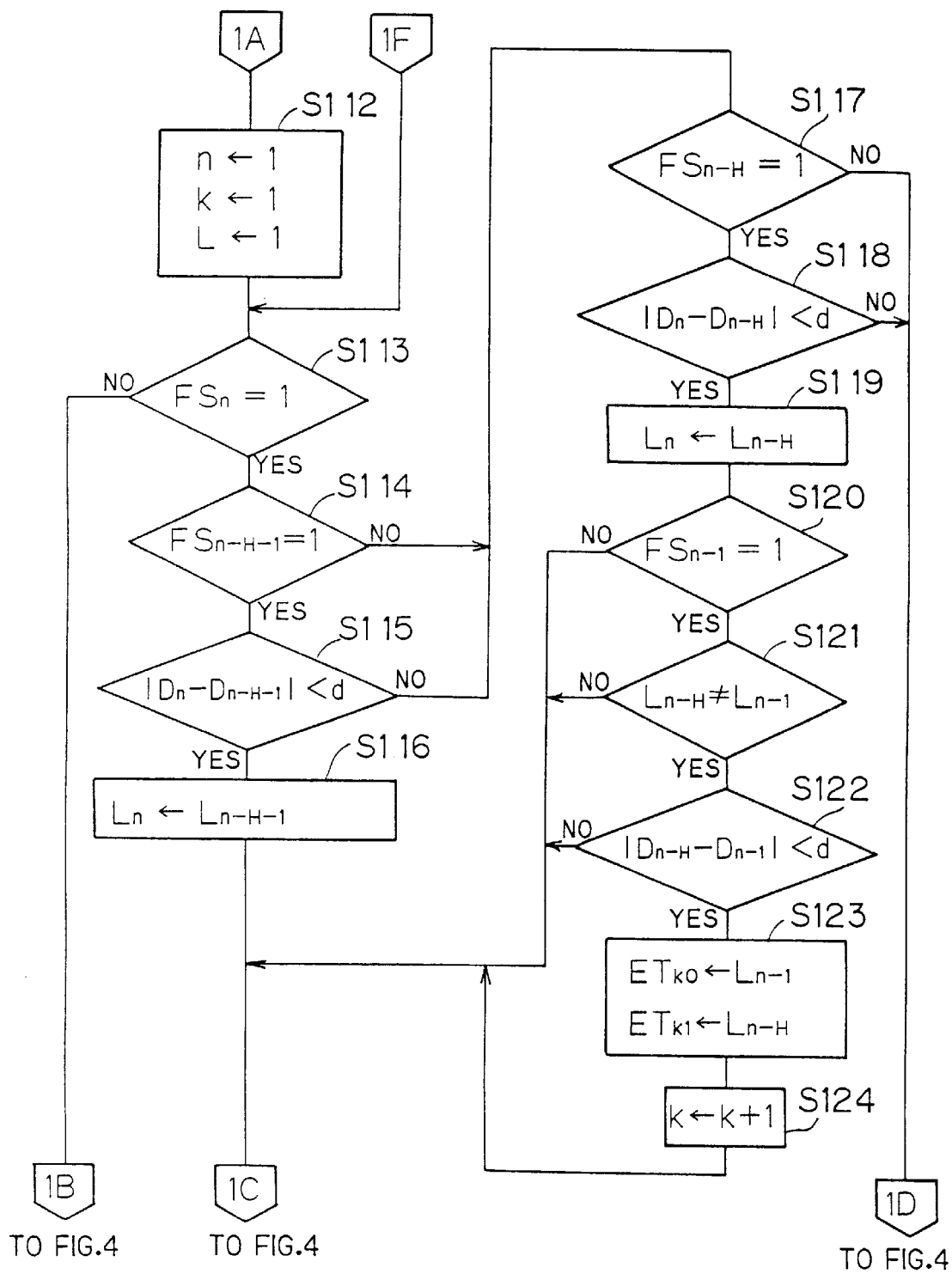
Figure 4:
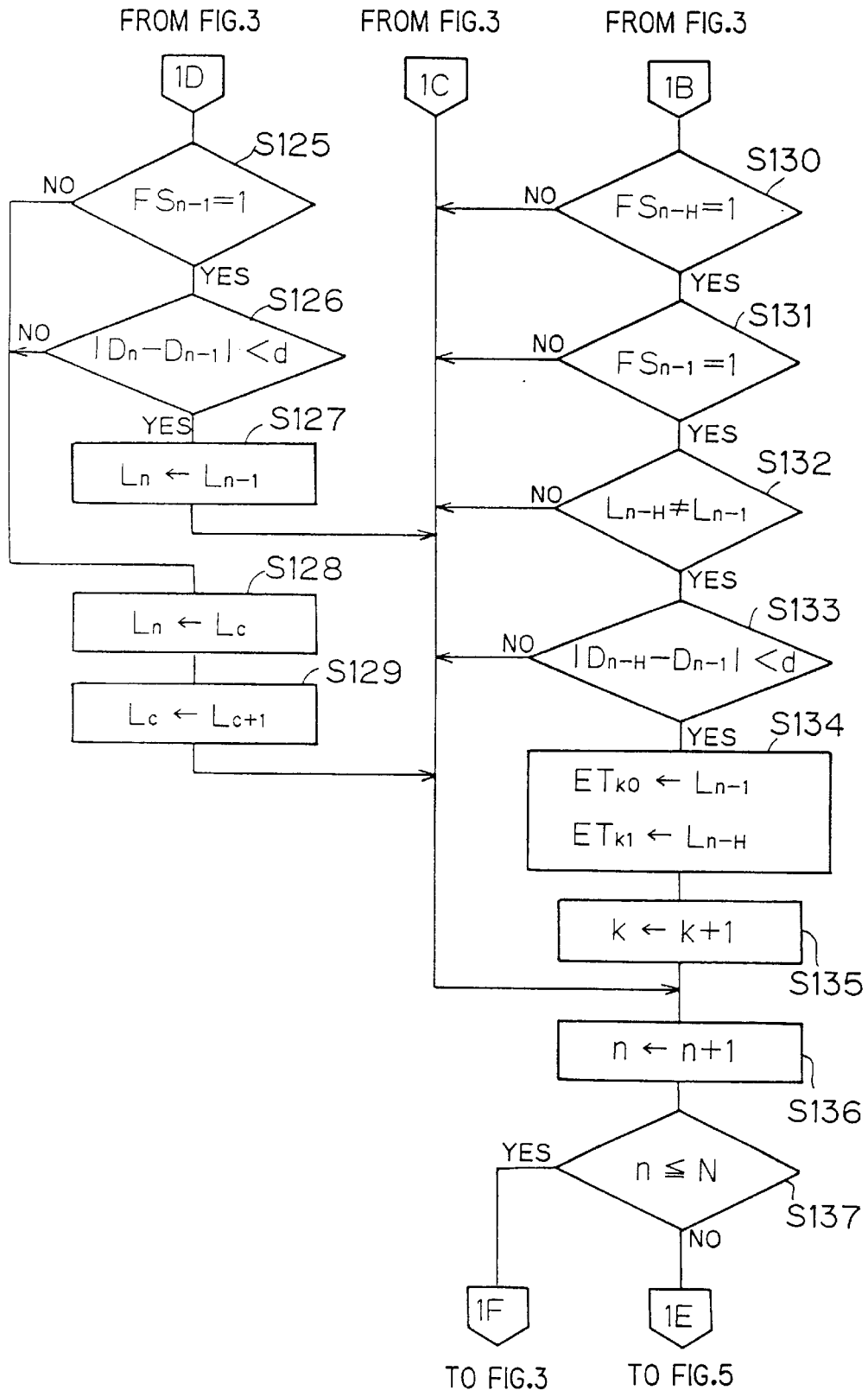

Referring to FIGS. 3 and 4, continuity in density between adjacent blocks having uniform density is evaluated in the process steps S112 to S137. The density continuity is evaluated using a scanning mask shown in FIG. 13. The scanning mask of FIG. 13 covers four adjacent blocks: a block $T_n$ being evaluated; an evaluated block $T_{n-H}$ located on the block $T_n$; an evaluated block $T_{n-1}$ immediately preceding the block $T_n$; and an evaluated block $T_{n-H-1}$ immediately preceding the block $T_{n-H}$.

Figure 13:
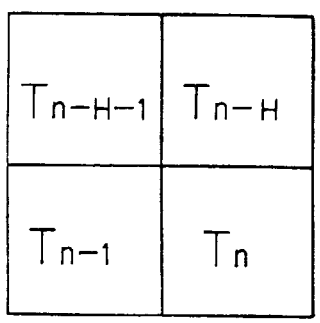
FIG. 13 illustrates a scanning mask.

Prior to the evaluation using the scanning mask of FIG. 13, initialization to the level "1" is performed in the process step S112 on the block number n of the blocks $T_1$ to $T_N$, a table number k of equivalence tables (equi-tables) $ET_{k0}$, $ET_{k1}$, and labels $L_c$ to be assigned sequentially to the blocks $T_n$.

In the process steps S113 and S114, it is judged whether or not the blocks $T_n$ and $T_{n-H-1}$ covered with the scanning mask of FIG. 13 have uniform density. When both of the blocks $T_n$ and $T_{n-H-1}$ have uniform density, the absolute value of the difference between the density average $D_n$ of the block $T_n$ and the density average $D_{n-H-1}$ of the block $T_{n-H-1}$ is compared with a predetermined value d in the process step S115. When the absolute value is less than the predetermined value d, the label $L_n$ of the block $T_n$ is made equal to the label $L_{n-H-1}$ of the block $T_{n-H-1}$ in the process step S116 and then the process proceeds to the process step S136.

The process proceeds to the process step S117 when the block $T_{n-H-1}$ has nonuniform density in the process step S114. The process also proceeds to the process step S117 when the absolute value is not less than the predetermined value d in the process step S115.

It is judged in the process step S117 whether or not the block $T_{n-H}$ has uniform density. When the block $T_{n-H}$ has uniform density, the absolute value of the difference between the density average $D_n$ of the block $T_n$ and the density average $D_{n-H}$ of the block $T_{n-H}$ is compared with the predetermined value d in the process step S118. The label $L_n$ of the block $T_n$ is made equal to the label $L_{n-H}$ of the block $T_{n-H}$ in the process step S119 when the absolute value is less than the predetermined value d.

After the label $L_n$ of the block $T_n$ being evaluated is made equal to the label $L_{n-H}$ of the block $T_{n-H}$ located on the block $T_n$, it is in turn judged in the process step S120 whether or not the block $T_{n-H}$ immediately preceding the block $T_n$ is of uniform density. When the block $T_{n-1}$ is of uniform density, it is then judged in the process step S121 whether or not the label $L_{n-H}$ of the block $T_{n-H}$ is equal to the label $L_{n-1}$ of the block $T_{n-1}$. The process proceeds to the process step S122 when the label $L_{n-H}$ of the block $T_{n-H}$ does not equal the label $L_{n-1}$ of the block $T_{n-1}$.

In the process step S122, the absolute value of the difference between the density average $D_{n-H}$ of the block $T_{n-H}$ and the density average $D_{n-H}$ of the block $T_{n-1}$ is compared with the predetermined value d. When the absolute value is less than the predetermined value d, the labels $L_{n-1}$ and $L_{n-H}$ are recorded in the equivalence tables $ET_{k0}$ and $ET_{k1}$ respectively in the process step S123. The equivalence tables $ET_{k0}$ and $ET_{k1}$ are provided for recording therein two labels which can be equalized with each other.

The labels $L_{n-1}$ and $L_{n-H}$ are recorded in the equivalence tables $ET_{k0}$ and $ET_{k1}$, respectively, when all of the following conditions are satisfied: that the blocks $T_n$, $T_{n-1}$, $T_{n-H}$ all have uniform density; that the label $L_{n-H}$ is equal to the label $L_n$; and that the blocks $T_{n-H}$ and $T_{n-1}$ are continuous in density. This is because the density distribution in the block $T_n$ is similar to that in the blocks $T_{n-1}$ and $T_{n-H}$ when the foregoing conditions are satisfied. After the recording, the table number of the equivalence tables is counted up by one in the process step S124, and then the process proceeds to the process step S136.

The process proceeds to the process step S136 without the recording in the equivalence tables $ET_{k0}$ and $ET_{k1}$ in the following cases: where the block $T_{n-1}$ has nonuniform density in the process step S120; where the label $L_{n-1}$ has been already equal to the label $L_{n-H}$ in the process step S121; and where the absolute value of the difference between the density averages $D_{n-H}$ and $D_{n-1}$ is not less than the predetermined value d in the process step S122.

The process proceeds to the process step S125 when the block $T_{n-H}$ has nonuniform density in the process step S117. The process also proceeds to the process step S125 when the absolute value is not less than the predetermined value d in the process step S118.

It is judged in the process step S125 whether or not the block $T_{n-1}$ has uniform density. When the block $T_{n-1}$ has uniform density, it is judged in the process step S126 whether or not the absolute value of the difference between the density average $D_{n-1}$ of the block $T_{n-1}$ and the density average $D_n$ of the block $T_n$ is less than the predetermined value d. When the absolute value is less than the predetermined value d, the label $L_n$ of the block $T_n$ is made equal to the label $L_{n-1}$ of the block $T_{n-1}$ in the process step S127 and then the process proceeds to the process step S136.

The process proceeds to the process step S128 when the block $T_{n-1}$ has nonuniform density in the process step S125. The process also proceeds to the process step S128 when the absolute value is not less than the predetermined value d in the process step S126, that is, when the block $T_n$ being evaluated, although having uniform density, is continuous in density with neither block $T_{n-H-1}$, $T_{n-H}$ nor $T_{n-1}$ covered with the scanning mask of FIG. 13.

In the process step S128, a new label $L_c$ having been unused as the label $L_n$ is assigned to the block $T_n$ being evaluated. After the use of the new label $L_c$, the value of the label $L_c$ is counted up by one in the process step S129 and then the process proceeds to the process step S136.

The process proceeds to the process step S130 when the block $T_n$ has nonuniform density in the process step S113. It is judged in the process steps S130 to S133 whether or not the label $L_{n-1}$ of the block $T_{n-1}$ immediately preceding the block $T_n$ is permitted to be equalized with the label $L_{n-H}$ of the block $T_{n-H}$ located on the block $T_n$ when the block $T_n$ has nonuniform density.

The labels $L_{n-1}$ and $L_{n-H}$ are permitted to be equalized with each other so that they are recorded in the equivalence tables $ET_{k0}$ and $ET_{k1}$ in the process step S134 when all of the following conditions are satisfied: that the blocks $T_{n-H}$ and $T_{n-1}$ have uniform density in the process steps S130 and S131; that the labels $L_{n-H}$ and $L_{n-1}$ have not been equal in the process step S132; and that the absolute value of the difference between the density average $D_{n-1}$ of the block $T_{n-1}$ and the density average $D_{n-H}$ of the block $T_{n-H}$ is less than the predetermined value d in the process step S133. The table number of the equivalence tables $ET_{k0}$ and $ET_{k1}$ is counted up by one in the process step S135, and the process proceeds to the process step S136.

The process directly proceeds to the process step S136 in the following cases: where one of the blocks $T_{n-1}$ and $T_{n-H}$ has nonuniform density in the process steps S130 and S131; where the labels $L_{n-1}$ and $L_{n-H}$ have been already equal in the process step S132; and where the absolute value is not less than the predetermined value d in the process step S133.

The block number of the block $T_n$ covered with the scanning mask of FIG. 13 is counted up by one in the process step S136. When the updated block number n is not more than N in the process step S137, the process returns to the process step S113 to repeat the routine of the process steps S113 to S136. All of the uniform density blocks are labeled through the routine described hereinabove. The process proceeds to the step S138 when the number n of the block $T_n$ exceeds N in the process step S137.

Figure 5:
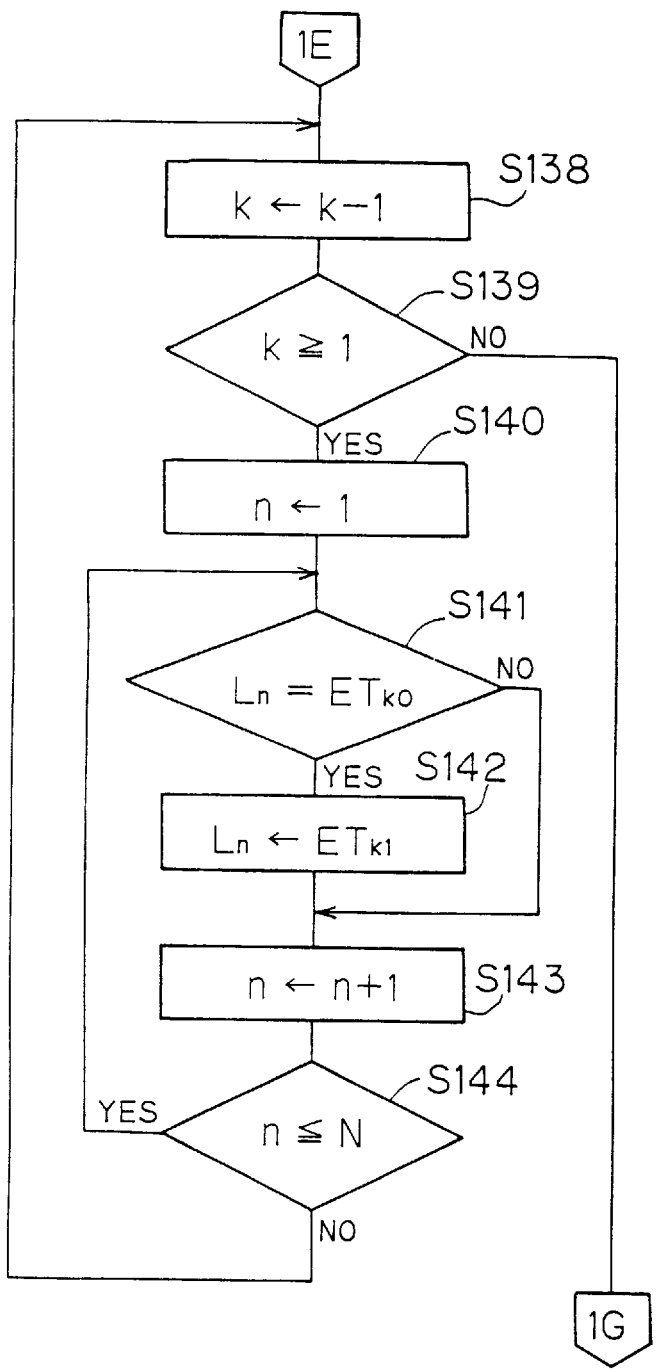

The routine of the process steps S138 to S144 of FIG. 5 is to equalize the labels recorded in the equivalence tables $ET_{k0}$ and $ET_{k1}$ with each other.

The table number k of the equivalence tables $ET_{k0}$ and $ET_{k1}$ is counted down by one in the process step S138. It is judged in the process step S139 whether or not the table number k of the immediately preceding equivalence tables $ET_{k0}$ and $ET_{k1}$ is less than "1". When the table number k is less than "1" or is equal to "0", it is found that the equivalence tables $ET_{k0}$ and $ET_{k1}$ have not been used and then the process proceeds to the process step S145 of FIG. 6.

When the table number k is not less than "1" in the process step S139, the routine of the process steps S140 to S144 is performed. The label $L_n$ of the block $T_n$ is compared with the label recorded in the equivalence table $ET_{k0}$ in the process step S141. The label recorded in the equivalence table $ET_{k1}$ is replaced with the label $L_n$ in the process step S142 when the label recorded in the equivalence table $ET_{k0}$ is equal to the label $L_n$.

On completion of the processing in the process steps S141 and S142 for the blocks $T_1$ to $T_N$, the block number n is counted up by one in the process step S143. The routine of the process steps S141 to S143 is repeated while the block number n is not more than N in the process step S144. When the block number n exceeds N in the process step S144, the process returns to the process step S138. The table number k of the equivalence table $ET_{k0}$ and $ET_{k1}$ is further counted down by one in the process step S138. The routine of the process steps S140 to S144 is repeatedly carried out on the equivalence tables $ET_{k0}$ and $ET_{k1}$ until the table number k becomes less than "1" or equal to "0" in the process step S139.

Figure 6:
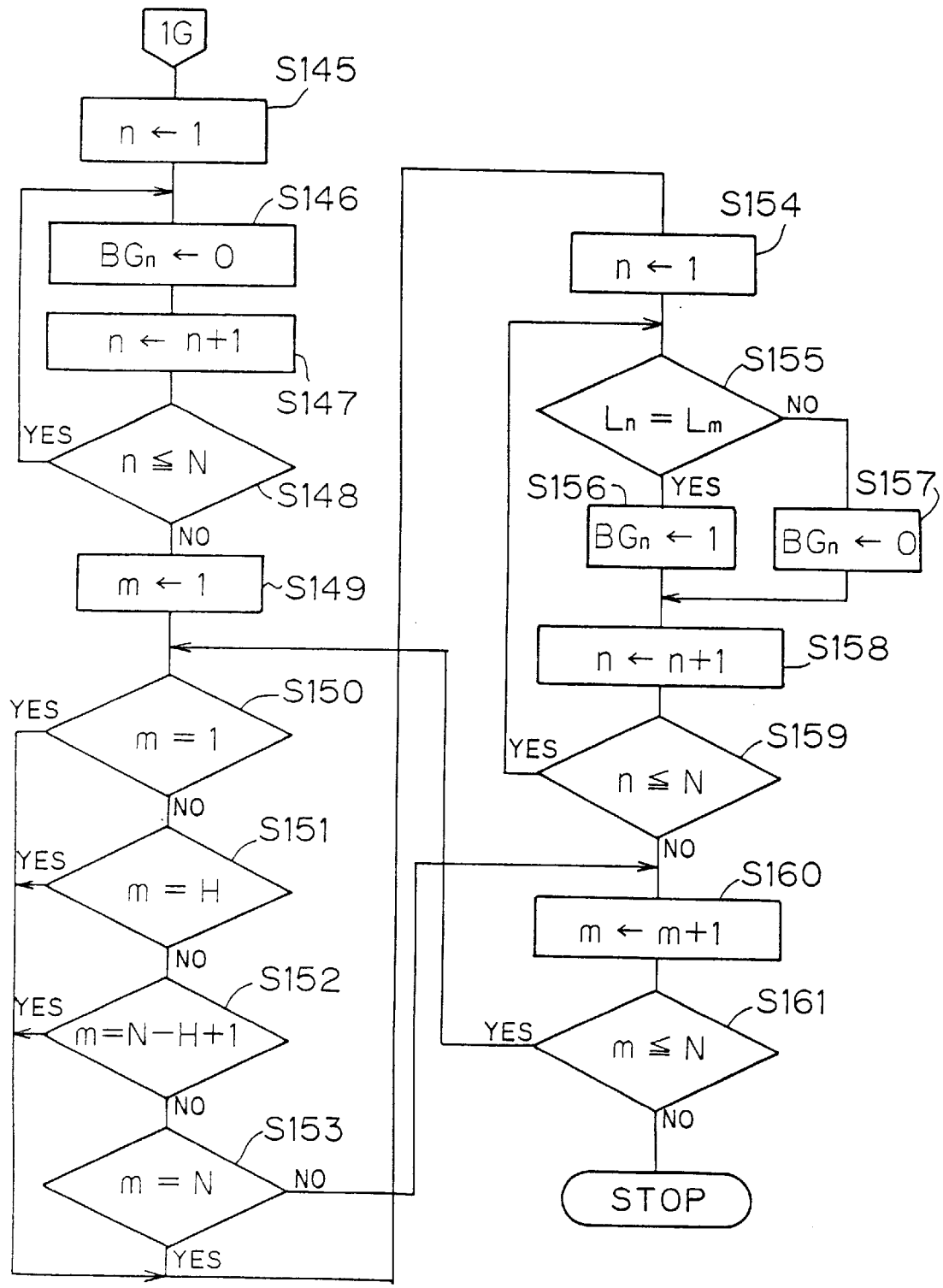

In the routine of the process steps S145 to S161 of FIG. 6 in this preferred embodiment, the block having the same label as the blocks $T_1$, $T_H$, $T_{N-H+1}$, $T_N$ located at the four corners of the original (See FIG. 12) is evaluated as the background block. It is assumed that the blocks located at the four corners of the original are included in the background portion in this preferred embodiment. The routine of the process steps S145 to S148 is to clear a flag $BG_n$ indicating whether or not the block $T_n$ is the background block to the level "0" for all of the blocks $T_n$. The routine of the process steps S149 to S161 will be described below.

A retrieval number m for the background block is set to "1" in the process step S149. It is judged sequentially in the process steps S150 to S153 whether or not the block having the retrieval number m is one of the four-corner blocks $T_1$, $T_H$, $T_{N-H+1}$ and $T_N$ serving as a reference of the background evaluation. When the retrieval number m is "1", it is judged that the block $T_1$ is one of the background evaluation reference blocks $T_1$, $T_H$, $T_{N-H+1}$, $T_N$, and the process proceeds to the process step S154.

The process then proceeds to the process steps S154 to S159. The label $L_m$ or the label $L_1$ of the background evaluation reference block $T_1$ judged in the process step S150 is sequentially compared with the labels $L_n$ of all blocks $T_n$ in the process step S155. The flag $BG_n$ of the block $T_n$ is set to "1" in the process step S156 when $L_n = L_1$, and the flag $BG_n$ thereof is set to "0" in the process step S157 when $L_n \approx L_1$. Then the process proceeds to the process step S158, in which the block number n is counted up by one. The routine of the process steps S155 to S158 is repeated while the block number n is not more than N in the process step S159. The process proceeds to the process step S160 when the block number n exceeds N in the process step S159.

The retrieval number m is counted up by one in the process step S160, so that m=2. The retrieval number m=2 is compared with the block number N in the process step S161. The process returns to the process step S150 since 2≦N.

Subsequently, the routine of the process steps S150 to S161 is repeated for the retrieval number m=2 to N. When the retrieval number m is neither 1, H, N−H+1 nor N, the process jumps from the process step S153 directly to the process step 5160, in which the retrieval number m is counted up by one.

When the retrieval number m is H, N−H+1, or N, the process proceeds to the process step S154 and the routine of the process steps S155 to S159 is repeated similarly to the case of m=1. Specifically, when m=H, the flag $BG_n$ of the block $T_n$ having the label $L_n=L_H$ is set to "1" while the flag $BG_n$ of the block $T_n$ having the label $L_n \approx L_H$ is set to "0". When m=N−H+1, the flag $BG_n$ of the block $T_n$ having the label $L_n=L_{N-H+1}$ is set to "1" while the flag $BG_n$ of the block $T_n$ having the label $L_n \approx L_{N-H+1}$ is set to "0". When m=N, the flag $BG_n$ of the block $T_n$ having the label $L_n=L_N$ is set to "1" while the flag $BG_n$ of the block $T_n$ having the label $L_n \approx L_N$ is set to "0".

The flags $BG_1$ to $BG_N$ of all blocks $T_1$ to $T_N$ are set to "1" or "0" in this manner. The flag $BG_n$ of the block $T_n$ having the same label as one of the background evaluation reference blocks $T_1$, $T_H$, $T_{N-H+1}$ and $T_N$ is set to "1". When the flag $BG_n$ of one block $T_n$ should be set to both "1" and "0" at a time in the routine of the process steps S149 to S161, priority is given to the flag $BG_n$ of "1".

Figure 7:
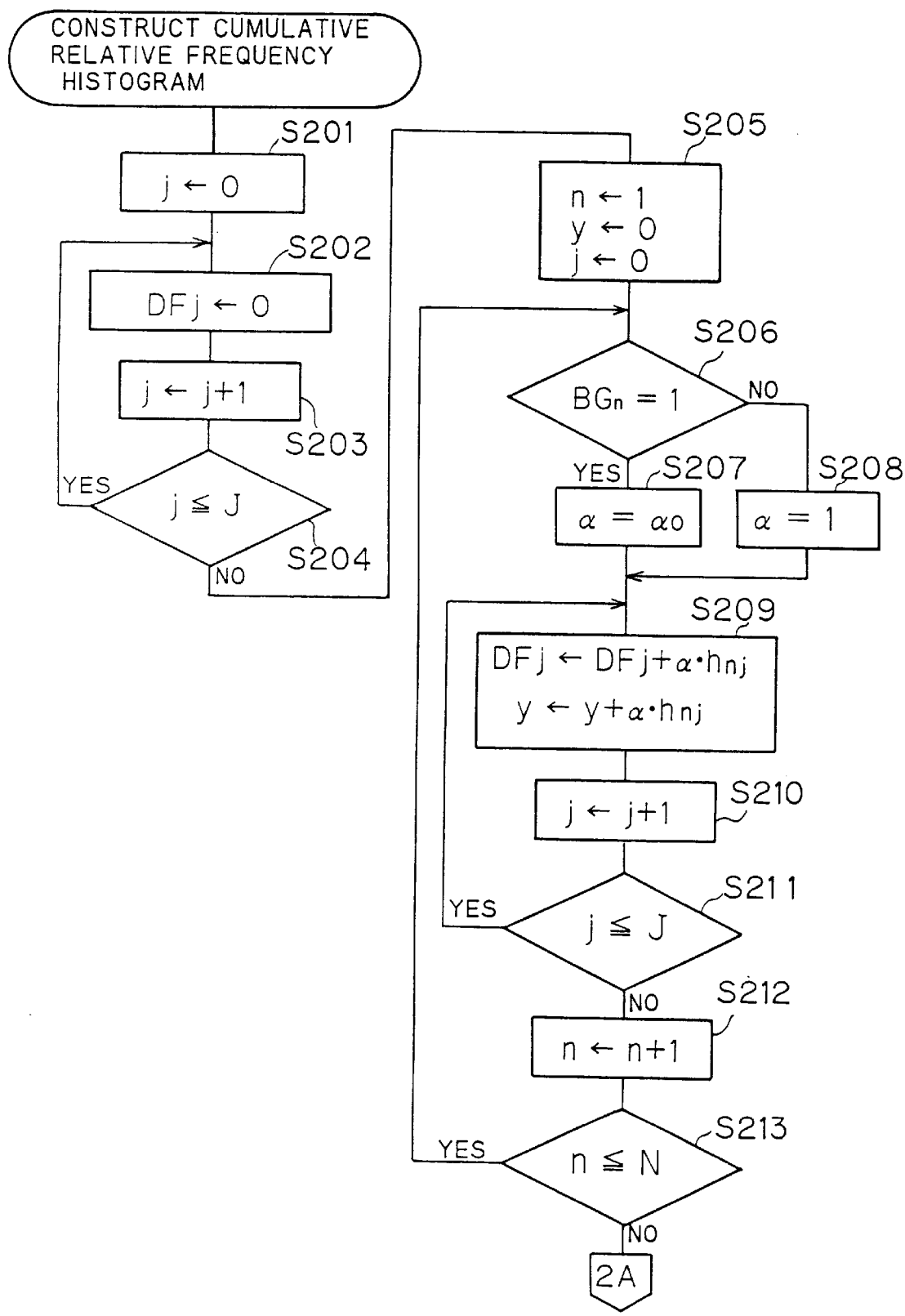
FIGS. 7 and 8 are flow charts showing a process of constructing a cumulative relative frequency histogram.
Figure 8:
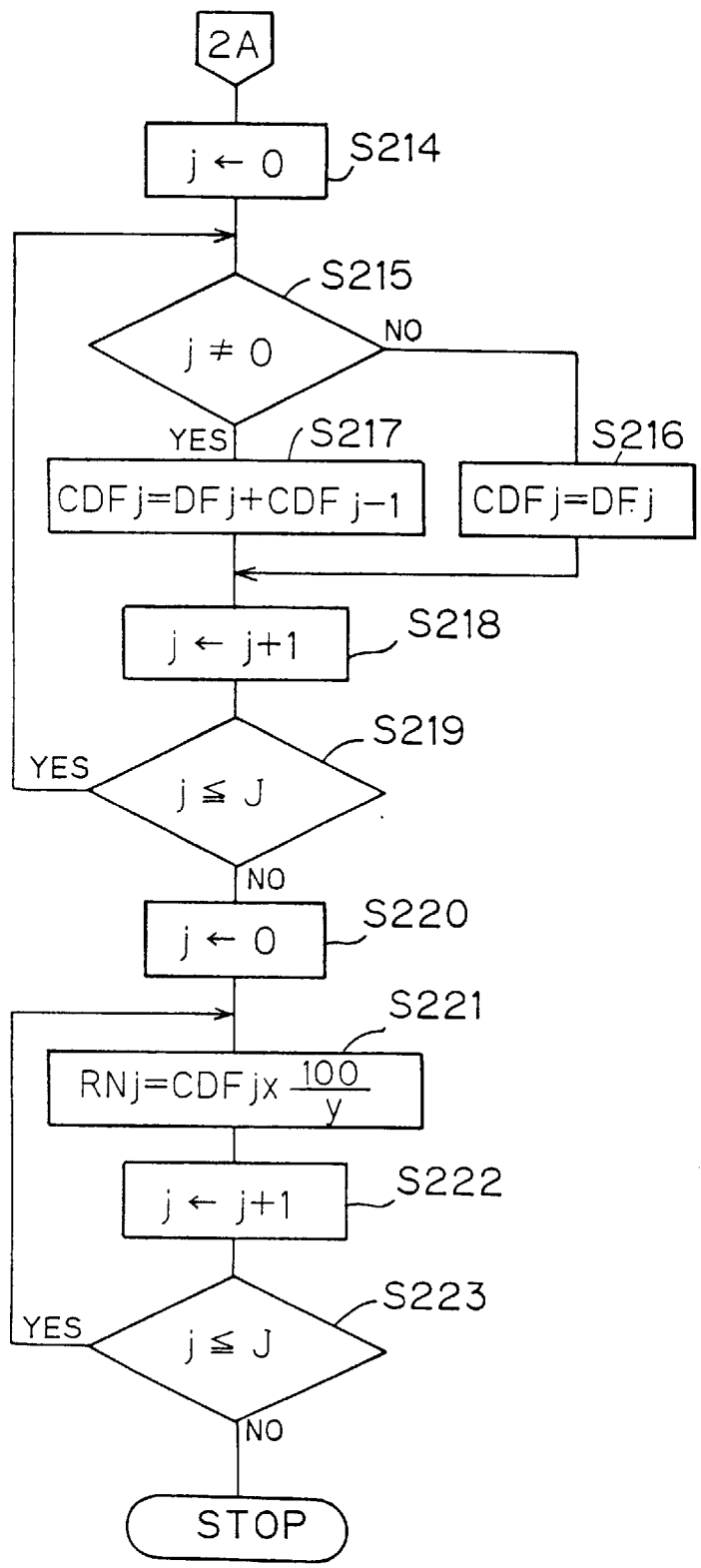

The blocks $T_n$ included in the background portion are detected among the blocks $T_1$ to $T_N$ in this manner through the routine of the process steps S101 to S161. After the detection, the cumulative relative frequency histogram for the whole original image is constructed in the process steps S201 to S223 of FIGS. 7 and 8.

A density histogram for the whole original image is constructed as a function of the respective ranks j of the density histograms $h_{nj}$ for the respective blocks $T_1$ to $T_N$ in the process steps S201 to S213. The number of pixels $DF_j$ for the rank number j (=0 to J) of the density histogram $h_{nj}$ is cleared to "0" in the process steps S201 to S204.

The block number n, the rank number j, and the total number of pixels y are set to "1", "0" and "0", respectively, in the process step S205. The routine of the process steps S206 to S213 is repeated until the block number n exceeds N in the process step S213, so that the number of pixels $DF_j$ for each rank and the total number of pixels y are calculated for the whole original image. The routine of the process steps S206 to S213 will be described below.

It is judged in the process step S206 whether or not the flag $BG_n$ of the block $T_n$ is "1". A coefficient $\alpha=\alpha_0$ (where $0 \leq \alpha_0 < 1$) is selected in the process step S207 when the flag $BG_n$ is "1" or when the block $T_n$ is evaluated as the background block. The coefficient $\alpha=1$ is selected in the process step S208 when the flag $BG_n$ is "0" or when the block $T_n$ is not evaluated as the background block.

In the process steps S209 to S211, the following values are calculated: (1) the number of pixels $DF_j$ for each rank in the image including the blocks $T_1$ to $T_n$; and (2) the total number of pixels y in the image including the blocks $T_1$ to $T_n$.

The routine of the process steps S206 to S211 is repeated, until the block number n is counted up by one in the process step S212 so that n>N in the process step S213.

Detailed description will be given hereinafter on the number of pixels $DF_j$ for each rank and the total number of pixels y to be calculated in the process steps S209 to S211.

When the block number n is 1 and the rank number j is 0, the number of pixels $DF_0$ for the rank number "0" in the image including the block $T_1$ is calculated in the process step S209. The number of pixels $DF_0$ is given by adding the corrected number of pixels $\alpha_1 \cdot h_{10}$ for the corresponding rank to the number of pixels $DF_0$ cleared in the process step S202, that is, $DF_0=DF_0+\alpha_1 \cdot_{10}$, where $\alpha_1$ is the coefficient $\alpha$ of the block $T_1$ selected in the process steps S206 to S208. Since the number of pixels $DF_0$ is "0" in the process step S202, the number of pixels $DF_0$ calculated in the process step S209 is $\alpha_1 \cdot h_{10}$.

After the calculation of the number of pixels $DF_0$, the rank number j is counted up by one in the process step S210. The updated rank number j is compared with the final rank number J in the process step S211. When j≦J in the process step S211, the process returns to the process step S209 to repeat the routine of the process steps S209 to S211. This enables the numbers of pixels $DF_0$ to $DF_J$ for all ranks where n=1 to be calculated sequentially.

When the block number n is 1 and the rank number j is 0, the total number of pixels y is also calculated in the process step S209. The total number of pixels y is given by adding the corrected number of pixels $\alpha_1 \cdot h_{10}$ for the rank number j=0 to the total number of pixels y cleared in the process step S205, that is, $y=y+\alpha_1 \cdot h_{10}$. Since the total number of pixels y is "0" in the process step S205, the total number of pixels y calculated in the process step S209 is $\alpha_1 \cdot h_{10}$.

The rank number j is counted up by one in the process step S210, so that j=1. The process returns to the process step S209 since 1≦J in the process step S211. The total number of pixels y when the rank number j=1 is given in the process step S209 by adding the corrected number of pixels $\alpha_1 \cdot h_{11}$ where the rank number j=1 to the total number of pixels $y=\alpha_1 \cdot h_{10}$ where the rank number j=0, that is, $y=\alpha_1 (h_{10}+h_{11})$. Likewise, the routine of the process steps S209 to S211 is repeated for the rank numbers j=2 to J, to thereby calculate the total number of pixels $y=\alpha_1 (h_{10}+h_{11}+ \ldots +h_{1J})$ in the block $T_1$.

The process proceeds to the process step S212 when j>J in the process step S211. The block number n is counted up by one in the process step S212, so that n=2. Since 2≦N in the process step S213, the process returns to the process step S206. The coefficient $\alpha_2$ for the block number n=2 or the block $T_2$ is selected in the process steps S206 to S208.

The number of pixels $DF_j$ for the rank number j in the image including the blocks $T_1$ and $T_2$ is calculated in the process steps S209 to S211. The number of pixels $DF_j$ is given by adding the corrected number of pixels $\alpha_2 \cdot h_{2j}$ for the corresponding rank in the block $T_2$ to the number of pixels $DF_j=\alpha_1 \cdot h_{1j}$ for each rank calculated when n=1, that is, $DF_j=\alpha_1 \cdot h_{1j}+\alpha_2 \cdot h_{2j}$. The corrected number of pixels $\alpha_2 \cdot h_{2j}$ is sequentially added to the total number of pixels $y=\alpha_1 (h_{10}+h_{11}+ \ldots +h_{1j})$ calculated when n=1, in the process step S209. The routine of the process steps S209 to S211 is repeated until j>J in the process step S211, to thereby calculate the total number of pixels $y=\alpha_1 (h_{10}+h_{11}+ \ldots +h_{1J})+\alpha_2 (h_{20}+h_{21}+ \ldots +h_{2J})$ in the image including the blocks $T_1$ and $T_2$.

Subsequently, the routine of the process steps S206 to S213 is repeated similarly for the block numbers n=3 to N, to thereby calculate the number of pixels $DF_j$ for each rank and the total number of pixels y for the whole original represented by Equations 4 and 5:

$$DF_j=\alpha_1 \cdot h_{1j}+\alpha_2 \cdot h_{2j}+ \ldots +\alpha_N \cdot h_{Nj} \qquad (Eq.4)$$

$$y = \alpha_1 \cdot (h_{10} + \ldots + h_{1J}) + \alpha_2 \cdot (h_{20} + \ldots + h_{2J}) + \ldots + \alpha_N \cdot (h_{N0} + \ldots + h_{NJ}) \quad \text{(Eq.5)}$$

The number of pixels $DF_j$ for each rank in the whole original is determined in this manner, whereby the density histogram for the whole original image is constructed. It is apparent from Equations 4 and 5 that the number of pixels in the background blocks detected in the process steps S101 to S161 is made reduced or neglected while the number of pixels in the non-background blocks are maintained since the coefficient $\alpha_0$ selected in the process step S207 is within the range of $0 \leq \alpha_0 < 1$.

The cumulative number of pixels $CDF_j$ ($CDF_1$ to $CDF_J$) for each rank j in the whole original image is calculated in the process steps S214 to S219. The rank number j is initialized to "0" in the process step S214 and then the process proceeds to the process step S215. The process proceeds to the process step S216 when j=0 in the process step S215, and the process proceeds to the process step S217 when j≠0 in the process step S215.

The number of pixels $DF_0$ for the rank number j=0 is converted into the cumulative number of pixels $CDF_0$ in the process step S216. In the process step S217, the cumulative number of pixels $CDF_{j-1}$ for the rank number j-1 is added to the number of pixels $DF_j$ for the rank number j to determine the cumulative number of pixels $CDF_j$ for the rank number j. The rank number j is counted up by one in the process step S218. The process returns to the process step S215 when the updated rank number j is not more than J in the process step S219. The process proceeds to the process step S220 when the updated rank number j is more than J in the process step S219.

The routine of the process steps S214 to S219 permits the cumulative number of pixels $CDF_1$ for the rank number j=1 to be given by adding the number of pixels $DF_1$ for the rank number j=1 to the cumulative number of pixels $CDF_0$ for the rank number j=1-1=0. Subsequently, the cumulative numbers of pixels $CDF_2$, $CDF_3$, . . . $CDF_j$ are sequentially calculated in the ascending order of the rank number j.

A relative frequency $RN_j$ (%) of the cumulative number of pixels $CDF_j$ for each rank with respect to the total number of pixels y in the whole original image is calculated in the process steps S220 to S223. The rank number j is initialized to "0" in the process step S220. In the process step S221, the relative frequency $RN_j$ (%) is calculated from the cumulative number of pixels $CDF_j$ calculated in the process steps S214 to S219 and the total number of pixels y in the whole original image as $RN_j = CDF_j \times 100/y$. The rank number j is counted up by one in the process step S222. The updated rank number j is compared with the final rank number J in the process step S223. The routine of the process steps S221 to S223 is repeated until j>J to thereby determine the relative frequency $RN_j$ for all ranks.

Figure 14:
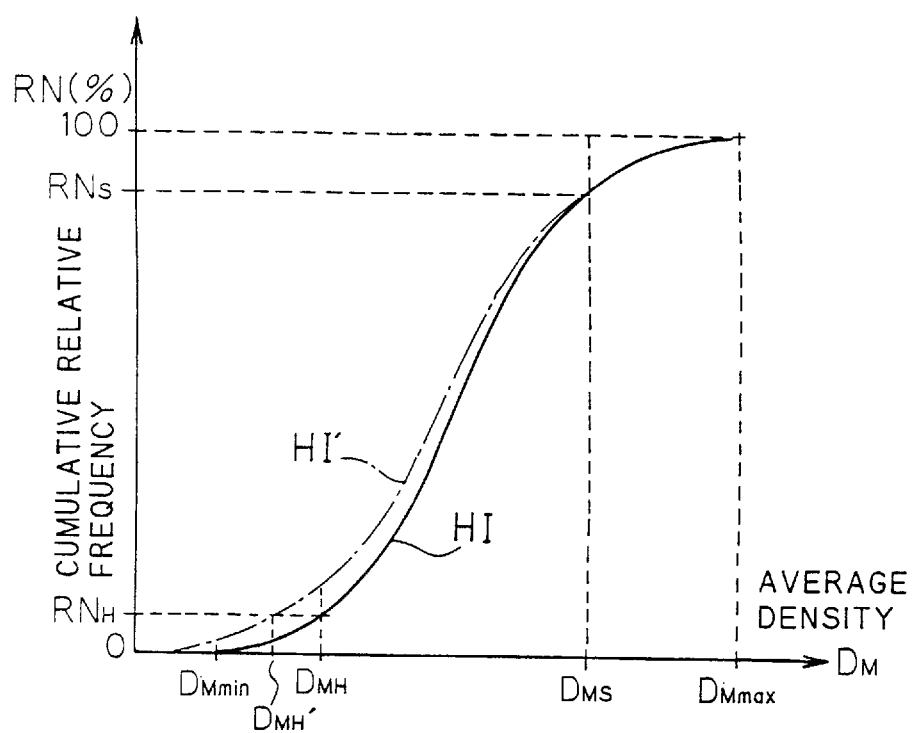
FIG. 14 shows the cumulative relative frequency histogram.

FIG. 14 shows the cumulative relative frequency histogram, the abscissa thereof being a rank value $DM_j$ (j=0 to J) of the average density, the ordinate thereof being the relative frequency $RN_j$ calculated in the process steps S220 to S223. In the histogram of FIG. 14, the relative frequency varies from 0% to 100% with respect to the average density ranging from a minimum generated density $D_{Mmin}$ to a maximum generated density $D_{Mmax}$. With a sufficiently small rank width, the histogram of FIG. 14 is represented approximately in the form of a curve.

Figure 9:
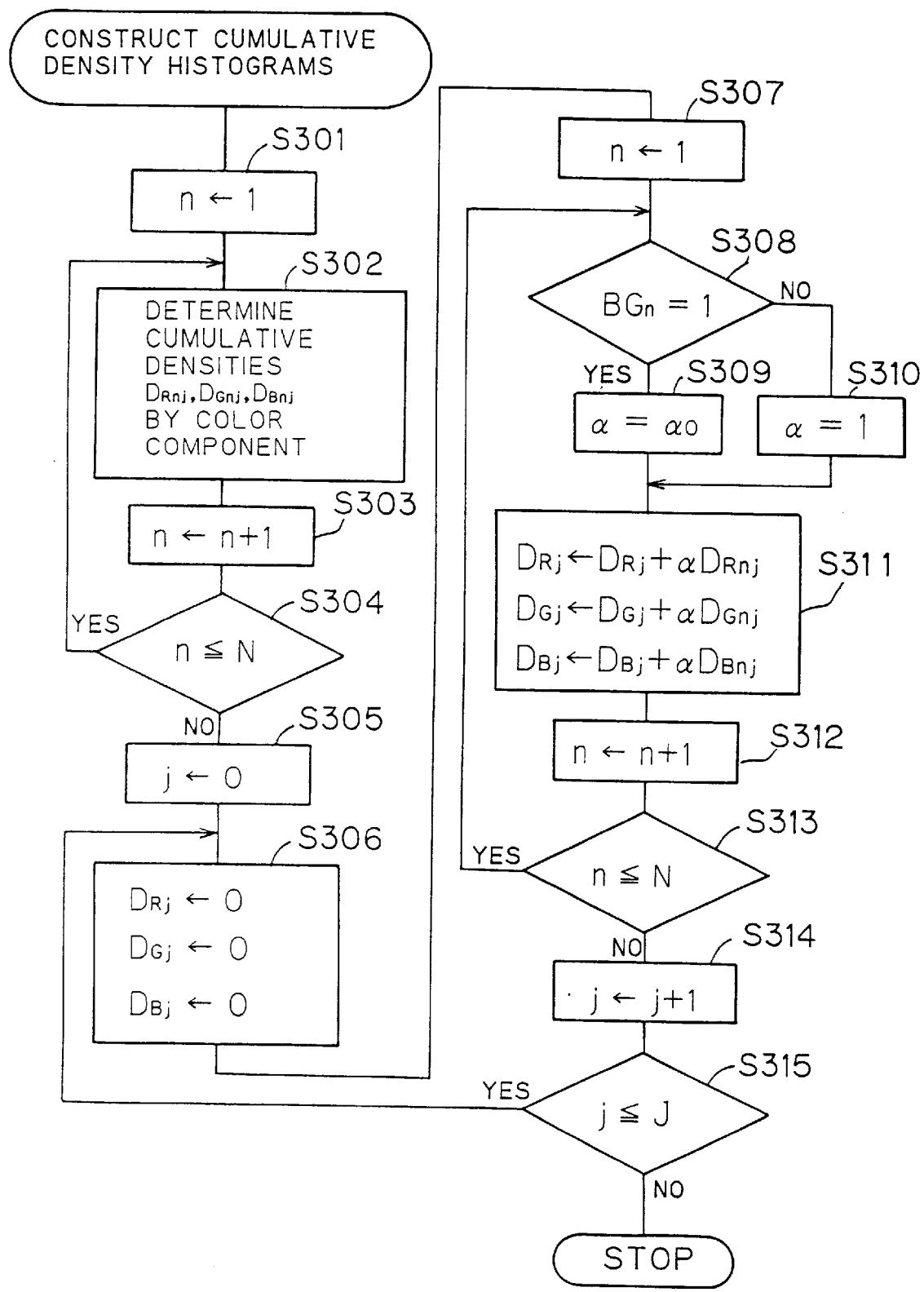
FIG. 9 is a flow chart showing a process of constructing a cumulative density histogram for each color component.

The cumulative density histograms by color component are constructed in the process steps S301 to S315 of FIG. 9.

In the process steps S301 to S304, cumulative densities $D_{Rnj}$, $D_{Gnj}$, $D_{Bnj}$ for respective color components are determined for each block $T_n$ as a function of the density histogram $h_{nj}$ for each block $T_n$ provided in the process step S103 of FIG. 2. Specifically, the densities of the pixels included in each rank in the density histogram $h_{nj}$ are extracted to add up the densities for each color component. This processing is carried out independently for each rank.

In the process steps S305 to S313, the cumulative density for the rank number j in the whole original image is calculated. The rank number j is initialized to "0" in the process step S305. The cumulative densities $D_{Rj}$, $D_{Gj}$, $D_{Bj}$ in the whole original image are cleared to "0" in the process step S306. The block number n is set to "1" in the process step S307.

The routine of the process steps S308 to S310 is similar to that of the process steps S206 to S208. It is judged in the process step S308 whether or not the flag $BG_n$ for the block $T_n$ is "1". The coefficient $\alpha = \alpha_0$ is selected in the process step S309 when the flag $BG_n$ is "1". The coefficient $\alpha = 1$ is selected in the process step S310 when the flag $BG_n$ is "0".

In the process step S311, values $\alpha \cdot D_{Rnj}$, $\alpha \cdot D_{Gnj}$, $\alpha \cdot D_{Bnj}$ are added to the calculated cumulative densities $D_{Rj}$, $D_{Gj}$, $D_{Bj}$, respectively. The block number n is counted up by one in the process step S312. It is judged in the process step S313 whether or not the updated block number n is more than N. The process returns to the process step S308 when the block number n is not more than N. The routine of the process steps S308 to S313 is repeated until the block number n exceeds N in the process step S313.

This affords the determination of the cumulative densities:

$$D_{Rj} = \alpha_1 \cdot D_{R1j} + \alpha_2 \cdot D_{R2j} + \ldots + \alpha_N \cdot D_{RNj},$$

$$D_{Gj} = \alpha_1 \cdot D_{G1j} + \alpha_2 \cdot D_{G2j} + \ldots + \alpha_N \cdot D_{GNj},$$

$$D_{Bj} = \alpha_1 \cdot D_{B1j} + \alpha_2 \cdot D_{B2j} + \ldots + \alpha_N \cdot D_{BNj}$$

for each rank in the whole original image, where the coefficients $\alpha_1, \alpha_2, \ldots \alpha_N$ are 1 or $\alpha_0$.

The rank number j is counted up by one in the process step S314. It is judged in the process step S315 whether or not the updated rank number j is more than J. The routine of the process steps S306 to S313 is repeated until the rank number j exceeds J in the process step S315. Thus the cumulative densities for all ranks j=0 to J in the whole original image are calculated in the process steps S305 to S315. The cumulative density histograms for the respective color components in the whole original image are constructed as shown in FIGS. 15A to 15C by using the calculated cumulative densities.

Figure 15A:
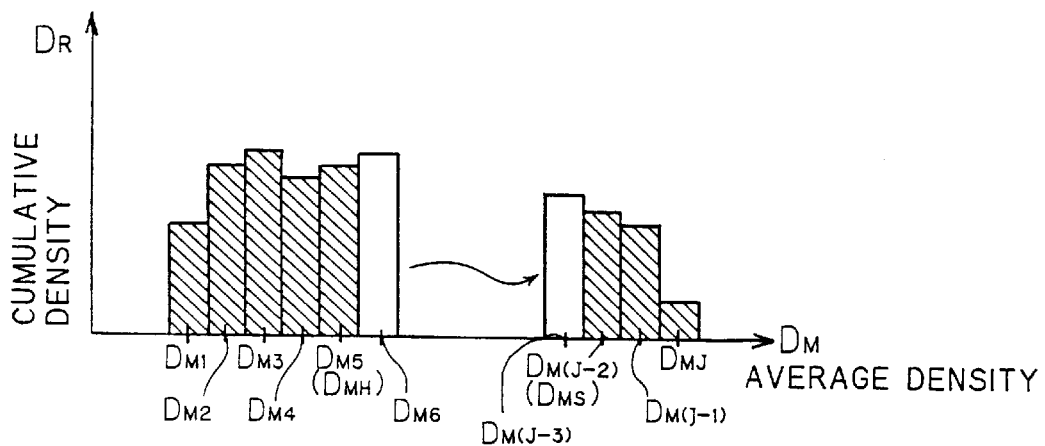
FIGS. 15A to 15C show the cumulative density histograms for respective color components.
Figure 15B:
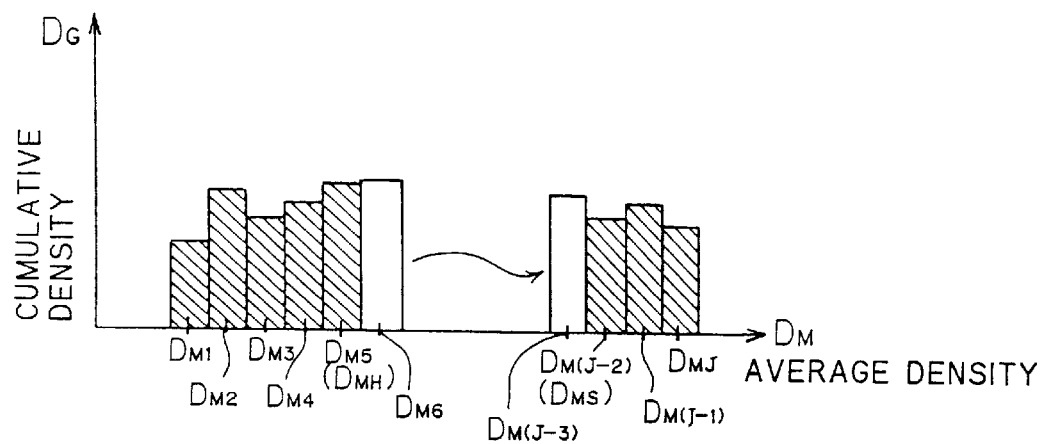
Figure 15C:
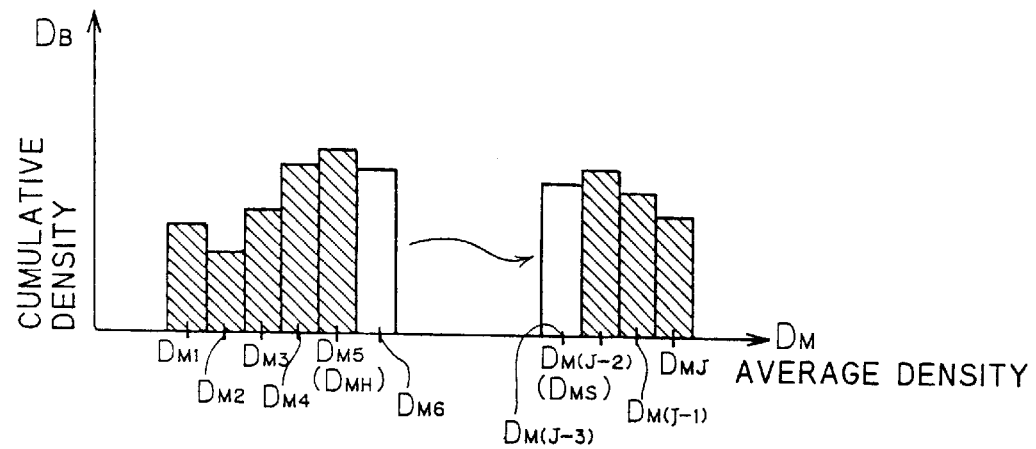

The number of pixels $P_j$ for each rank in the cumulative density histograms for respective color components of FIGS. 15A to 15C is given using the number of pixels $P_{nj}$ corresponding to the rank value $D_{Mj}$ for each block $T_n$ as:

$$P_j = \alpha_1 \cdot P_{1j} + \alpha_2 \cdot P_{2j} + \ldots + \alpha_N \cdot P_{Nj}.$$

Then the highlight and shadow points for the gradation curves are determined as a function of the cumulative relative frequency histogram of FIG. 14 and the cumulative density histograms by color component of FIGS. 15A to 15C.

Cumulative density appearance rates $RN_H$, $RN_S$ corresponding to the highlight and shadow points HL, SD providing optimum gradation conversion characteristics are obtained experimentally from, for example, a multiplicity of prepared reference originals. The cumulative density appearance rates $RN_H$, $RN_S$ are applied to the cumulative relative frequency histogram of FIG. 14 produced through the routine of the process steps S201 to S223, to determine tentative highlight and shadow average densities $D_{MH}$ and $D_{MS}$ corresponding to the highlight and shadow points HL and SD, respectively. The cumulative density appearance rates $RN_H$, $RN_S$ are about 1% and 98%, respectively. The determined tentative highlight and shadow average densities $D_{MH}$ and $D_{MS}$ are applied to the cumulative density histograms for respective color components of FIGS. 15A to 15C.

The ranks shaded with oblique lines in the cumulative density histograms of FIGS. 15A to 15C are included in the regions in which the average density is not more than the tentative highlight average density $D_{MH}$ ($D_{Mmin} \leq D_M \leq D_{MH}$) on the highlight side and in which the average density is not less than the tentative shadow average density $D_{MS}$ ($D_{MS} \leq D_M \leq D_{Mmax}$) on the shadow side. In the example of FIGS. 15A to 15C, the rank values $DM_{M5}$ and $D_{M(J-2)}$ are set as the tentative highlight and shadow average densities $D_{MH}$ and $D_{MS}$, respectively.

As an example, the processing for the color component R is described. The cumulative densities $D_{R1}$ to $D_{R5}$ corresponding to the rank values $D_{M1}$ to $DM_{M5}$ are added up in the whole original. The numbers of pixels $P_{R1}$ to $P_{R5}$ within a range corresponding to the rank values $D_{M1}$ to $D_{M5}$ are added up. An input highlight density $D_{RH}$ for the color component R is given from the two sums as:

$$D_{RH} = \frac{D_{R1} + D_{R2} + \ldots + D_{R5}}{P_{R1} + P_{R2} + \ldots + P_{R5}} \quad \text{(Eq. 6)}$$

The similar processing is carried out on the shadow side, so that an input shadow density $D_{RS}$ is given as:

$$D_{RS} = \frac{D_{R(J-2)} + D_{R(J-1)} + D_{RJ}}{P_{R(J-2)} + P_{R(J-1)} + P_{RJ}} \quad \text{(Eq. 7)}$$

The cumulative densities $D_{R(J-2)}$, $D_{R(J-1)}$, $D_{RJ}$ and the numbers of pixels $P_{R(J-2)}$, $P_{R(J-1)}$, $P_{RJ}$ are given in corresponding relation to the rank values $D_{M(J-2)}$, $D_{M(J-1)}$, $D_{MJ}$ respectively similar to those on the highlight side.

Likewise, input highlight densities $D_{GH}$, $D_{BH}$ and input shadow densities $D_{GS}$, $D_{BS}$ are determined for the color components G, B, although the detailed description thereof is omitted herein.

Description will be given hereinafter on "setup" to be performed using the input highlight densities $D_{RH}$, $D_{GH}$, $D_{BH}$ and input shadow densities $D_{RS}$, $D_{GS}$, $D_{BS}$.

It is assumed that the original depicts a scene having a bright background. A cumulative relative frequency histogram HI is produced through the routine of the process steps S201 to S223 of the preferred embodiment and is indicated by the solid curve of FIG. 14. A cumulative relative frequency histogram HI' is produced by the conventional method, in which the background and non-background portions are made under the same conditions, and is indicated by the dashed-and-dotted curve of FIG. 14. The cumulative relative frequency histogram HI is shown in FIG. 14 as shifted throughout toward the high-density side as compared with the cumulative relative frequency histogram HI'. This is because the coefficient $\alpha_0$ which is less than "1" is multiplied by the number of pixels for each rank in the block $T_n$ in the background portion detected in the process steps S101 to S161 for determining the cumulative number of pixels $CDF_j$ for each rank in the whole original image in the process step S209 in this preferred embodiment. Multiplying the coefficient $\alpha_0$ which is less than "1" by the number of pixels for each rank in the block $T_n$ in the bright background portion enables the level of the lower-density ranks to be suppressed in the average density histogram for the whole original image, so that the cumulative relative frequency histogram is necessarily shifted throughout toward the high-density side.

The highlight-side cumulative density appearance rate $R_{NH}$ is applied to the cumulative relative frequency histogram shown in FIG. 14. The tentative highlight average density $D_{MH}$ determined using the cumulative relative frequency histogram HI is higher than a tentative highlight average density $D_{MH}'$ determined using the cumulative relative frequency histogram HI'. Hence the input highlight density $D_{RH}$ for the color component R given by Equation 6 as a function of the tentative highlight average density $D_{MH}$ and the input highlight densities $D_{GH}$, $D_{BH}$ for the color components G, B given by the similar equations are higher than input highlight densities $D_{RH}'$, $D_{GH}'$, $D_{BH}'$ given as a function of the tentative highlight average density $D_{MH}'$ by the conventional method.

It should be noted that the cumulative relative frequency histogram HI made by the method of this preferred embodiment and indicated by the solid curve of FIG. 14 approximately coincides, in a region short of the 100% relative frequency, with the cumulative relative frequency histogram HI' made by the conventional method and indicated by the dashed-and-dotted curve of FIG. 14. Hence the tentative shadow average density $D_{MS}$ determined when the shadow-side cumulative density appearance rate $R_{NS}$ is applied to the cumulative relative frequency histogram of the preferred embodiment is very approximate to a tentative shadow average density $D_{MS}'$ determined when the cumulative density appearance rate $R_{NS}$ is applied to the cumulative relative frequency histogram made by the conventional method. For convenience, the tentative shadow average densities $D_{MS}$ and $D_{MS}'$ are assumed to be equal hereinafter. The input shadow density $D_{RS}$ for the color component R given by Equation 7 as a function of the tentative shadow average density $D_{MS}$ and the input shadow densities $D_{GS}$, $D_{BS}$ for the color components G, B given by the similar equations are also assumed to be equal to input shadow densities $D_{RS}'$, $D_{GS}'$, $D_{BS}'$ given as a function of the tentative shadow average density $D_{MS}'$, respectively.

Figure 16:
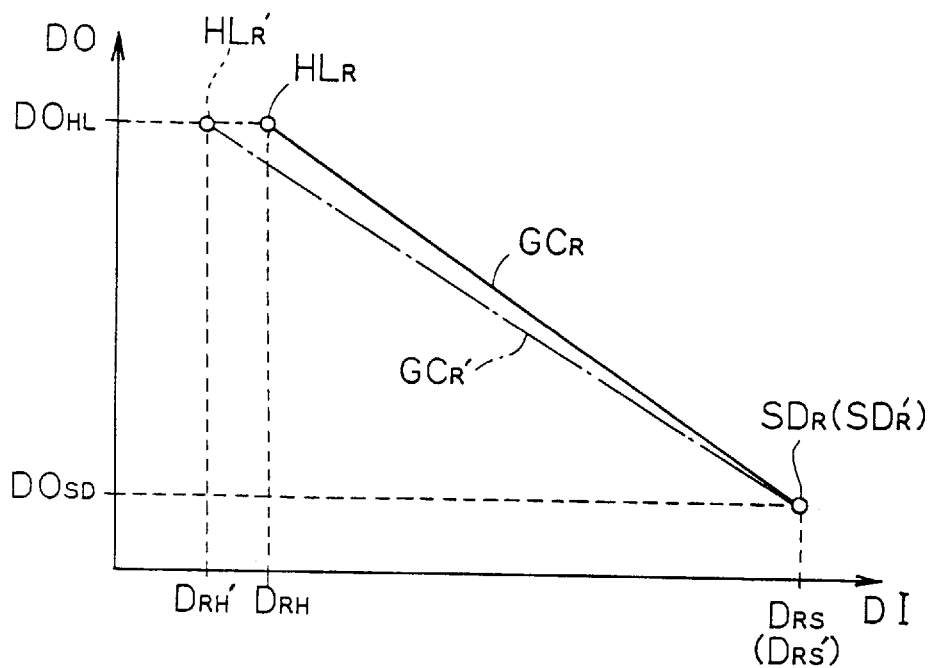
FIG. 16 is a graph showing gradation curves.

FIG. 16 is a graph showing gradation curves $GC_R$ and $GC_R'$. The gradation curve $GC_R$ is established using the input highlight density $D_{RH}$ and input shadow density $D_{RS}$ for the color component R by the method of the preferred embodiment. The gradation curve $GC_R'$ is established using the input highlight density $D_{RH}'$ and input shadow density $D_{RS}'$ by the conventional method. The abscissa of the graph is an input density DI which is inputted for each color component, and the ordinate thereof is an output density DO. An output highlight density $DO_{HL}$ and an output shadow density $DO_{SD}$ are fixed in common to all color components. For convenience, it is assumed herein that the input highlight densities $D_{RH}$, $D_{GH}$, $D_{BH}$ are higher by the same amount than the input highlight densities $D_{RH}'$, $D_{GH}'$ $D_{BH}'$ respectively and that $D_{RH}=D_{GH}=D_{BH}$, $D_{RH}'=D_{GH}'=D_{BH}'$. It is also assumed that the input shadow densities $D_{RS}$, $D_{GS}$, $D_{BS}$ are equal to each other and that the input shadow densities $D_{RS}'$, $D_{GS}'$, $D_{BS}'$ are equal to each other. In this case, the gradation curves $GC_G$ and $GC_B$ for the color components G and B coincide with the gradation curve $GC_R$ for the color component R shown in FIG. 16, and the gradation curves $GC_G'$ and $GC_B'$ coincide with the gradation curve $GC_R'$ shown in FIG. 16.

It is apparent from FIG. 16 that a highlight point $HL_R$ corresponding to the input highlight density $D_{RH}$ is located in rightwardly translated relation to a highlight point $HL_R'$ corresponding to the input highlight density $D_{RH}'$. As above described, the input shadow density $D_{RS}$ is equal to the input shadow density $D_{RS}'$. Hence a shadow point $SD_R$ corresponding to the input shadow density $D_{RS}$ coincides with a shadow point $SD_R'$ corresponding to the input shadow density $D_{RS}'$.

The gradation curve $GC_R$ is drawn above the gradation curve $GC_R'$ or closer to the output highlight density $DO_{HL}$ than the gradation curve $GC_R'$. Since the gradation curves $GC_R$, $GC_G$, $GC_B$ coincide with each other and the gradation curves $GC_R'$, $GC_G'$, $GC_B'$ coincide with each other as above mentioned, the gradation curve $GC_G$ is drawn closer to the output highlight density $DO_{HL}$ than the gradation curve $GC_G'$ and the gradation curve $GC_B$ is drawn closer to the output highlight density $DO_{HL}$ than the gradation curve $GC_B'$. When the same input density DI is converted, the output density DO given by means of the gradation curves $GC_R$, $GC_G$, $GC_B$ is closer to the output highlight density $DO_{HL}$ than that given by means of the gradation curves $GC_R'$, $GC_G'$, $GC_B'$.

It will be evident from the above description that, when the original depicts the scene having the bright background, the setup using the input highlight densities $D_{RH}'$, $D_{GH}'$, $D_{BH}'$ and input shadow densities $D_{RS}'$, $D_{GS}'$, $D_{BS}'$ of the preferred embodiment permits the output density DO in the highlight region to be closer to the output highlight density $DO_{HL}$ than the setup using the input highlight densities $D_{RH}'$, $D_{GH}'$, $D_{BH}'$ and input shadow densities $D_{RS}'$, $D_{GS}'$, $D_{BS}'$ of the prior art. Therefore, the reproduced image of the preferred embodiment is finished more brightly.

When the original depicts a scene having a dark background, the input shadow densities $D_{RS}$, $D_{GS}$, $D_{BS}$ are lower than the input shadow densities $D_{RS}'$, $D_{GS}'$, $D_{BS}'$, although the detailed description thereof is omitted herein. In this case, the gradation curve $GC_R$ is drawn below the gradation curve $GC_R'$ or closer to the output shadow density $DO_{SD}$ than the gradation curve $GC_R'$. When the same input density DI is converted, the output density DO given by means of the gradation curve $GC_R$ is closer to the output shadow density $DO_{SD}$ than that given by means of the gradation curve $GC_R'$. Thus the establishment of the input shadow densities $D_{RS}$, $D_{GS}$, $D_{BS}$ according to the preferred embodiment provides for the reproduced image which is less whitish than the prior art reproduced image when the original depicts the scene having the dark background.

The gradation curve is not limited to the linear gradation curve shown in FIG. 16 but may be a suitable curve.

In the preferred embodiment, the density histogram for each block $T_n$ obtained in the process step S103 is the density histogram of the average density provided for each pixel by averaging the densities by color component. The average density may be replaced with a lightness given by the weighted average of the respective color component densities. Alternatively, the density histogram may be that of the densities by color component. In this case, the density histograms for all of the color components R, G, B may be constructed. Otherwise, only the density histogram for one of the color components which is pre-selected may be constructed. For constructing the density histograms for all of the color components, the cumulative relative frequency histogram made in the steps S201 to S223 and the cumulative density appearance rates $RN_H$, $RN_S$ are determined for each color component.

Then the input highlight densities $D_{RH}$, $D_{GH}$, $D_{BH}$ and input shadow densities $D_{RS}$, $D_{GS}$, $D_{BS}$ are determined as a function of the cumulative density appearance rates $RN_H$, $RN_S$ for each color component and the cumulative density histograms given in the process steps S301 to S315. For constructing the density histogram for the one pre-selected color component, on the other hand, only the cumulative density histogram for the corresponding color component should be made in the process steps S301 to S315.

In the preferred embodiment, it is judged in the process steps S115, S118, S122, S126 and S133 that the two adjacent blocks having the uniform density are continuous in density when the difference in density average between the two blocks is less than the predetermined value d. In these process steps, the continuity in density between the two blocks may be judged when the density dispersion value of the total two blocks is not more than a predetermined value.

The coefficient $\alpha$ is $\alpha_0$ ($\alpha_0<1$) when the block $T_n$ is the background block and is "1" when the block $T_n$ is the non-background block, in the process steps S206 to S208 in the preferred embodiment. Alternatively, the coefficient $\alpha$ may be "1" when the block $T_n$ is the background block and be $\alpha_0'$ ($\alpha_0'>1$) when the block $T_n$ is the non-background block. The similar relative frequency $RN_j$ is provided in the process step S221 when $\alpha_0=1/\alpha_0'$.

The present invention is applicable not only to process scanners but also to copying machine and facsimile apparatus having gradation repeatability.

The background evaluation reference blocks are not limited to the blocks located at the four corners of the original but may be the blocks located at two upper corners thereof or other blocks.

Furthermore, the scanning reader is not required to prescan when the image information of the original is previously stored in a mass storage. The image data may be directly read out and used from the mass storage.

<Second Preferred Embodiment>

Figure 20:
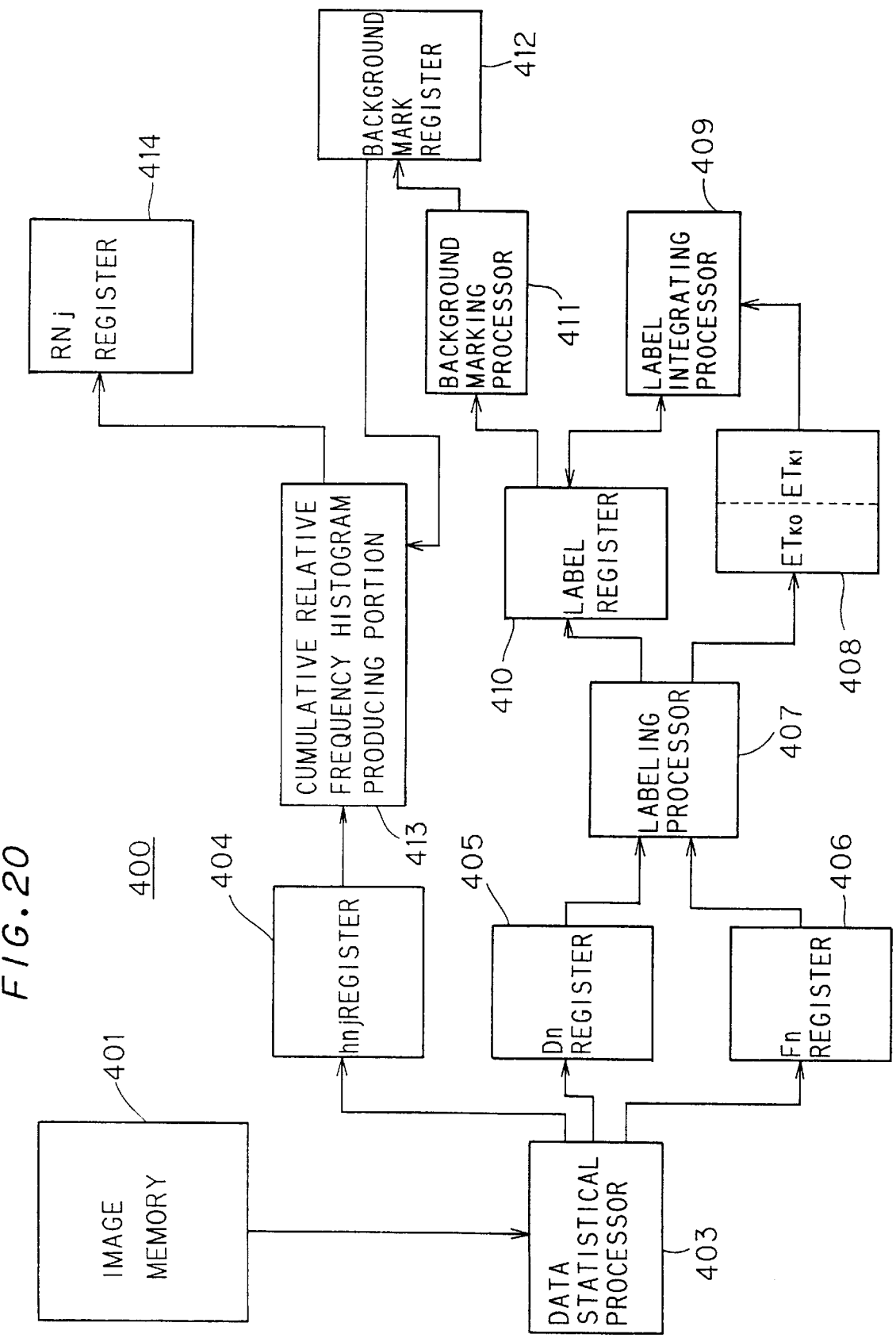
FIG. 20 is a block diagram of the highlight and shadow points establishing portion 400 according to a second preferred embodiment of the present invention.

FIG. 20 is a block diagram showing the internal structure of the highlight and shadow points establishing portion 400 (FIG. 10) according to a second preferred embodiment of the present invention. In the second preferred embodiment, the highlight and shadow points establishing portion 400 is constructed as a combination of hardware circuits. The construction other than the portion 400 is the same as the first preferred embodiment. In the following, only the operations of the hardware circuits in the portion 400 will be described for the second preferred embodiment.

For construction of the cumulative relative frequency histogram, the highlight and shadow points establishing portion 400 includes a data statistical processor 403, as shown in FIG. 20. The operation thereof achieved by means of the CPU 402 (FIG. 11), a console not shown and the like.

Figure 21:
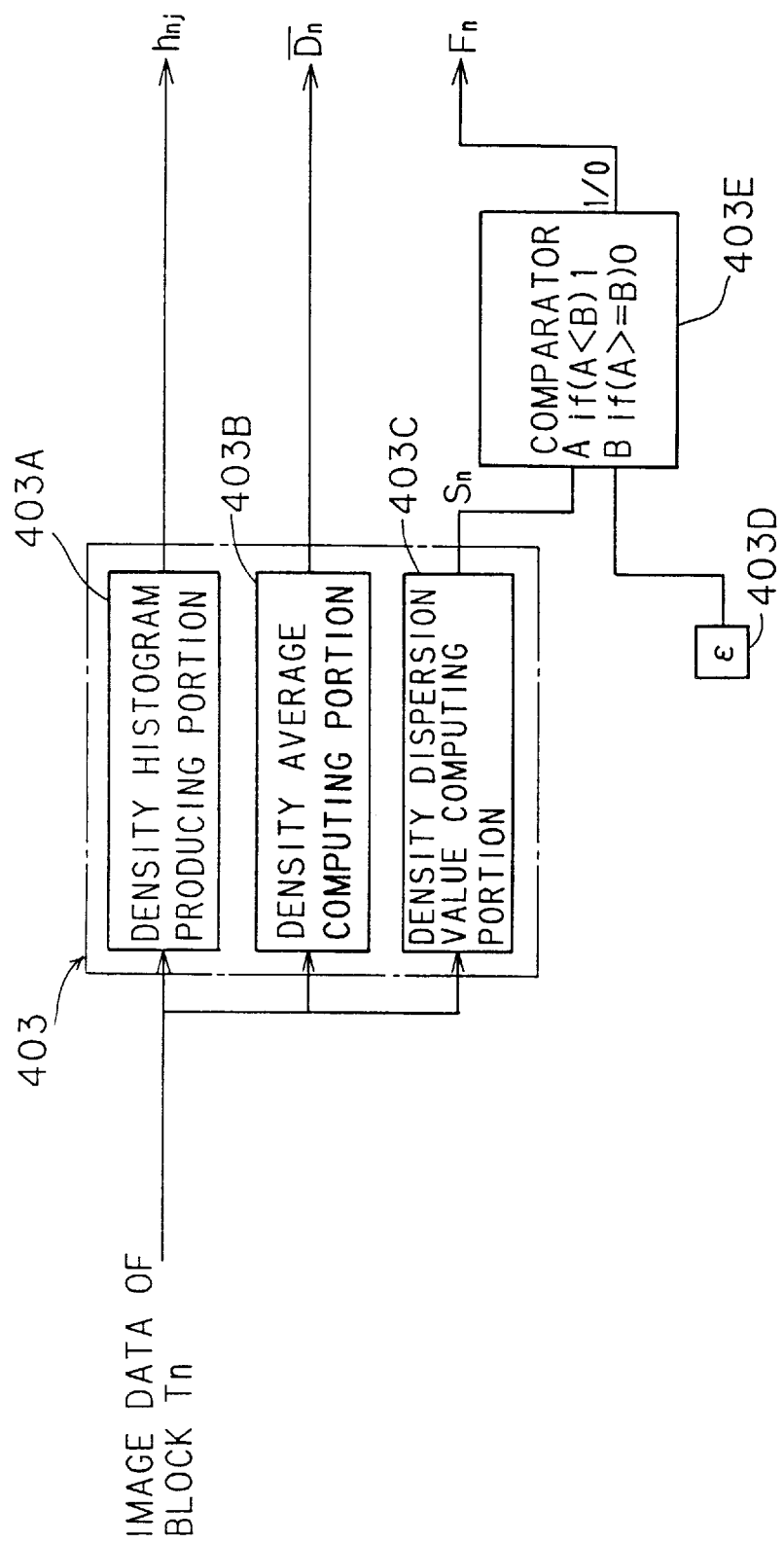
FIG. 21 is a block diagram of a data statistical processor 403.

As illustrated in FIG. 21 data statistical processor 403 includes a density histogram producing portion 403A, a density average computing portion 403B, a density dispersion value computing portion 403C, a predetermined threshold value establishing portion 403D and a comparator 403E.

The density histogram producing portion 403A calculates the average density $D_M$ for each pixel from Eq. 1, which has been described for the first preferred embodiment.

The density histogram producing portion 403A constructs, for each block $T_n$ (n=1 to N), the density histogram $h_{nj}$ indicative of relation between the average density $D_M$ and the number of pixels providing the average density $D_M$.

The density average computing portion 403B calculates the density average $D_n$ for each block $T_n$ (n=1 to N) from Eq. 2.

The density dispersion value computing portion 403C calculates the density dispersion value $S_n$ for each block $T_n$ (n=1 to N) from Eq. 3.

The predetermined threshold value establishing portion 403D is a memory for establishing the predetermined threshold value $\epsilon$. The threshold value $\epsilon$ is established in the predetermined threshold value establishing portion 403D, for example, by an operator through the console.

The comparator 403E compares the density dispersion value $S_n$ calculated for each block $T_n$ in the density dispersion value computing portion 403C with the predetermined threshold value ε established in the predetermined threshold value establishing portion 403D by comparing electric signals representative of respective values with each other. The comparator 403E sets the flag $FS_n$ of "1" for the block $T_n$ when $S_n < \epsilon$ and sets the flag $FS_n$ of "0" therefor when $S_n \geq \epsilon$. That is, the flag $FS_n$ for the uniform density blocks $T_n$ is "1" and the flag $FS_n$ for the nonuniform density blocks $T_n$ is "0".

An $h_{nj}$ register 404 stores signals representing the density histograms $h_{nj}$ constructed in the density histogram producing portion 403A. The $h_{nj}$ register 404 outputs a signal expressing the number of pixels for the predetermined rank number j in the density histogram $h_{nj}$ for each block $T_n$ to a cumulative relative frequency histogram producing portion 413 in order of the blocks $T_n$ at a predetermined timing. On outputting the numbers of pixels for the rank number j in all blocks $T_n$ to the cumulative relative frequency histogram producing portion 413, the $h_{nj}$ register 404 repeats the output of the numbers of pixels for the next rank number (j+1) in all blocks $T_n$ to the cumulative relative frequency histogram producing portion 413, to thereby output the numbers of pixels for all rank numbers j in all blocks $T_n$ to the cumulative relative frequency histogram producing portion 413.

A $D_n$-register 405 receives a signal expressing the density averages $D_n$ calculated for the respective blocks $T_n$ in the density average computing portion 403B of the data statistical processor 403. The $D_n$-register 405 sequentially outputs a group of density averages $D_n$, $D_{n-1}$, $D_{n-H}$, $D_{n-H-1}$ of the blocks $T_n$, $T_{n-1}$, $T_{n-H}$, $T_{n-H-1}$ covered with the scanning mask of FIG. 13 as a unit to a labeling processor 407.

An $FS_n$-register 406 receives the flags $FS_n$ determined for the respective blocks $T_n$ in the comparator 403E. The $FS_n$-register 406 outputs a group of flags $FS_n$, $FS_{n-1}$, $FS_{n-H}$, $FS_{n-H-1}$ for the blocks $T_n$, $T_{n-1}$, $T_{n-H}$, $T_{n-H-1}$ covered with the scanning mask of FIG. 13 as a unit to the labeling processor 407.

Figure 22:
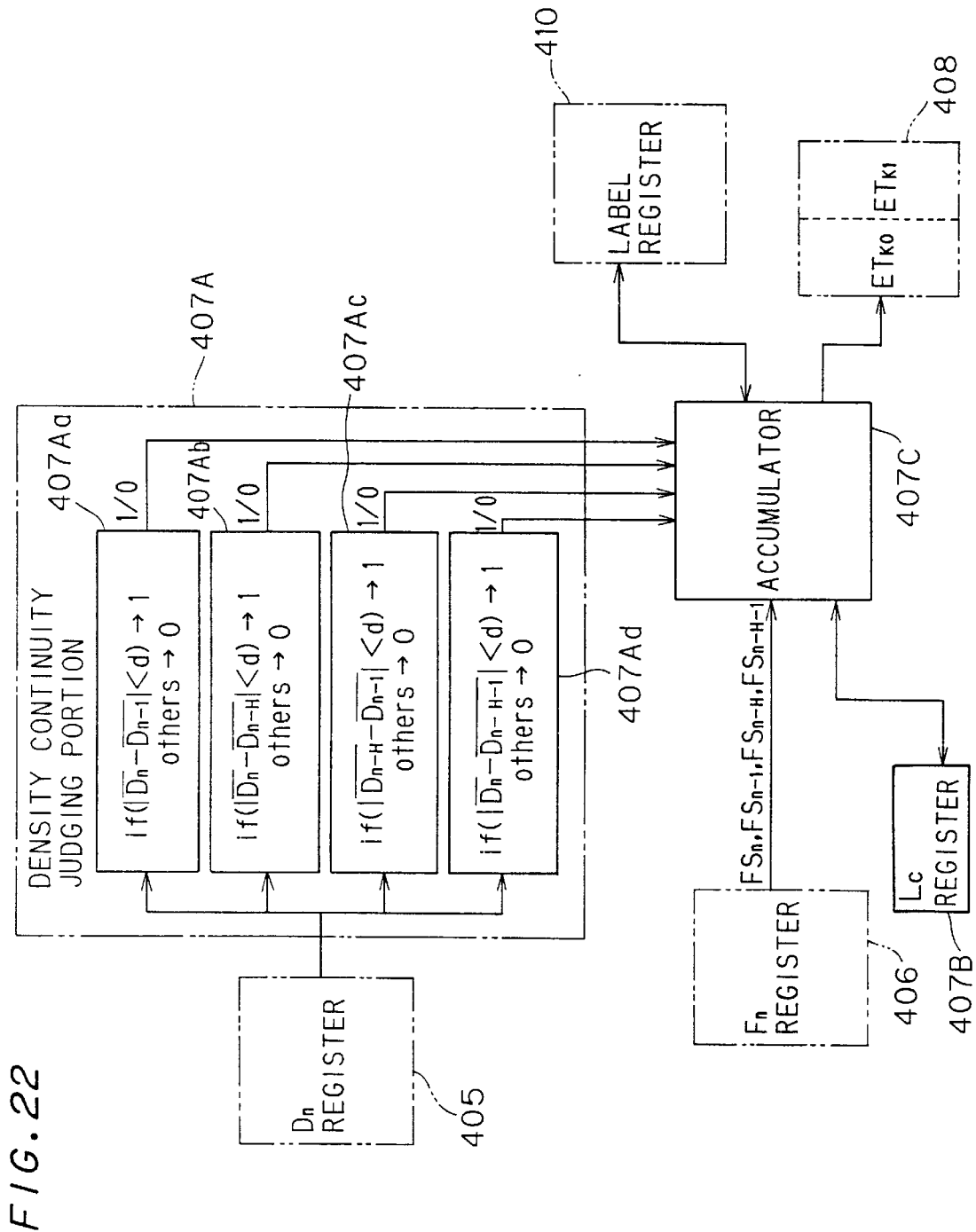
FIG. 22 is a block diagram of a labeling processor 407.

As shown in FIG. 22, labeling processor 407 includes a density continuity judging portion 407A, an $L_c$ register 407B and an accumulator 407C.

The density continuity judging portion 407A receives the density averages $D_n$, $D_{n-1}$, $D_{n-H}$, $D_{n-H-1}$ from the $D_n$ register 405. The density continuity judging portion 407A includes first to fourth judging portions 407Aa to 407Ad.

The first judging portion 407Aa judges whether or not the density average $D_n$ of the block $T_n$ covered with the scanning mask is continuous with the density average $D_{n-1}$ of the block $T_{n-1}$ covered therewith at the same time. The first judging portion 407Aa outputs a signal representing the level "1" when the density averages $D_n$ and $D_{n-1}$ are continuous with each other, and outputs a signal representing the level "0" when they are not. The second judging portion 407Ab judges whether or not the density average $D_n$ is continuous with the density average $D_{n-H}$, to output a signal representing the level "1" when it is continuous and output a signal representing the level "0" when it is not. The third judging portion 407Ac judges whether or not the density average $D_{n-H}$ is continuous with the density average $D_{n-1}$, to output a signal representing the level "1" when it is continuous and output a signal representing the level "0" when it is not. The fourth judging portion 407Ad judges whether or not the density average $D_n$ is continuous with the density average $D_{n-H-1}$, to output a signal representing the level "1" when it is continuous and output a signal representing the level "0" when it is not.

Each time the accumulator 407C introduces a new label value $L_c$, the $L_c$ register 407B updates the label value $L_c$ to the next label value $L_{c+1}$.

The accumulator 407C receives the flags $FS_n$, $FS_{n-1}$, $FS_{n-H}$, $FS_{n-H-1}$ for the blocks $T_n$, $T_{n-1}$, $T_{n-H}$, $T_{n-H-1}$ covered with the scanning mask and the judgement results of the first to fourth judging portions 407Aa to 407Ad of the density continuity judging portion 407A.

The accumulator 407C determines the value of the label $L_n$ to be assigned to the block $T_n$ as a function of the input data in accordance with the table shown in FIG. 25 when the flag $FS_n$ is "1". In this case, when a new label value $L_C$ is used which is not the used label values assigned to the labels $L_{n-1}$, $L_{n-H}$, $L_{n-H-1}$, the updated label value $L_{c+1}$ is inputted from the $L_c$ register 407B. The label $L_n$ to which the label value is assigned is outputted to a label register 410.

The accumulator 407C outputs the labels $L_{n-1}$, $L_{n-H}$ of the blocks $T_{n-1}$, $T_{n-H}$ to an equivalence table providing portion 408 in accordance with FIG. 25 independently of the flag $FS_n$ when the flags $FS_{n-1}$ and $FS_{n-H}$ are both "1" and the labels $L_{n-1}$ and $L_{n-H}$ to which the label values are assigned are not equal to each other.

The equivalence tables $ET_{k0}$ and $ET_{k1}$ are provided in the equivalence table providing portion 408. The equivalence tables $ET_{k0}$ and $ET_{k1}$ store therein signals representative of the labels $L_{n-1}$ and $L_{n-H}$ of the blocks $T_{n-1}$ and $T_{n-H}$ outputted from the accumulator 407C, respectively, as well as their label values. When the equivalence tables $ET_{k0}$ and $ET_{k1}$ are used in this manner, the table number k is counted up by one, and equivalence tables $ET_{(k+1)0}$ and $ET_{(k+1)1}$ for the updated table number are provided to the equivalence table providing portion 408. The equivalence tables $ET_{(k+1)0}$ and $ET_{(k+1)1}$ store the labels $L_{n-1}$ and $L_{n-H}$ newly outputted from the accumulator 407C to the equivalence table providing portion 408. Subsequently, the table number k is counted up by one to repeat the same operation.

A label integrating processor 409 integrates signals of the labels between each pair of equivalence tables $ET_{k0}$ and $ET_{k1}$ having the labels stored therein by the equivalence table providing portion 408. When the value of the label (label $L_{n-1}$ of the block $T_{n-1}$ covered with the scanning mask) that is stored in the equivalence table $ET_{k0}$ is equal to the label value assigned to any label $L_n$ stored in the label register 410, the value of the label (label $L_{n-H}$ of the block $T_{n-H}$ covered with the scanning mask) that is stored in the equivalence table $ET_{k1}$ and the label values stored in the equivalence table $ET_{k0}$ are outputted to the label register 410.

The label register 410 stores the label $L_n$ outputted from the accumulator 407C as well as the label value assigned thereto. The label register 410, when receiving the label and its value from the label integrating processor 409, rewrites the value of the corresponding label given from the accumulator 407C to the label value given from the label integrating processor 409. After rewriting the label value, the label register 410 sequentially outputs the stored labels $L_n$ at a predetermined timing to a background marking processor 411.

Figure 23:
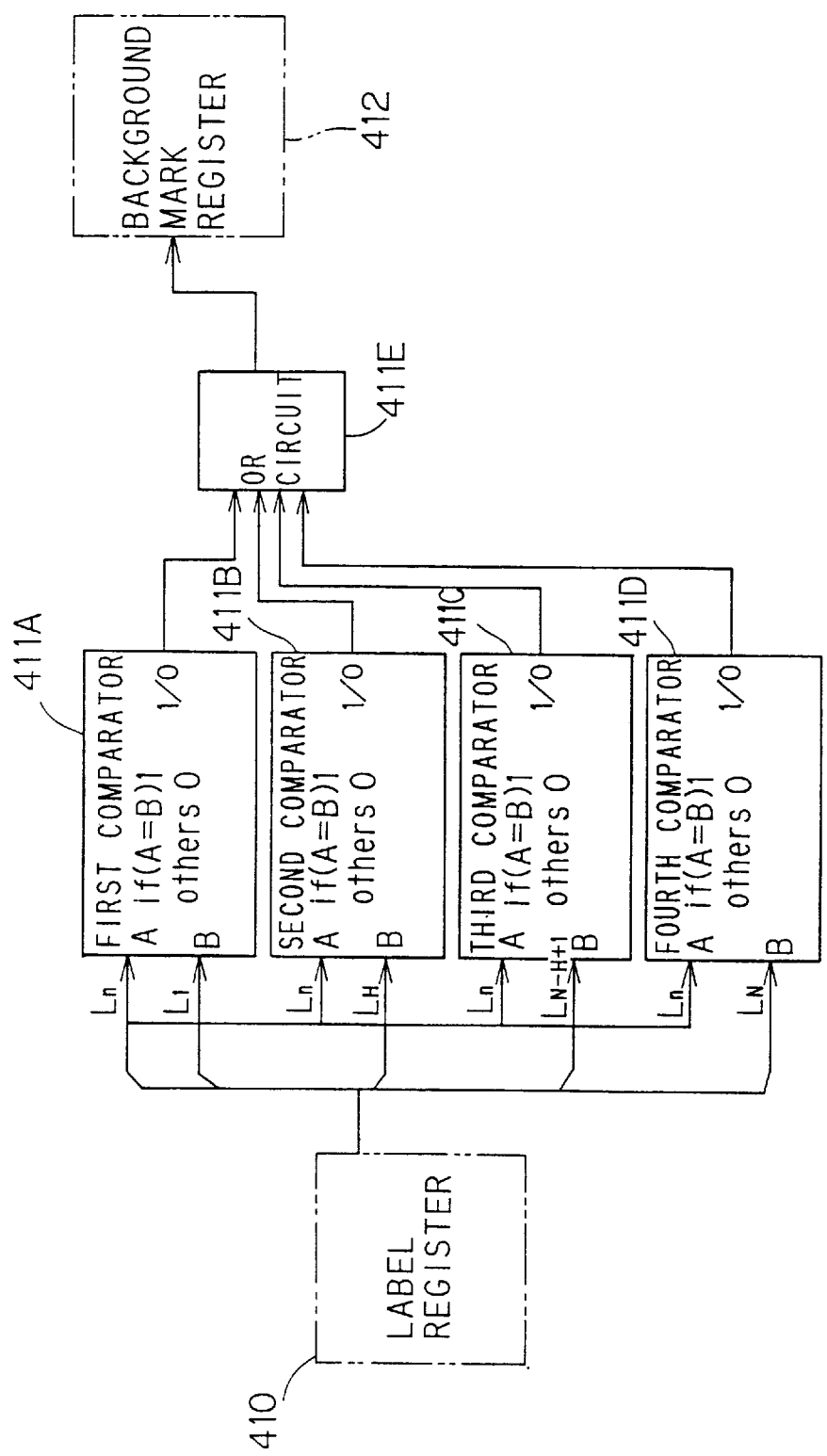
FIG. 23 is a block diagram of a background marking processor 411.

As shown in FIG. 23, background marking processor 411 includes first to fourth comparators 411A to 411D and an OR circuit 411E.

The first to fourth comparators 411A to 411D compare the labels $L_n$ sequentially given from the label register 410 with the labels $L_1$, $L_H$, $L_{N-H+1}$, $L_N$ of the background evaluation reference blocks $T_1$, $T_H$, $T_{N-H+1}$, $T_N$ (FIG. 12), respectively. The first to fourth comparators 411A to 411D also output the level "1" to the OR circuit 411E when the label $L_n$ is equal to the label $L_1$, $L_H$, $L_{N-H+1}$ or $L_N$ and output the level "0" when it is not.

The OR circuit 411E sets the flag $BG_n$ of "1" for the block $T_n$ when at least one of the comparators 411A to 411D outputs the level "1". The OR circuit 411E sets the flag $BG_n$ of "0" for the block $T_n$ when all of the comparators 411A to 411D output the level "0". The OR circuit 411E also outputs the flags $BG_n$ of "1" or "0" to the background mark register 412.

The background mark register 412 sequentially outputs the flags $BG_n$ which are set to "1" or "0" in the background marking processor 411 to a cumulative relative frequency histogram producing portion 413. The background mark register 412 also outputs N-number of flags $BG_n$ for the respective rank numbers j=0 to J.

Figure 24:
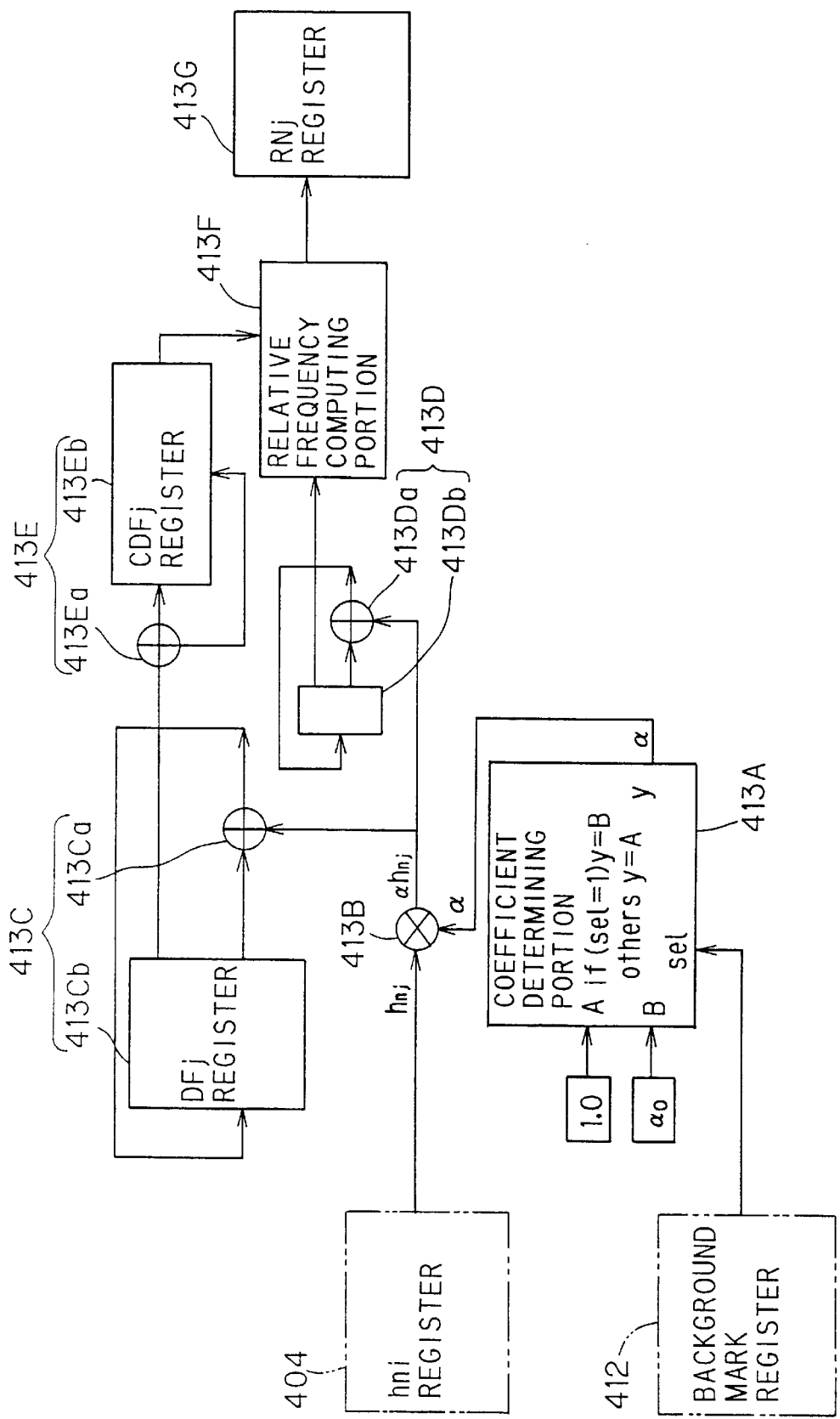
FIG. 24 is a block diagram of a cumulative relative frequency histogram producing portion 413.

As shown in FIG. 24, cumulative relative frequency histogram producing portion 413 includes a coefficient determining portion 413A, a computing portion 413B for the corrected number of pixels for each block for each rank, a computing portion 413C for the number of pixels for each rank, a computing portion 413D for the total number of pixels, a computing portion 413E for the cumulative number of pixels, a relative frequency computing portion 413F and a relative frequency register 413G.

The flags $BG_n$ for the respective blocks $T_n$ are inputted to the coefficient determining portion 413A from the background mark register 412. The coefficient determining portion 413A has two levels "1" and "$\alpha_0$" for the coefficient $\alpha$. The coefficient determining portion 413A selects the coefficient $\alpha$ of "$\alpha_0$" for the blocks $T_n$ having the flag $BG_n$ of "1" and selects the coefficient $\alpha$ of "1" for the blocks $T_n$ having the flag $BG_n$ of "0". The computing portion 413B is a multiplier circuit for multiplying the coefficient $\alpha$ given to the corresponding block $T_n$ by the number of pixels outputted from the $h_{nj}$ register 404. The operation result of the computing portion 413B is the corrected number of pixels $\alpha \cdot h_{nj}$ which is given to the computing portions 413C and 413D.

The computing portion 413C includes an adder circuit 413Ca and a $DF_j$ register 413Cb. The adder circuit 413Ca adds the corrected number of pixels $\alpha \cdot h_{nj}$ for the predetermined rank number j outputted from the computing portion 413B to the number of pixels $DF_j$ for the predetermined rank number j in the blocks $T_1$ to $T_{(n-1)}$ outputted from the $DF_j$ register 413Cb. The number of pixels $DF_j$ outputted from the $DF_j$ register 413Cb to be added to the corrected number of pixels $\alpha \cdot h_{nj}$ when the computing portion 413B outputs the corrected number of pixels $\alpha \cdot h_{nj}$ for the block number n of "1" is the initial value of the number of pixels $DF_j$, which is set to "0" for all rank numbers j. The computing portion 413C adds up the corrected numbers of pixels $\alpha \cdot h_{nj}$ in all blocks $T_n$ for each rank number j in this manner in accordance with Eq. 4 to store the sum as the number of pixels $DF_j$ for the rank number j in the whole image.

The same operation is carried out for all rank numbers j, so that the computing portion 413C calculates the numbers of pixels $DF_j$ for all rank numbers j in the whole image.

The computing portion 413D includes an adder circuit 413Da and a y register 413Db and adds up the corrected numbers of pixels $\alpha \cdot h_{nj}$ for all rank numbers j in all blocks $T_n$. The adder circuit 413Da adds the corrected number of pixels $\alpha \cdot h_{nj}$ newly outputted from the computing portion 413B to the current total number of pixels y read out from the y register 413Db, to give the sum to the y register 413Db. The y register 413Db stores the total number of pixels y given from the adder circuit 413Da. The y register 413Db sequentially gives the total number of pixels y stored once therein to the adder circuit 413Da until it adds up the corrected numbers of pixels $\alpha \cdot h_{nj}$ for all rank numbers j in all blocks $T_n$. On adding up the corrected numbers of pixels $\alpha \cdot h_{nj}$ for all rank numbers j in all blocks $T_n$ in accordance with Eq. 5, the y register 413Db applies the sum as the total number of pixels y (FIG. 5) in the whole image to the relative frequency computing portion 413F.

The computing portion 413E includes an adder circuit 413Ea and a $CDF_j$ register 413Eb, and calculates the cumulative number of pixels $CDF_j$ ($CDF_1$ to $CDF_J$) for each rank number j in the whole original. The adder circuit 413Ea adds the number of pixels $DF_j$ outputted by the $DF_j$ register 413Cb to the cumulative number of pixels $CDF_{(j-1)}$ for the rank number (j-1) given from the $CDF_j$ register 413Eb, to determine the cumulative number of pixels $CDF_j$ for the rank number j. The adder circuit 413Ea applies the calculated cumulative number of pixels $CDF_j$ to the $CDF_j$ register 413Eb. The $CDF_j$ register 413Eb gives the adder circuit 413Ea the latest cumulative number of pixels $CDF_{(j-1)}$ for the rank number (j-1). The $CDF_j$ register 413Eb stores the cumulative numbers of pixels $CDF_j$ given from the adder circuit 413Ea and sequentially gives the cumulative numbers of pixels $CDF_j$ (j=0 to J) to the relative frequency computing portion 413F.

The relative frequency computing portion 413F receives the cumulative number of pixels $CDF_j$ from the $CDF_j$ register 413Eb and receives the total number of pixels y from the y register 413Db. The relative frequency computing portion 413F calculates the relative frequency $RN_j$ each time the cumulative number of pixels $CDF_j$ is inputted. The relative frequency $RN_j$ is the percentage of the cumulative number of pixels $CDF_j$ to the total number of pixels y. The calculated relative frequency $RN_j$ is applied to the $RN_j$ register 414.

An $RN_j$-register 414 receives the relative frequencies $RN_j$ for all rank numbers j from the relative frequency computing portion 413F to store them therein. That is, the $RN_j$ register 414 stores the relative frequency histogram therein.

The highlight and shadow points establishing portion 400 further includes input reference density computing means for calculating the input highlight density $D_{RH}$ ($D_{GH}$, $D_{BH}$) and input shadow density $D_{RS}$ ($D_{GS}$, $D_{BS}$) as well as the above-mentioned components 403 to 414 for constructing the cumulative relative frequency histogram.

<Third Preferred Embodiment>

A color process scanner according to a third preferred embodiment (FIG. 26) of the present invention has a structure similar to that shown in FIGS. 10 and 11. The essential difference between the scanner according to the first preferred embodiment is in the detection of a background portion or a catch-light portion of an original image and in definition of the coefficient used for calculating the pixel number belonging to the background or catch-light portion. Therefore, only the difference will be described below. The same or similar elements and comparable process steps are provided with the same reference numerals in the drawings.

Figure 33:
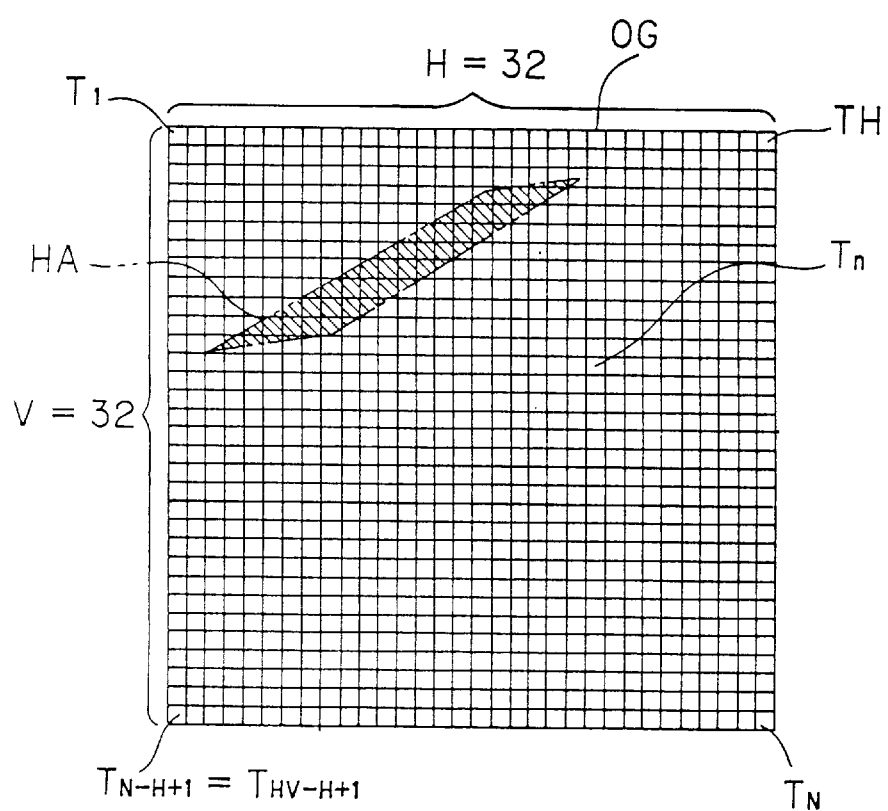
FIG. 33 illustrates an original separated into a plurality of blocks in accordance with the third preferred embodiment of the present invention.

FIG. 33 illustrates a color original image OG to which the process according to the third preferred embodiment can be applied. The original image OG includes a catch-light portion HA, which may appear by reflection of light on a metal portion included in an object of photograph. The catch-light portion HA of FIG. 33 is shown as surrounded by dashed-and-dotted lines, and the image of the other portion is not shown in the original OG. FIG. 1 schematically shows a process for establishing the highlight and shadow points.

Figure 26:
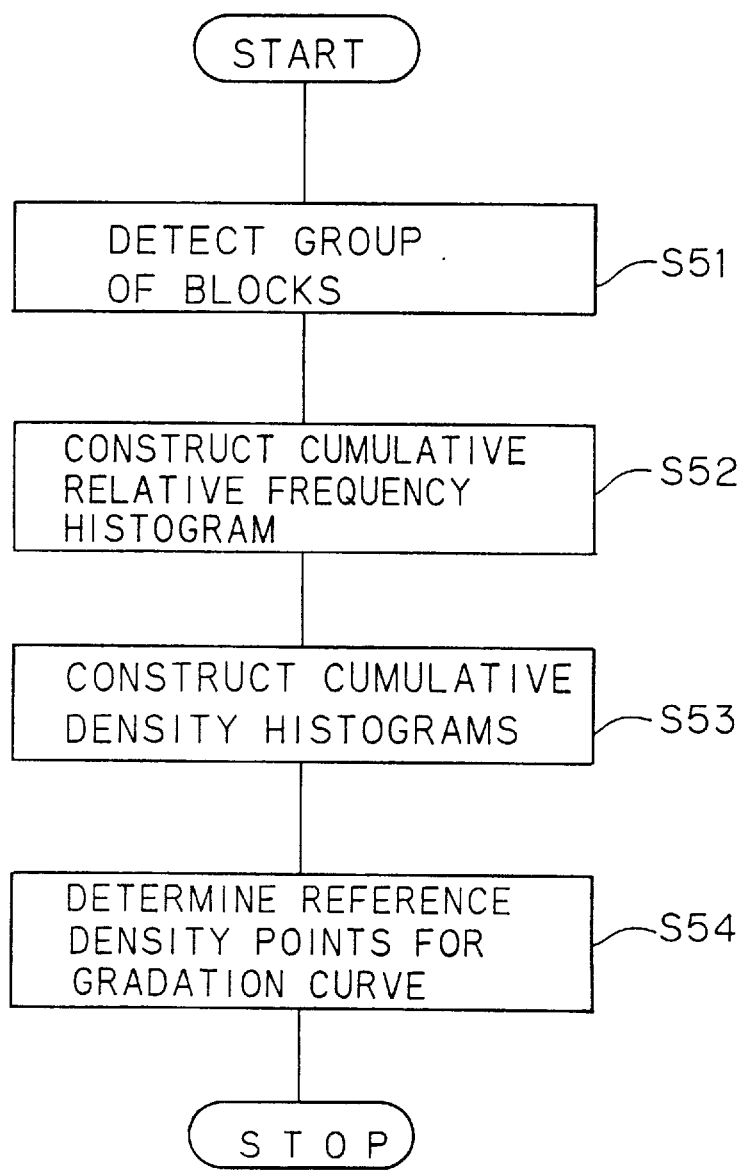
FIG. 26 is a flow chart schematically showing an overall process of establishing reference density points according to a third preferred embodiment of the present invention.

FIG. 26 is a flow chart showing the process according to the third preferred embodiment of the present invention.

With reference to FIG. 26, the highlight and shadow point establishing portion 400 detects a group of blocks forming the catch-light portion HA in the original OG shown in FIG. 13 in the process step S51.

In the process step S52, density histograms are constructed for the respective blocks included in the group detected in the process step S51. A coefficient inversely proportional to the number of blocks included in the group is multiplied by the number of pixels for each rank of the density histograms by block to determine the corrected number of pixels. The number of pixels in the blocks which are not included in the group is added for each rank to the corrected number of pixels, to construct a cumulative density histogram for the whole original image. A cumulative relative frequency histogram is constructed as a function of the cumulative density histogram.

Cumulative density histograms by color component are constructed in the process step S53, and reference density points (highlight and shadow points) for the gradation curve are determined in the process step S54 as a function of the cumulative relative frequency histogram for the whole original image OG made in the process step S52 and the cumulative density histograms made in the process step S53.

Figure 17:
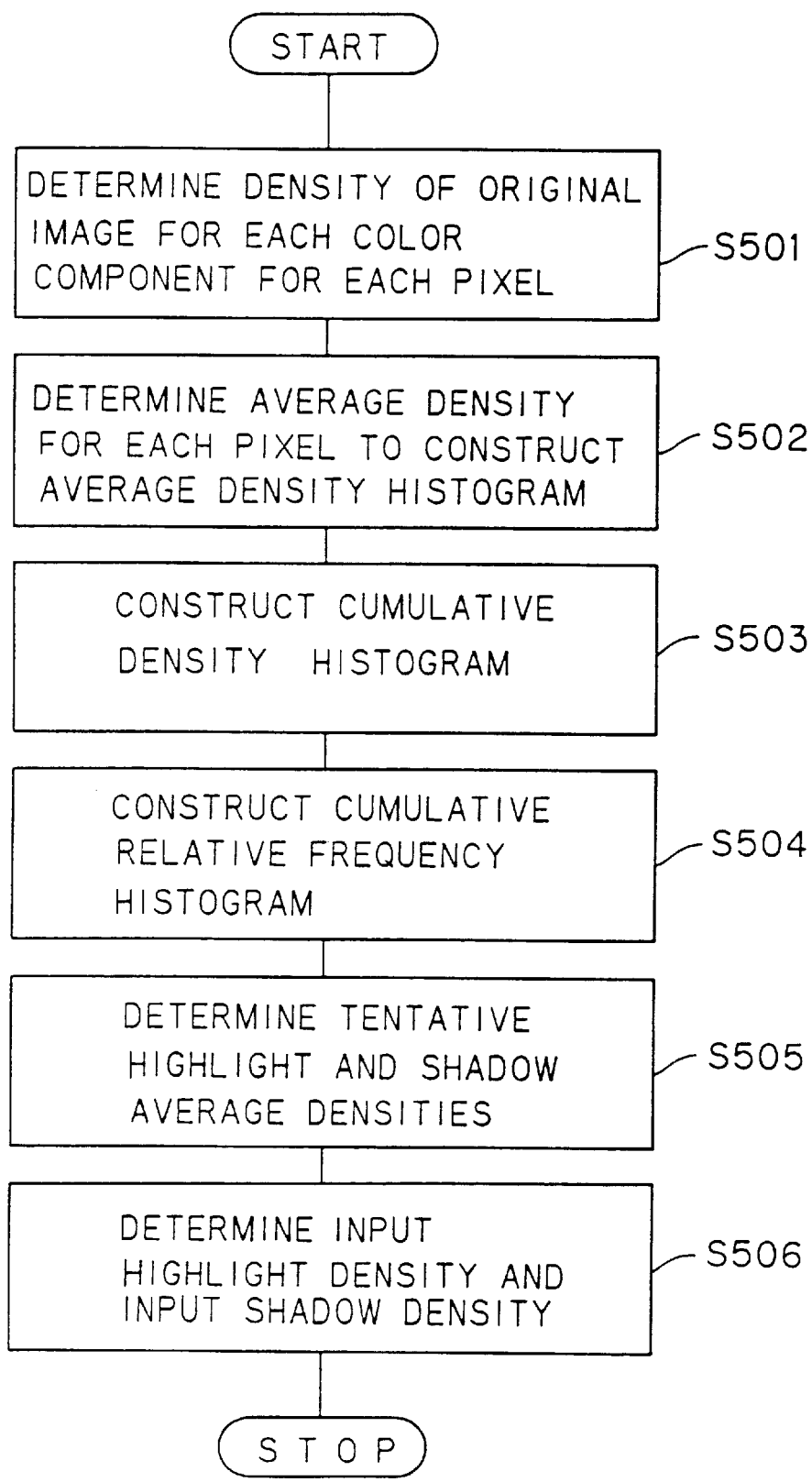
FIG. 17 is a flow chart of a conventional method of establishing the reference density points.
Figure 18:
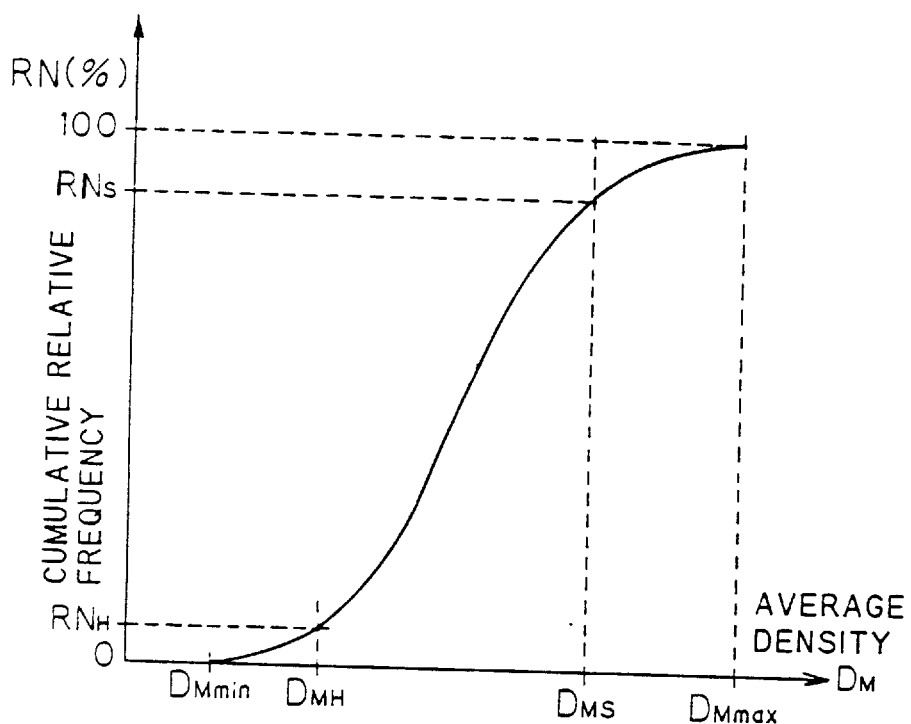
FIG. 18 shows a cumulative relative frequency histogram constructed by the conventional method.
Figure 19:
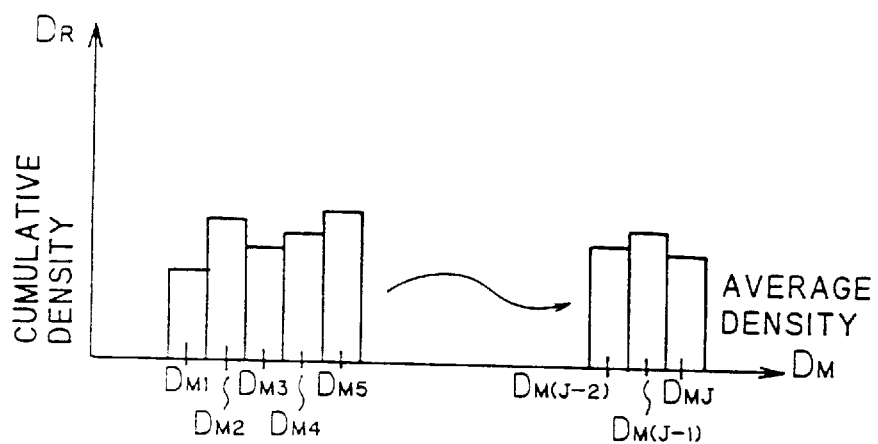
FIG. 19 shows a cumulative density histogram by color component constructed by the conventional method.

Details of the process step S501 (FIG. 17 are) is as follows.

First, the process shown in FIGS. 2 to 4 is conducted to provide labels to all blocks having uniform density. The equivalence tables are also provided with values for indicate blocks whose labels can be equalized.

Figure 27:
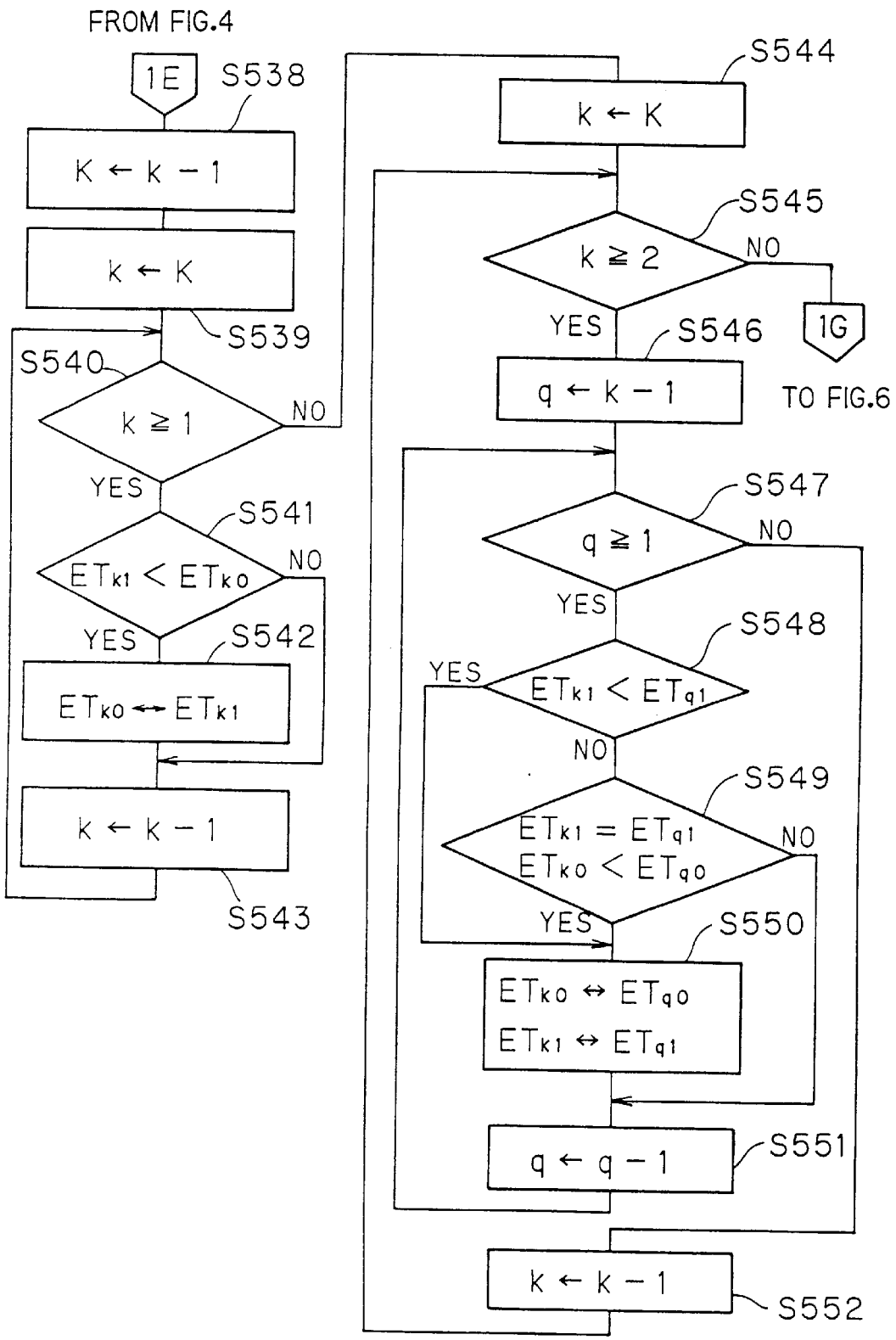
FIGS. 27–32 are flow charts showing a process according to the third preferred embodiment of the present invention.
Figure 28:
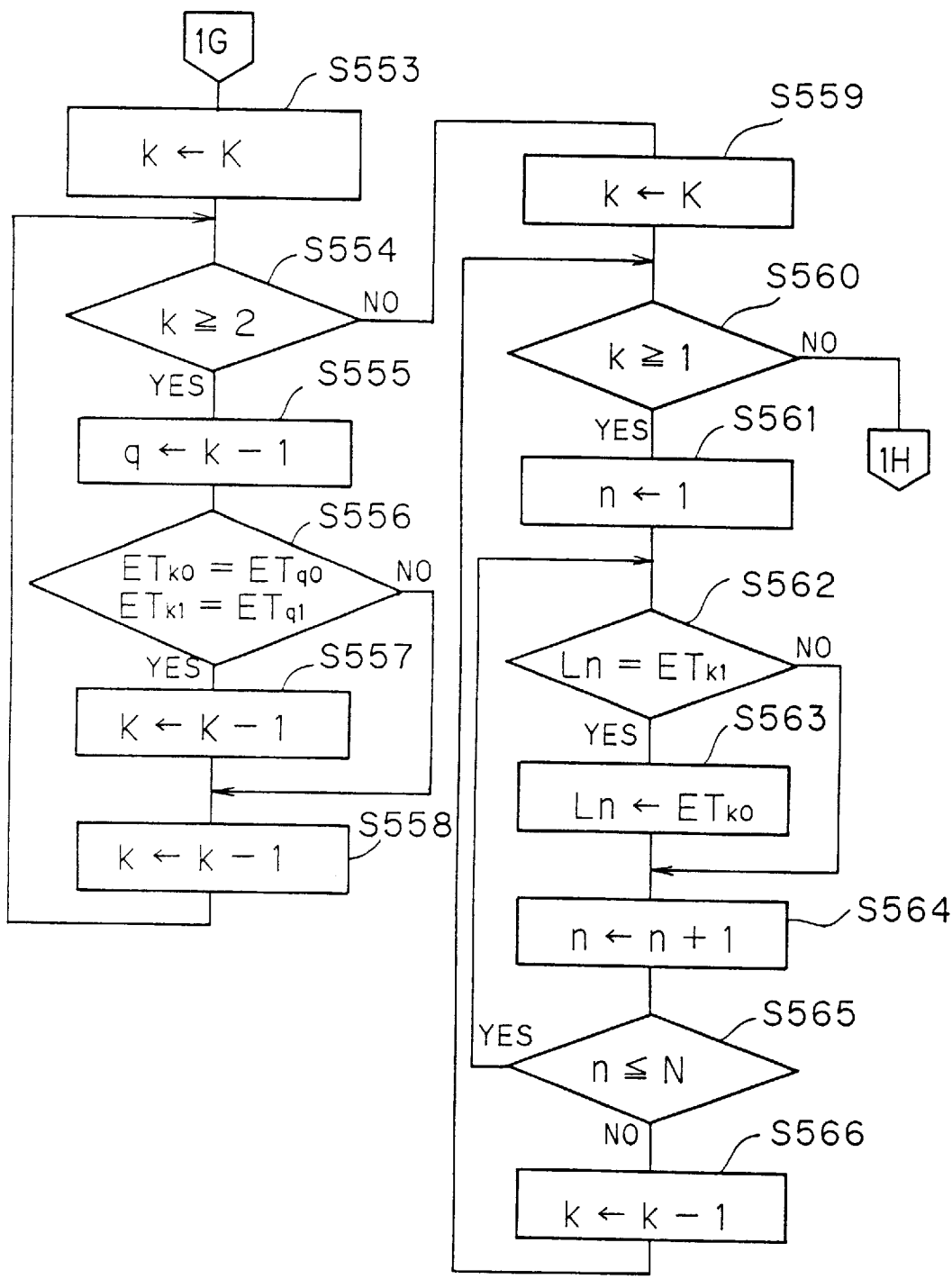

The routine of the process steps S538 to S558 of FIGS. 27 and 28 is to sort the equivalence tables $ET_{k0}$ and $ET_{k1}$ as a function of the magnitude of the recorded label values $L_c$.

The table number k of the equivalence tables $ET_{k0}$ and $ET_{k1}$ is counted down by one in the process steps S538 and S539. It is judged in the process step S540 whether or not the table number k of the immediately preceding equivalence tables $ET_{k0}$ and $ET_{k1}$ is less than "1". When the table number k is less than "1" or is equal to "0", no pairs of equivalence tables $ET_{k0}$ and $ET_{k1}$ remain in which the label values are recorded, and then the process proceeds to the process step S544.

When the table number k is not less than "1" in the process step S540, it is found that there is a pair of equivalence tables $ET_{k0}$ and $ET_{k1}$ in which the label values are recorded are present. In this case, the label values recorded in the equivalence tables $ET_{k0}$ and $ET_{k1}$ are compared with each other in the process step S541. When the label value recorded in the equivalence table $ET_{k0}$ is more than that recorded in the equivalence table $ET_{k1}$, the label values are interchanged between the equivalence tables $ET_{k0}$ and $ET_{k1}$ in the process step S542.

The table number k of the equivalence tables $ET_{k0}$ and $ET_{k1}$ is further counted down by one in the process step S543. Subsequently, the routine of the process steps S540 to S543 is repeated. This permits all pairs of equivalence tables $ET_{k0}$ and $ET_{k1}$ having the label values recorded therein to be adapted such that the label value recorded in the equivalence table $ET_{k0}$ is equal to or less than the label value recorded in the equivalence table $ET_{k1}$. Upon completion of the processing in the process steps S541 to S543 for all pairs of equivalence tables $ET_{k0}$ and $ET_{k1}$ having the label values recorded therein, the table number k becomes "0", and the process proceeds from the process step S540 to the process step S544 as above described.

In the process steps S544 to S552, the pairs of equivalence tables $ET_{k0}$ and $ET_{k1}$ are arranged in ascending order of the label values recorded in the equivalence tables $ET_{k1}$. When the equivalence tables $ET_{k1}$ have the same label value, the pairs are arranged in ascending order of the label values recorded in the equivalence tables $ET_{k0}$.

The last pair of equivalence tables $ET_{k0}$ and $ET_{k1}$ having the label values recorded therein is accessed in the process step S544. It is judged in the process step S545 whether or not the table number k of the last equivalence tables $ET_{k0}$ and $ET_{k1}$ is less than "2", that is, whether or not less than two pairs of equivalence tables $ET_{k0}$ and $ET_{k1}$ having the label values recorded therein are present. The process proceeds to the process step S553 when the table number k is less than "2" in the process step S545 since no sorting is necessary. The process proceeds to the process step S546 when the table number k is not less than "2" in the process step S545.

Accessed in the process step S546 is a pair of equivalence tables $ET_{q0}$ and $ET_{q1}$ immediately preceding the last pair of equivalence tables $ET_{k0}$ and $ET_{k1}$ having the label values recorded therein. It is judged in the process step S547 whether or not a number q is less than "1", that is, whether or not the equivalence tables $ET_{q0}$ and $ET_{q1}$ have the label values recorded therein. The process proceeds to the process step S552 when the number q is less than "1" or when there aren't any pairs of equivalence tables $ET_{q0}$ and $ET_{q1}$ having the label values recorded therein. The process proceeds to the process step S548 when the number q is not less than "1".

It is judged in the process step S548 whether or not the label value recorded in the equivalence table $ET_{q1}$ is more than the label value recorded in the equivalence table $ET_{k1}$. The process proceeds to the process step S549 when $ET_{k1} > ET_{q1}$ in label value, and the process proceeds to the process step S550 when $ET_{k1} < ET_{q1}$ in label value.

It is judged in the process step S549 whether or not the label value recorded in the equivalence table $ET_{q1}$ is equal to the label value recorded in the equivalence table $ET_{k1}$. It is also judged in the process step S549 whether or not the label value recorded in the equivalence table $ET_{q0}$ is more than the label value recorded in the equivalence table $ET_{k0}$. The process proceeds to the process step S550 when $ET_{k1} = ET_{q1}$ and $ET_{k0} < ET_{q0}$ in label value. The process proceeds to the process step S551 when $ET_{k1} \approx ET_{q1}$ and $ET_{k0} \leq ET_{q0}$ in label value. The label values are interchanged between the pair of equivalence tables $ET_{k0}$, $ET_{k1}$ and the pair of equivalence tables $ET_{q0}$, $ET_{q1}$, respectively, in the process step S550. The number q is counted down by one in the process step S551, and the process then returns to the process step S547.

The routine of the process steps S548 to S551 is repeated until the number q becomes less than "1" in the process step S547. This permits the pair of equivalence tables $ET_{k0}$ and $ET_{k1}$ having the largest label value to be arranged on the tail. When there are two or more pairs of equivalence tables $ET_{k0}$ and $ET_{k1}$ having the largest label value, the pairs are arranged from the tail in the descending order of the label values recorded in the equivalence tables $ET_{k0}$.

The process proceeds to the process step S552 when q<1 in the process step S547. The number k of the equivalence tables $ET_{k0}$ and $ET_{k1}$ is counted down by one in the process step S552, and the process then returns to the process step S545. The routine of the process steps S545 to S552 is repeated until the number k becomes less than "2" in the process step S545. This permits the pairs of equivalence tables $ET_{k0}$ and $ET_{k1}$ to be arranged in ascending order of the label values recorded in the equivalence tables $ET_{k1}$ and to be arranged in ascending order of the label values recorded in the equivalence tables $ET_{k0}$ where the equivalence tables ET have the same label value. When k<2 in the process step S545, the process proceeds to the process step S553 of FIG. 28.

Accessed in the process step S553 is the last pair of equivalence tables $ET_{k0}$ and $ET_{k1}$ sorted through the routine of the process steps S538 to S552. It is judged in the process step S554 whether or not the number k of the last pair of equivalence tables $ET_{k0}$ and $ET_{k1}$ is less than "2", that is, whether or not less than two pairs of labeled equivalence tables $ET_{k0}$ and $ET_{k1}$ are present. The process proceeds to the process step S559 when the number k is less than "2" in the process step S554. The process proceeds to the process step S555 when the number k is not less than "2" in the process step S554. Accessed in the process step S555 is the pair of equivalence tables $ET_{q0}$ and $ET_{q1}$ immediately preceding the last pair of equivalence tables $ET_{k0}$ and $ET_{k1}$.

It is judged in the process step S156 whether or not the equivalence tables $ET_{k0}$ and $ET_{k1}$ have the same label values as the equivalence tables $ET_{q0}$ and $ET_{q1}$, respectively. The process proceeds to the process step S557 when $ET_{k0}=ET_{q0}$ and $ET_{k1}=ET_{q1}$ in label value in the process step S556. The process proceeds to the process step S558 when $ET_{k0} \approx ET_{q0}$ or $ET_{k1} \approx ET_{q1}$ in label value in the process step S556.

In the process step S557, the pair of equivalence tables $ET_{q0}$ and $ET_{q1}$ is defined as a new pair of equivalence tables $ET_{k0}$ and $ET_{q1}$, and the old pair of equivalence tables $ET_{k0}$ and $ET_{k1}$ is eliminated. The process then proceeds to the process step S558. The table number k of the equivalence tables $ET_{k0}$ and $ET_{k1}$ is counted down by one in the process step S558, and the process returns to the process step S554. The routine of the process steps S554 to S558 is repeated until the number k becomes less than "2" in the process step S554. The process proceeds to the process step S559 when the number k becomes less than "2" in the process step S554.

The routine of the process steps S559 to S566 is to equalize the labels with reference to the pairs of equivalence tables $ET_{k0}$ and $ET_{k1}$ sorted through the routine of the process steps S538 to S558.

Accessed in the process step S559 is the last pair of equivalence tables $ET_{k0}$ and $ET_{k1}$ arranged on the tail by the sorting. It is judged in the process step S560 whether or not the number k of the last pair of equivalence tables $ET_{k0}$ and $ET_{k1}$ accessed in the process step S559 is less than "1". When the number k is less than "1" in the process step S560, there aren't any pairs of equivalence tables $ET_{k0}$ and $ET_{k1}$ having the labels to be equalized, and the process proceeds to the process step S567. When the number k is not less than "1" in the process step S560, the process proceeds to the process step S561. The block number n of the blocks $T_n$ is initialized to "1" in the process step S561, and the process then proceeds to the process step S562.

The label $L_n$ of the block $T_n$ is compared with the label of the equivalence table $ET_{k1}$ in the process step S562. The label value recorded in the equivalence table $ET_{k0}$ is replaced with the label value $L_c$ assigned to the label $L_n$ in the process step S563 only when the label value recorded in the equivalence table $ET_{k1}$ is equal to the label value $L_c$ assigned to the label $L_n$. Then, the block number n is counted up by one in the process step S564.

The routine of the process steps S562 to S564 is repeated until the block number n exceeds N in the process step S565. When the block number n exceeds N in the process step S565, the process proceeds to the process step S566, in which the pair of equivalence tables $ET_{k0}$ and $ET_{k1}$ immediately preceding the last pair is accessed. Subsequently, the process returns to the process step S560, and the routine of the process steps S560 to S566 is repeated until the number k becomes less than "1" in the process step S560. Thus, the label values are applied to the labels $L_n$ of all uniform density blocks $T_n$. The same label value is assigned to two or more adjacent blocks $T_n$ which are continuous in density.

Figure 29:
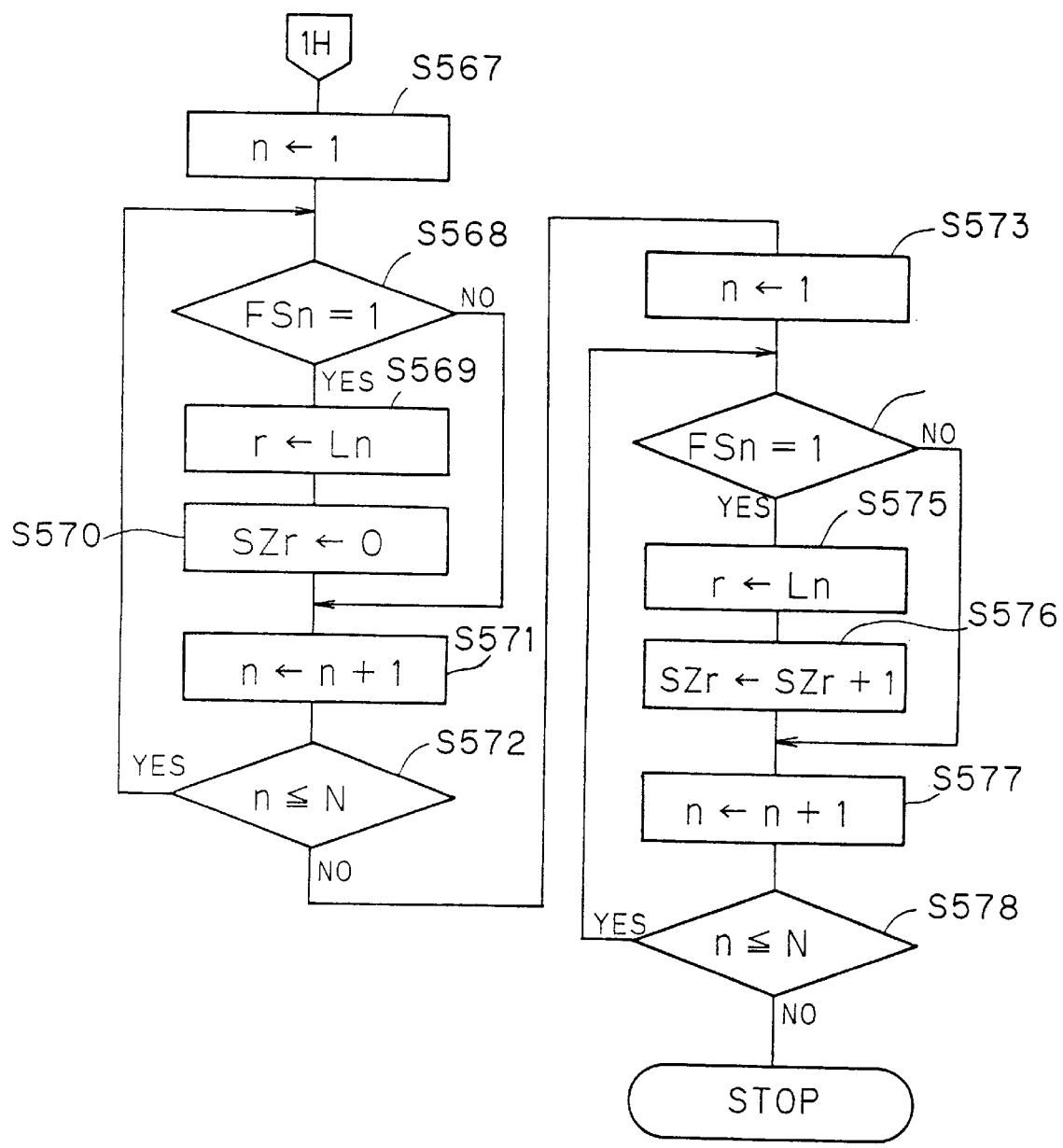

In this preferred embodiment, the labeled blocks $T_n$ are counted by label value in the routine of the process steps S567 to S578 of FIG. 29. The routine of the process steps S567 to S572 is to clear the number of blocks $SZ_r$ for each label value to "0". Reference character r is a variable corresponding to the respective label values. The routine of the process steps S573 to S578 will be described below.

The number n of the blocks $T_n$ is initialized to "1" in the process step S573. It is judged in the process step S574 whether or not the block $T_n$ has the uniform density. The process proceeds to the process step S575 when the block $T_n$ has uniform density. The process proceeds to the process step S577 when the block $T_n$ has nonuniform density.

The label $L_n$ of the block $T_n$ is replaced with the variable r in the process step S575. For example, the variable r is "1" when the label value of the label $L_n$ is "1", and the variable r is "3" when the label value of the label $L_n$ is "3". The blocks $T_n$ are added up by label value in the process step S576. When the label $L_n$ has the value "1", the number of blocks $SZ_1$ for r=1 is counted up by one. When the label $L_n$ has the value "3", the number of blocks $SZ_3$ for r=3 is counted up by one. Upon completion of the processing in the process step S576, the process proceeds to the process step S577.

The block number n of the blocks $T_n$ is counted up by one in the process step S577. It is judged in the process step S578 whether or not the updated block number n is more than the total number of blocks "N". When n<N, the process returns to the process step S574 and the routine of the process steps S574 to S578 is repeated until the block number n exceeds N in the process step S578. This permits all of the labels $L_n$ of the blocks $T_n$ having the label value $L_c$ to be included in any of the numbers of blocks $SZ_r$.

Specifically, the numbers of blocks $SZ_n$ for the label values $L_c$=1, 2, 3 . . . are obtained in the form of $SZ_1$=3, $SZ_2$=2, $SZ_3$=14 . . . . This indicates that the number of blocks forming the catch-light portion HA in the original image OG of FIG. 33 is one of the numbers of blocks $SZ_n$. When the block number n exceeds N in the process step S578, the routine is completed for detecting the group of adjacent uniform density blocks which are continuous in density, that is, the group of blocks $T_n$ having the same label $L_n$.

Figure 30:
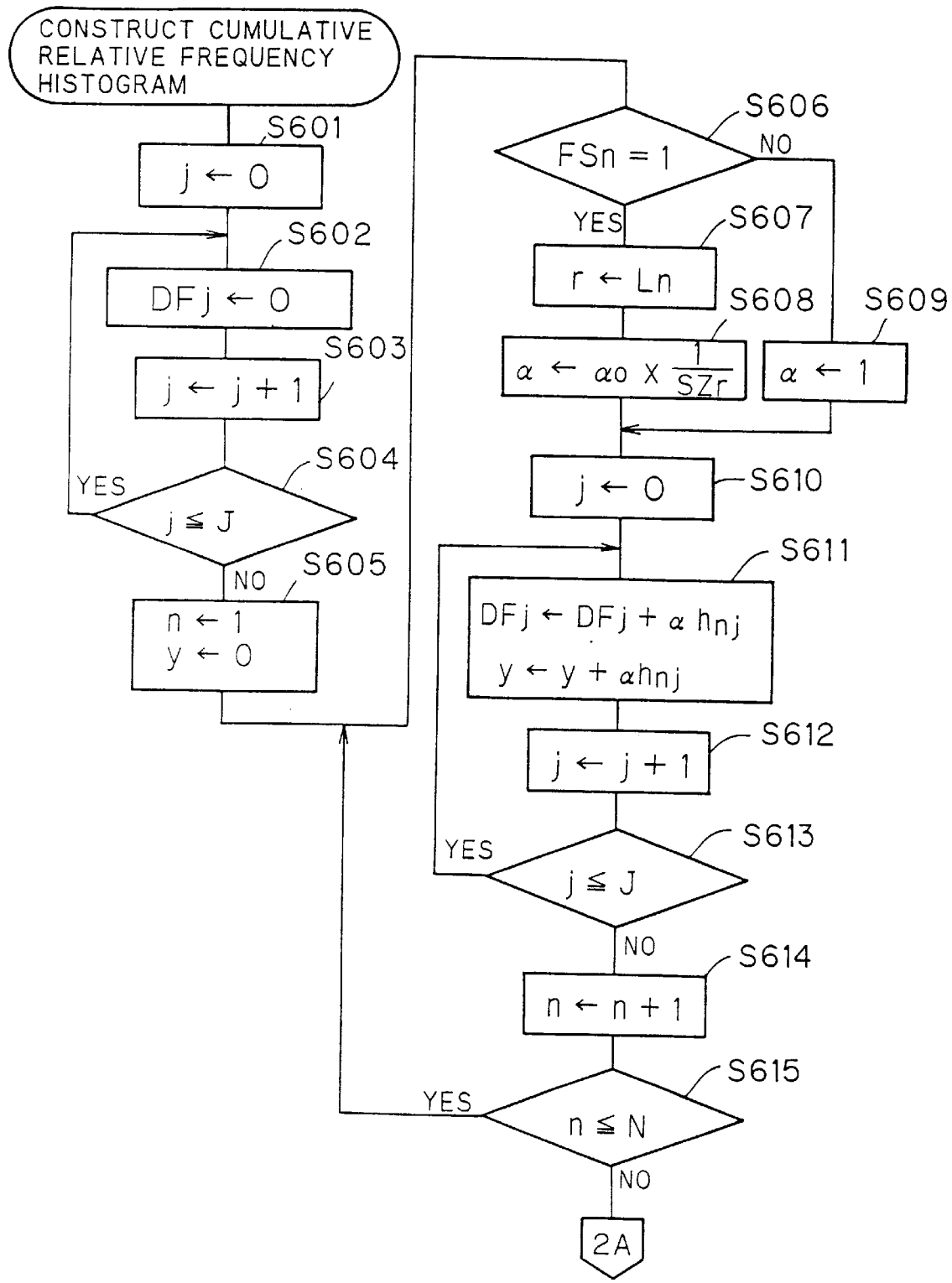
Figure 31:
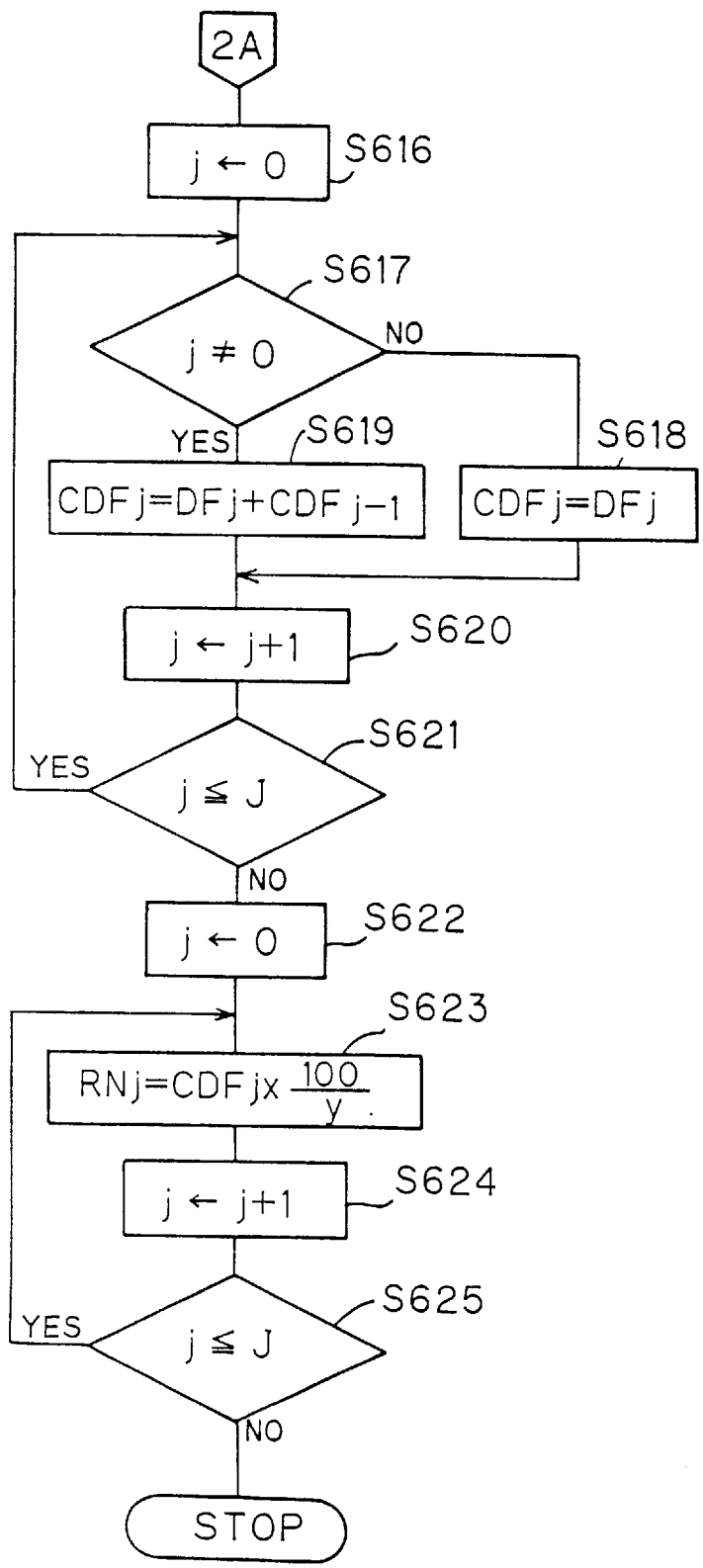

Upon detection of the group of blocks having the same label, the cumulative relative frequency histogram for the whole original is constructed in the process steps S601 to S625 of FIGS. 30 and 31.

The density histogram for the whole original image is constructed in the process steps S601 to S615. The number of pixels $DF_j$ for the rank number j (=0 to J) of the density histogram $h_{nj}$ is cleared to "0" in the process steps S601 to S604.

The block number n and the total number of pixels y are set to "1" and "0", respectively, in the process step S605. The routine of the process steps S606 to S615 is repeated until the block number n exceeds N in the process step S615, whereby the number of pixels $DF_j$ for each rank and the total number of pixels y are determined for the whole original. The routine of the process steps S606 to S615 will be described below.

It is judged in the process step S606 whether or not the block $T_n$ has uniform density, that is, whether the flag $FS_n$ is "1" or "0". The process proceeds to the process step S607 when the flag $FS_n$ is "1". In the process step S607, the label $L_n$ of the block $T_n$ is replaced with the variable r in the same manner as the process step S575. The process then proceeds to the process step S608 in which the reciprocal of the number of blocks $SZ_r$ is multiplied by a pre-selected constant $\alpha_0$ to determine a coefficient $\alpha$. The constant $\alpha_0$ should be positive and is arbitrarily set as required. When the constant $\alpha_0$ is "1", the coefficient $\alpha$ calculated in the process step S608 is the reciprocal of the number of blocks $SZ_r$. For example, the coefficient $\alpha$ is 1/2 when $SZ_r=2$, and the coefficient $\alpha$ is 1/11 when $SZ_r=11$.

The coefficient $\alpha=1$ is set in the process step S609 when the flag $FS_n$ is "0" in the process step S606. On setting the coefficient a in the process step S608 or S609, the process proceeds to the process step S610. The rank number j of the density histograms is set to "0" in the process step S610.

In the process steps S611 to S613, the following values are determined: (1) the number of pixels $DF_j$ for each rank in the image including the blocks $T_1$ to $T_n$; and (2) the total number of pixels y in the image including the blocks $T_1$ to $T_n$.

The routine of the process steps S606 to S613 is repeated, until the block number n, counted up by one in the process step S614, exceeds N in the process step S615.

The process steps S611 to S613 are directed to calculation of the number of pixels DFj for each rank and the total number of pixels. These steps S611 to S613 are similar to the steps S209 to S211 (FIG. 7) in the first preferred embodiment and the only difference is that the coefficient $\alpha$ is obtained in the process steps S608 and S609 in the third preferred embodiment, whole the same is obtained in the process steps S309 and S310 in the first preferred embodiment. Further, the process steps S614 and S615 are the same as the process steps S212 and S213 in FIG. 7. Thus, the description of the process steps S611 to S615 is omitted here. The Equations 4 and 5 in the first preferred embodiment are also obtained in the third preferred embodiment.

The density histogram for the whole original is constructed as a function of the number of pixels $DF_j$ for each rank in the whole original determined in this manner. As above described, the coefficient $\alpha$ determined in the process step S608 is inversely proportional to the number of blocks forming the block group. It is apparent from Equations 4 and 5 that the corrected number of pixels in the adjacent uniform density blocks which are continuous in density or in the blocks having the same label value provided in the process steps S501 to S566 is not increased in proportion in the whole original if the number of blocks forming the block group may be increased.

The cumulative number of pixels $CDF_j$ ($CDF_1$ to $CDF_J$) for each rank j in the whole original is calculated in the process steps S616 to S621 of FIG. 31. The rank number j is initialized to "0" in the process step S616 and then the process proceeds to the process step S617. The process proceeds to the process step S618 when j=0 in the process step S617, and the process proceeds to the process step S619 when j≠0 in the process step S617.

The number of pixels $DF_0$ for the rank number j=0 is converted into the cumulative number of pixels $CDF_0$ in the process step S618. In the process step S619, the cumulative number of pixels $CDF_{j-1}$ for the rank number j-1 is added to the number of pixels $DF_j$ for the rank number j to determine the cumulative number of pixels $CDF_j$ for the rank number j. The rank number j is counted up by one in the process step S620. The process returns to the process step S617 when the updated rank number j is not more than J in the process step S621. The process proceeds to the process step S622 when the updated rank number j is more than J in the process step S621.

Through the routine of the process steps S616 to S621, the cumulative number of pixels $CDF_1$ for the rank number j=1 is given by adding the number of pixels $DF_1$ for the rank number j=1 to the cumulative number of pixels $CDF_0$ for the rank number j=1-1=0. Subsequently, the cumulative numbers of pixels $CDF_2=CDF_1+DF_2$, $CDF_3=CDF_2+DF_3$, ... $CDF_J=CDF_{(J-1)}+DF_J$ are sequentially calculated in the ascending order of the rank number j.

A relative frequency $RN_j$ (%) of the cumulative number of pixels $CDF_j$ for each rank with respect to the total number of pixels y in the whole original is calculated in the process steps S622 to S625. The rank number j is initialized to "0" in the process step S622. In the process step S623, the relative frequency $RN_j$ (%) is calculated from the cumulative number of pixels $CDF_j$ calculated in the process steps S616 to S621 and the total number of pixels y in the whole original as $RN_j$$CDF_j \times 100/y$. The rank number j is counted up by one in the process step S624. The updated rank number j is compared with the final rank number J in the process step S625. The routine of the process steps S623 to S625 is repeated until j>J to thereby determine the relative frequency $RN_j$ for all ranks.

Then, a cumulative relative frequency histogram similar to that in FIG. 14 is obtained.

Figure 32:
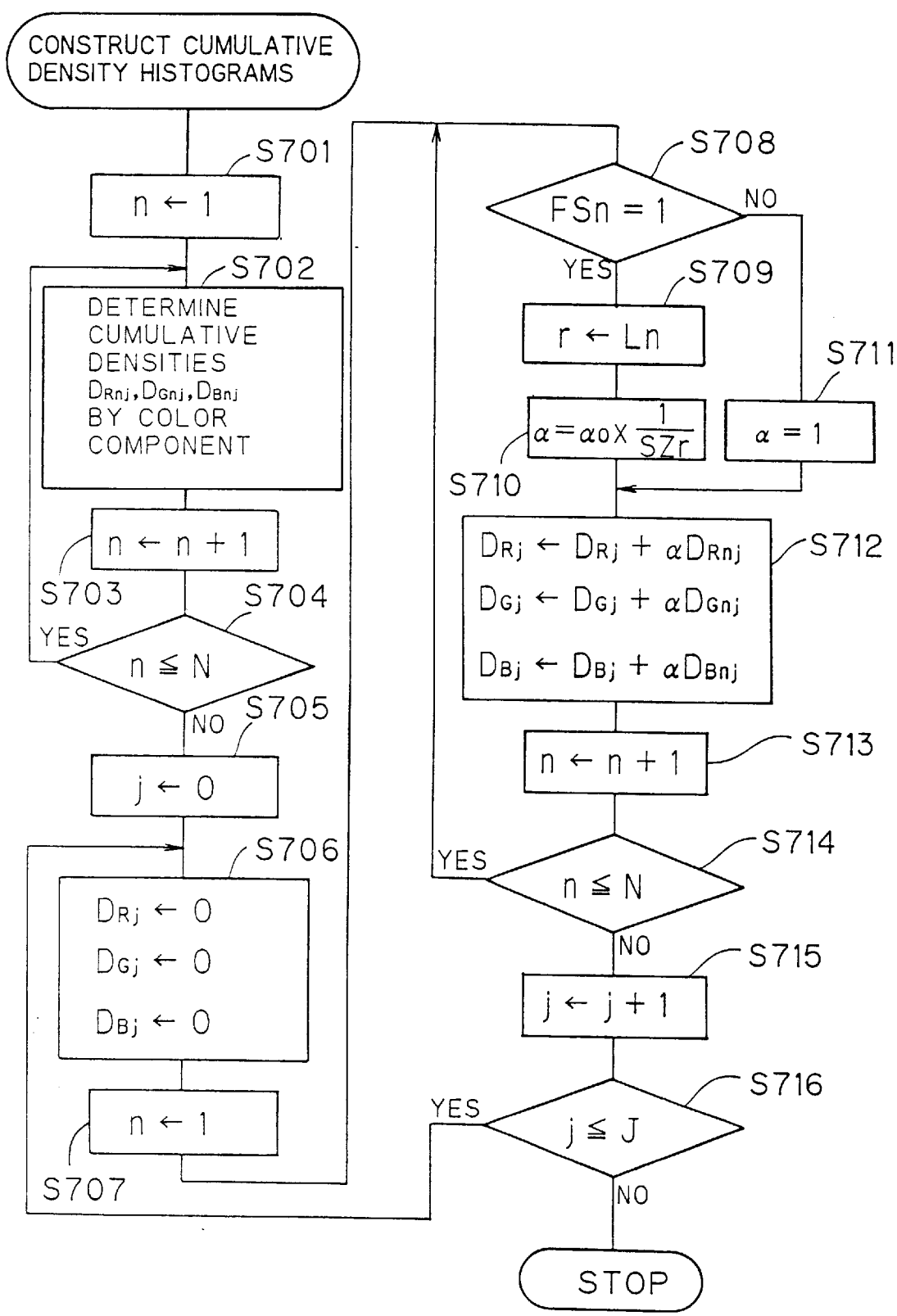

Next cumulative density histograms by color component are constructed in the process steps S701 to S716 of FIG. 32.

In the process steps S701 to S704, cumulative densities $D_{Rnj}$, $D_{Gnj}$, $D_{Bnj}$ by color component are determined for each block $T_n$ as a function of the density histogram $h_{nj}$ for each block $T_n$ provided in the process step S101 of FIG. 2. Specifically, the densities of the pixels included in each rank in the density histogram $h_{nj}$ determined in the process step S103 are extracted to add up the densities for each color component. This processing is carried out independently for each rank.

In the process steps S705 to S714, the cumulative density for the rank number j in the whole original is calculated. The rank number j is initialized to "0" in the process step S705. Cumulative densities $D_{Rj}$, $D_{Gj}$, $D_{Bj}$ by color component in the whole original are cleared to "0" in the process step S706. The block number n is set to "1" in the process step S707.

The routine of the process steps S708 to S711 is similar to that of the process steps S606 to S609. Process step S708 determines whether or not the flag $FS_n$ for the block $T_n$ is "1". When the flag $FS_n$ is "1", the label $L_n$ of the block $T_n$ is replaced with the variable r in the process step S709 and the process then proceeds to the process step S710. The reciprocal of the number of blocks $SZ_r$ is multiplied by the coefficient $\alpha_0$ to determine the coefficient $\alpha$ in the process step S710. The coefficient $\alpha=1$ is set in the process step S711 when the flag $FS_n$ is "0" in the process step S708. On setting the coefficient $\alpha$ in the process step S710 or S711, the process proceeds to the process step S712.

In the process step S712, values $\alpha \cdot D_{Rnj}$, $\alpha \cdot D_{Gnj}$, $\alpha \cdot D_{Bnj}$ are added to the calculated cumulative densities $D_{Rj}$, $D_{Gj}$, $D_{Bj}$, respectively. The block number n is counted up by one in the process step S713. Process step S714 determines whether or not the updated block number n is more than N. The process returns to the process step S708 when the block number n is not more than N. The routine of the process steps S708 to S714 is repeated until the block number n exceeds N in the process step S714.

This affords the determination of the cumulative densities:

$$D_{Rj}=\alpha_1 \cdot D_{R1j}+\alpha_2 \cdot D_{R2j}+ \ldots +\alpha_N \cdot D_{RNj},$$

$$D_{Gj}=\alpha_1 \cdot D_{G1j}+\alpha_2 \cdot D_{G2j}+ \ldots +\alpha_N \cdot D_{GNj},$$

$$D_{Bj}=\alpha_1 \cdot D_{B1j}+\alpha_2 \cdot D_{B2j}+ \ldots +\alpha_N \cdot D_{BNj}$$

for each rank in the whole original. The coefficients $\alpha_1$, $\alpha_2$, ... $\alpha_N$ are 1 or $1/SZ_r$ when the constant $\alpha_0$ is "1".

When the number n exceeds N in the process step S714, the rank number j is counted up by one in the process step S715. It is judged in the process step S716 whether or not the updated rank number j is more than J. The routine of the process steps S706 to S716 is repeated until the rank number j exceeds J in the process step S716. Thus, the cumulative densities for all ranks j=0 to J in the whole original are calculated in the process steps S705 to S716. The cumulative density histograms for the respective color components in the whole original image are constructed by using the calculated cumulative densities, similarly to FIGS., 15A to 15C.

Then highlight and shadow points or reference density points and gradation curve are determined in a manner similarly to the first preferred embodiment.

It should be noted that the number of pixels $P_{Rj}$ for each rank in the cumulative density histograms of FIGS. 16A to 16C is calculated using the number of pixels $P_{Rnj}$ for each block $T_n$ corresponding to the rank value $D_{Mj}$ and the coefficient α determined in the process steps S710 and S711 as:

$$P_{Rj} = \alpha 1 \cdot P_{R1j} + \alpha_2 \cdot P_{R2j} + \ldots + \alpha_N \cdot P_{RNj}.$$

Likewise, input highlight densities $D_{GH}$, $D_{BH}$ and input shadow densities $D_{GS}$, $D_{BS}$ are determined for the color components G and B.

The "setup" to be performed using the input highlight densities $D_{RH}$, $D_{GH}$, $D_{BH}$ and input shadow densities $D_{RS}$, $D_{GS}$, $D_{BS}$ shall be described hereinafter.

Figure 34:
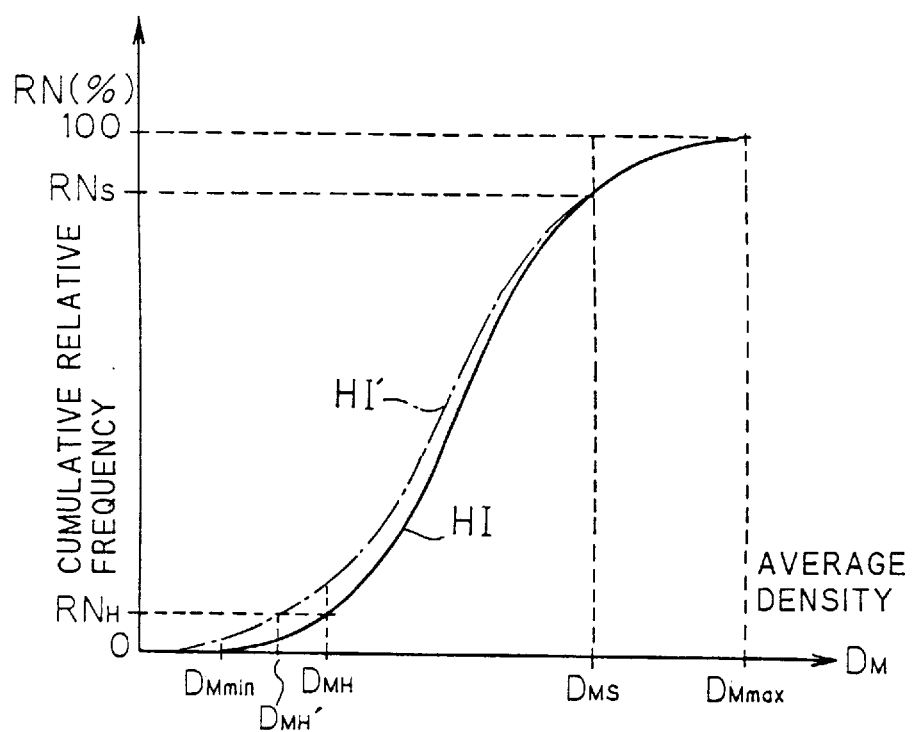
FIG. 34 shows the cumulative relative frequency histogram.

It is assumed that the original include the catch-light portion HA as shown in FIG. 33. A cumulative relative frequency histogram HI is produced through the routine of the process steps S601 to S625 of the preferred embodiment and is indicated by the solid curve of FIG. 34. A cumulative relative frequency histogram HI' is produced by the conventional method using the number of pixels in the whole original intact and is indicated by the dashed-and-dotted curve of FIG. 34. The cumulative relative frequency histogram HI is shown in FIG. 34 as being shifted in the highlight region toward the high-density side as compared with the cumulative relative frequency histogram HI'. The reason for such shift shall be described below.

When the cumulative relative frequency histogram is constructed through the aforesaid procedure for the original OG of FIG. 33, the same label value is assigned to the blocks $T_n$ forming the catch-light portion HA. As the catch-light portion HA grows more extensive, the number of blocks $SZ_r$ in the block group increases. To calculate the number of pixels $DF_j$ for each rank in the whole original in the process step S611, the coefficient a inversely proportional to the number of blocks $SZ_r$ is multiplied by the number of pixels for each rank for the blocks $T_n$ having the same label value detected in the process steps S101–S137 and S538–S578 as above described. Since the catch-light portion HA is a rather bright region, the density histograms for the respective blocks $T_n$ forming the catch-light portion HA are shifted toward the low-density side. Multiplying the coefficient α inversely proportional to the number of blocks $SZ_r$ by the number of pixels for each rank of the density histogram for the blocks $T_n$ forming the catch-light portion HA decreases the number of pixels on the low-density side in the density histogram for the whole original, so that the cumulative relative density histogram HI is shifted toward the high-density side as compared with the cumulative relative density histogram HI'.

The highlight-side cumulative density appearance rate $R_{NH}$ is applied to the cumulative relative frequency histograms HI and HI' shown in FIG. 34. The tentative highlight average density $D_{MH}$ determined using the cumulative relative frequency histogram HI is higher than a tentative highlight average density $D_{MH}'$ determined using the cumulative relative frequency histogram HI'. Hence, the input highlight density $D_{RH}$ for the color component R given by Equation 6 as a function of the tentative highlight average density $D_{MH}$ and the input highlight densities $D_{GH}$, $D_{BH}$ for the color components G, B given by the similar equations are higher than input highlight densities $D_{RH}'$, $D_{GH}'$, $D_{BH}'$ for the respective color components given as a function of the tentative highlight average density $D_{MH}'$ by the conventional method.

Figure 35:
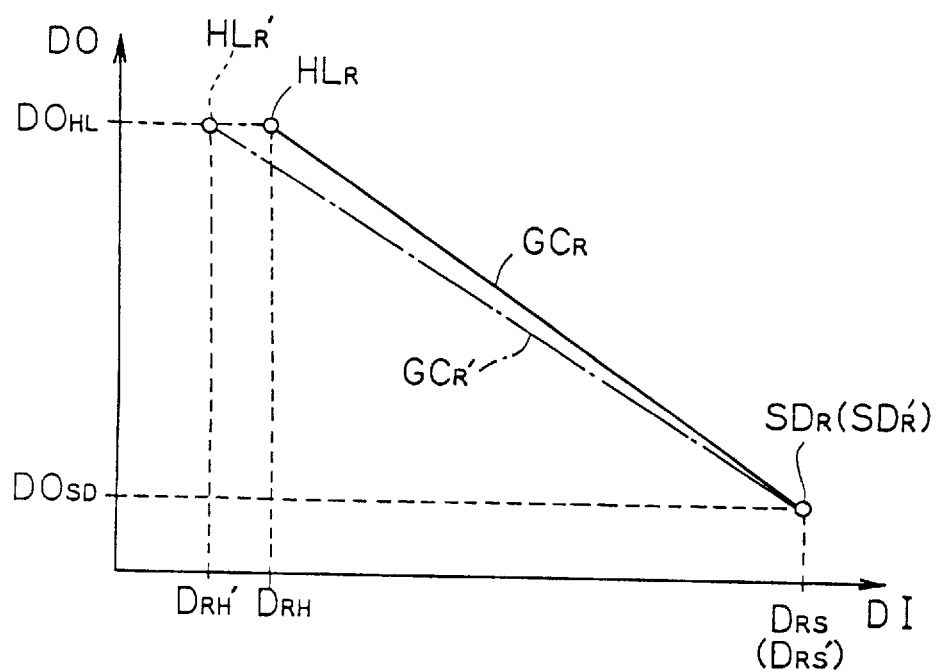
FIG. 35 is a graph showing gradation curves.

FIG. 35 is a graph showing gradation curves $GC_R$ and $GC_R'$. The gradation curve $GC_R$ is established using the input highlight density $D_{RH}$ and input shadow density $D_{RS}$ for the color component R by the method of the third preferred embodiment.

It should be evident from the above description that, when the original includes a bright portion such as the catch-light portion HA of FIG. 33, the setup using the input highlight densities $D_{RH}$, $D_{GH}$, $D_{BH}$ and input shadow densities $D_{RS}$, $D_{GS}$, $D_{BS}$ of the preferred embodiment permits the output density DO in the highlight region to be closer to the output highlight density $DO_{HL}$ than the setup using the input highlight densities $D_{RH}'$, $D_{GH}'$, $D_{BH}'$ and input shadow densities $D_{RS}'$, $D_{GS}'$, $D_{BS}'$ of the prior art. Therefore, the reproduced image of the third preferred embodiment is finished more brightly.

When the original includes a dark background, the input shadow densities $D_{RS}$, $D_{GS}$, $D_{BS}$ are lower than the input shadow densities $D_{RS}'$, $D_{GS}'$, $D_{BS}'$, although the detailed description thereof is omitted herein. In this case, the gradation curve $GC_R$ is drawn below the gradation curve $GC_R'$ or closer to the output shadow density $DO_{SD}$ than the gradation curve $GC_R'$. When the same input density DI is converted, the output density DO given by means of the gradation curve $GC_R$ is closer to the output shadow density $DO_{SD}$ than that given by means of the gradation curve $GC_R'$. Thus, the establishment of the input shadow densities $D_{RS}$, $D_{GS}$, $D_{BS}$ according to the preferred embodiment provides for the reproduced image which is less whitish than the conventional reproduced image when the original depicts the scene having the dark background.

The average density in the third preferred embodiment may be replaced with a lightness given by the weighted average of the respective color component densities. Alternatively, the density histogram may be that of the densities by color component. In this case, the density histograms for all of the color components R, G, B may be constructed. Otherwise, only the density histogram for one of the color components which is pre-selected may be constructed.

For constructing the density histograms for all of the color components R, G, B, the cumulative relative frequency histogram made in the process steps S601 to S625 and the cumulative density appearance rates $RN_H$, $RN_S$ are determined for each color component. Then the input highlight densities $D_{RH}$, $D_{GH}$, $D_{BH}$ and input shadow densities $D_{RS}$, $D_{GS}$, $D_{BS}$ are determined as a function of the cumulative density appearance rates $RN_H$, $RN_S$ for each color component and the cumulative density histograms given in the process steps S701 to S716. For constructing the density histogram for the one pre-selected color component in the process step S103, on the other hand, only the cumulative density histogram for the corresponding color component should be made in the process steps S701 to S716.

In the third preferred embodiment, a group of adjacent uniform density blocks which are continuous in density are detected, and the coefficient inversely proportional to the number of blocks included in the group is multiplied by the number of pixels for each rank in the density histograms for the blocks included in the group. In another preferred embodiment, a group of blocks whose density average $D_n$ calculated in the process step S103 is not more than a first predetermined value $D_{nL}$ established on the low-density side; and/or a group of blocks whose density average $D_n$ is not less than a second predetermined value $D_{nH}$ ($D_{nH}$>$D_{nL}$) established on the high-density side is detected. The coefficient inversely proportional to the number of blocks included in the group is multiplied by the number of pixels for each rank in the density histograms for the blocks included in the group.

Alternatively, only when the group includes a predetermined number of blocks or more, the coefficient inversely proportional to the number of blocks included in the group may be multiplied by the number of pixels for each rank in the density histograms for the blocks included in the group. In this case, the constant $\alpha_0$ used for determining the coefficient $\alpha$ in the process step S608 is preferably more than "1".

The coefficient inversely proportional to the number of blocks may be the inverse of the square root of the number of blocks.

The density may be transformed into space coordinates such as brightness, CIEXYZ or CIELAB to achieve the present invention.

The modifications described for the first preferred embodiment can also be applied to the third preferred embodiment. Hardware circuits may be used for attaining respective functions in the flow charts for the third preferred embodiment.

While the invention has been shown and described in detail, the foregoing description is in all aspects illustrative and not restrictive. It is therefore understood that numerous modifications and variations can be devised without departing from the scope of the invention.

I claim:

1. A method of converting a first image signal representative of an original image having gradation into a second image signal to modify said gradation, wherein said original image consists of a pixel array and said first image signal represents respective densities of pixels included in said pixel array, said method comprising the steps of:

(a) dividing said pixel array into sub-arrays to obtain a plurality of pixel blocks each consisting of a plurality of pixels;

(b) classifying said plurality of pixels into a plurality of density ranks according to respective values of said first image signal for each pixel block to thereby obtain a first electric signal representative of a density histogram for each pixel block, wherein said density histogram represents numbers of pixels belonging to respective density ranks;

(c) comparing said respective values of said first image signal with each other to classify said plurality of pixel blocks into a first group and a second group, wherein said first group consists of first pixel blocks and satisfies the conditions of:

I. said first pixel blocks in said first group are adjacent to each other,

II. each first pixel block in said first group has a substantially uniform density among respective pixels in said each first pixel block, and III. respective uniform densities of said first pixel blocks are substantially continuous between said first pixel blocks of said first group; and said second group consists of second pixel blocks other than said first pixel blocks;

(d) counting the number of said first pixel blocks in said first group to obtain a correction signal representative of the number of said first pixel blocks of said first group;

(e) receiving said correction signal and correcting respective numbers of pixels in said density histogram corresponding to each first pixel block, comprising the steps of:

(e-1) obtaining a coefficient signal reversely proportional to the number of said first pixel blocks in each first group; and (e-2) multiplying said respective numbers of pixels in said density histogram corresponding to respective first pixel blocks by said coefficient signal for said first group, to thereby obtain corrected numbers of pixels in said density histogram corresponding to respective first pixel blocks;

(f) after the step (e), adding up said corrected numbers of pixels for said first pixel blocks and said respective numbers of pixels for said second pixel blocks for each density rank to thereby obtain a density histogram for the whole of said original image;

(g) obtaining a second electric signal representative of a cumulative density histogram as a function of said density histogram for the whole of said original image;

(h) determining a reference point on a coordinate plane defined by an input density axis and an output density axis as a function of said second electric signal;

(i) determining a signal-conversion characteristic as a function of said reference point;

(j) setting said signal-conversion characteristic in a signal converter; and (k) inputting said first image signal to said signal converter and obtaining an output signal of said signal converter serving as said second image signal, thereby converting said first image signal into said second image signal.

2. The method of claim 1, wherein said step (c) comprises the steps of:

(c-1) selecting pixel blocks satisfying the conditions I and II to obtain tentative first pixel blocks; and (c-2) determining whether or not said tentative first pixel blocks also satisfy the condition III, to thereby determining said first pixel blocks, comprising the steps of:

(c-2-1) calculating an average of density values within each tentative first pixel block, to thereby obtain average signals for respective said tentative first pixel blocks;

(c-2-2) obtaining a difference signal between said respective average values;

(c-2-3) comparing said difference signal with a predetermined threshold value; and (c-2-4) obtaining said first pixel blocks by said tentative first pixel blocks when said difference signal is less than said predetermined threshold signal.

3. The method of claim 2, wherein
said original image is a color image;
said first image signal consists of color component signals; and
said step (b) comprises the step of:
  (b-1) averaging said color component signals for each pixel to obtain said respective values of said first image signal.

4. The method of claim 2, wherein
said original image is a color image;
said first image signal consists of color component signals; and
said step (b) comprises the step of:
  (b-2) providing said respective values of said first image signal by respective values of each color component signal for respective pixels.

5. The method of claim 2, wherein
said original image is a color image;
said first image signal consists of color component signals; and
said step (b) comprises the steps of:
  (b-3) selecting one of said color component signals; and
  (b-4) providing said respective values of said first image signal by respective values of said one color component signal.

6. An apparatus for converting a first image signal representative of an original image having gradation into a second image signal to modify said gradation, wherein said original image consists of a pixel array and said first image signal represents respective densities of pixels included in said pixel array, said apparatus comprising:
  (a) means for dividing said pixel array into sub-arrays to obtain a plurality of pixel blocks each consisting of a plurality of pixels;
  (b) means for classifying said plurality of pixels into a plurality of density ranks according to respective values of said first image signal for each pixel block to thereby obtain a first electric signal representative of a density histogram for each pixel block, wherein said density histogram represents numbers of pixels belonging to respective density ranks;
  (c) electric means for comparing said respective values of said first image signal with each other to classify said plurality of pixel blocks into a first group and a second group,
  wherein said first groups consists of first pixel blocks and satisfies the conditions of:
    I. said first pixel blocks in said first group are adjacent to each other,
    II. each first pixel block in said first group has a substantially uniform density among respective pixels in said each first pixel block, and
    III. respective uniform densities of said first pixel blocks are substantially continuous between said first pixel blocks of said first group; and
  said second group consists of second pixel blocks other than said first pixel blocks;
  (d) electric counter means for counting the number of said first pixel blocks in said first group to obtain a correction signal representative of the number of said first pixel blocks of said first group;
  (e) means for receiving said correction signal and correcting respective numbers of pixels in said density histogram corresponding to each first pixel block, comprising:
    (e-1) means for obtaining a coefficient signal reversely proportional to the number of said first pixel blocks in each first group; and
    (e-2) means for multiplying said respective numbers of pixels in said density histogram corresponding to respective first pixel blocks by said coefficient signal for said first group, to thereby obtain corrected numbers of pixels in said density histogram corresponding to respective first pixel blocks;
  (f) means for adding up said corrected numbers of pixels for said first pixel blocks and said respective numbers of pixels for said second pixel blocks for each density rank to thereby obtain a density histogram for the whole of said original image;
  (g) means for obtaining a second electric signal representative of a cumulative density histogram as a function of said density histogram for the whole of said original image;
  (h) means for determining a reference point on a coordinate plane defined by an input density axis and an output density axis as a function of said second electric signal;
  (i) means for determining a signal-conversion characteristic as a function of said reference point;
  (j) means for setting said signal-conversion characteristic in a signal converter; and
  (k) means for inputting said first image signal to said signal converter and obtaining an output signal of said signal converter serving as said second image signal, thereby converting said first image signal into said second image signal.

7. The apparatus of claim 6, wherein
said means (c) comprises:
  (c-1) means for selecting pixel blocks satisfying the conditions I and II to obtain tentative first pixel blocks; and
  (c-2) means for determining whether or not said tentative first pixel blocks also satisfy the condition III, to thereby determining said first pixel blocks, comprising:
    (c-2-1) means for calculating an average of density values within each tentative first pixel block, to thereby obtain average signals for respective said tentative first pixel blocks;
    (c-2-2) means for obtaining a difference signal between said respective average values;
    (c-2-3) means for comparing said difference signal with a predetermined threshold value; and
    (c-2-4) means for obtaining said first pixel blocks by said tentative first pixel blocks when said difference signal is less than said predetermined threshold signal.

8. The apparatus of claim 7, wherein
said original image is a color image;
said first image signal consists of color component signals; and
said means (b) comprises:
  (b-1) means for averaging said color component signals for each pixel to obtain said respective values of said first image signal.

9. The apparatus of claim 7, wherein
said original image is a color image;
said first image signal consists of color component signals; and said means (b) comprises:
- (b-2) means for providing said respective values of said first image signal by respective values of each color component signal for respective pixels.

10. The apparatus of claim 7, wherein said original image is a color image;

said first image signal consists of color component signals; and said means (b) comprises:
- (b-3) means for selecting one of said color component signals; and
- (b-4) means for providing said respective values of said first image signal by respective values of said one color component signal.

\* \* \* \* \*